United States Patent
Chang et al.

(10) Patent No.: US 11,199,677 B2
(45) Date of Patent: Dec. 14, 2021

(54) IMAGING LENS MODULE AND ELECTRONIC DEVICE

(71) Applicant: LARGAN PRECISION CO., LTD., Taichung (TW)

(72) Inventors: Lin An Chang, Taichung (TW); Ming-Ta Chou, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 50 days.

(21) Appl. No.: 16/853,117

(22) Filed: Apr. 20, 2020

(65) Prior Publication Data

US 2021/0263257 A1 Aug. 26, 2021

(30) Foreign Application Priority Data

Feb. 25, 2020 (TW) ................................. 109105953

(51) Int. Cl.
*G02B 7/00* (2021.01)
*G02B 7/02* (2021.01)

(52) U.S. Cl.
CPC .............. *G02B 7/003* (2013.01); *G02B 7/021* (2013.01)

(58) Field of Classification Search
CPC .......... G02B 7/003; G02B 7/021; G02B 7/00; G02B 7/025
See application file for complete search history.

(56) References Cited

U.S. PATENT DOCUMENTS

| | | | | |
|---|---|---|---|---|
| 7,626,723 | B2 * | 12/2009 | Yamada | H04N 1/6058 358/1.9 |
| 9,019,637 | B2 | 4/2015 | Tsai | |
| 9,069,119 | B2 * | 6/2015 | Takase | G02B 7/021 |
| 9,106,819 | B1 | 8/2015 | Gao et al. | |
| 9,363,424 | B2 | 6/2016 | Kim et al. | |
| 9,525,807 | B2 | 12/2016 | Gooi et al. | |
| 9,874,715 | B1 * | 1/2018 | Ma | G02B 7/021 |
| 10,027,865 | B1 * | 7/2018 | Tsai | G02B 7/02 |
| 10,079,965 | B2 | 9/2018 | Otani et al. | |

(Continued)

FOREIGN PATENT DOCUMENTS

| | | |
|---|---|---|
| CN | 1599428 A | 3/2005 |
| CN | 101494721 A | 7/2009 |

(Continued)

*Primary Examiner* — Robert E. Tallman
(74) *Attorney, Agent, or Firm* — Maschoff Brennan

(57) ABSTRACT

An imaging lens module includes an imaging lens assembly, an image sensor and a plastic lens barrel. The image sensor is disposed on an image side of the imaging lens assembly and has an image sensing surface through which an optical axis of the imaging lens assembly passes. The plastic lens barrel includes an object-end portion, a bottom portion, a first inner hole portion and a second inner hole portion. An object-end surface of the object-end portion faces towards an object side direction of the imaging lens assembly. A tapered surface of the object-end portion is tapered off towards the object-end surface. The bottom portion is located on an image side of the object-end portion. The imaging lens assembly is disposed in the first inner hole portion. The second inner hole portion located on an image side of the first inner hole portion and includes an optical aligning structure.

24 Claims, 52 Drawing Sheets

(56) References Cited

U.S. PATENT DOCUMENTS

| | | |
|---|---|---|
| 10,116,843 B2 | 10/2018 | Zhang et al. |
| 10,136,041 B2 | 11/2018 | Wang et al. |
| 10,171,716 B2 | 1/2019 | Wang et al. |
| 10,197,890 B2 | 2/2019 | Wang et al. |
| 10,205,863 B2 | 2/2019 | Tsai et al. |
| 10,236,312 B2 | 3/2019 | Mada |
| 10,268,017 B2 | 4/2019 | Chen |
| 10,281,676 B2 * | 5/2019 | Lin ................. G02B 7/022 |
| 10,298,820 B2 | 5/2019 | Hsu et al. |
| 10,373,992 B1 | 8/2019 | Hsu et al. |
| 10,432,837 B2 | 10/2019 | Tsai et al. |
| 10,451,852 B2 * | 10/2019 | Chou ................. G02B 1/041 |
| 2005/0035421 A1 | 2/2005 | Kayanuma et al. |
| 2006/0158748 A1 * | 7/2006 | Hirata ............. G02B 13/0035 |
| | | 359/811 |
| 2007/0160370 A1 | 7/2007 | Kikuchi et al. |
| 2009/0244735 A1 * | 10/2009 | Sasaki ................ G02B 7/021 |
| | | 359/830 |
| 2012/0008219 A1 * | 1/2012 | Huang .............. G02B 13/003 |
| | | 359/819 |
| 2014/0133040 A1 | 5/2014 | Tsai |
| 2017/0299839 A1 * | 10/2017 | Weng ................ H04N 5/2254 |
| 2019/0049689 A1 * | 2/2019 | Lin ..................... G02B 1/14 |
| 2020/0132968 A1 * | 4/2020 | Chou .................. G02B 7/026 |

FOREIGN PATENT DOCUMENTS

| | | |
|---|---|---|
| CN | 100553293 C | 10/2009 |
| CN | 103809261 A | 5/2014 |
| CN | 105530413 A | 4/2016 |
| CN | 105744130 A | 7/2016 |

\* cited by examiner

IMAGING LENS MODULE AND ELECTRONIC DEVICE

RELATED APPLICATIONS

This application claims priority to Taiwan Application 109105953, filed on Feb. 25, 2020, which is incorporated by reference herein in its entirety.

BACKGROUND

Technical Field

The present disclosure relates to an imaging lens module and an electronic device, more particularly to an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

A conventional optical lens system usually includes an injection-molded plastic lens barrel, which not only reduces manufacturing costs, but also increases shape design flexibility of the inner side surface of the lens barrel to meet various requirements. However, in the trend of miniaturization of the optical lens system, there may be a problem of a poor melt flow rate existing in the process of injection molding the plastic lens barrel. This problem causes an improper assembly, such as being offset and skew, of the optical lens system due to an overly large dimensional tolerance of the injection-molded plastic lens barrel, thereby allowing dust easy to enter the plastic lens barrel. In addition, it will waste time to classify parts to be assembled correspondingly to the different tolerance grades of the plastic lens barrel, which is not easy to be implemented in automated production line for mass production. Accordingly, how to improve the structure of the injection-molded plastic lens barrel is an important topic in the field nowadays.

SUMMARY

According to one aspect of the present disclosure, an imaging lens module includes an imaging lens assembly, an image sensor, and a plastic lens barrel. The imaging lens assembly has an optical axis. The image sensor is disposed on an image side of the imaging lens assembly, and the image sensor has an image sensing surface facing towards the imaging lens assembly. The optical axis passes through the image sensing surface. The plastic lens barrel accommodates the imaging lens assembly, and the plastic lens barrel includes an object-end portion, a bottom portion, a first inner hole portion, and a second inner hole portion. The object-end portion has an object-end surface and at least one tapered surface. The object-end surface faces towards an object side direction of the imaging lens assembly. The at least one tapered surface is tapered off towards the object-end surface. The bottom portion is located on an image side of the object-end portion. The imaging lens assembly is disposed in the first inner hole portion. The second inner hole portion is located on an image side of the first inner hole portion, and the second inner hole portion includes an optical aligning structure. A relative position between the image sensing surface and the imaging lens assembly is aligned by the optical aligning structure. The plastic lens barrel has at least three gate traces.

When a standard deviation of minimum distances between each of the at least three gate traces and the optical axis is dg_std, and an aperture diameter of the imaging lens module is φs, the following condition is satisfied:

$$0 \text{ [mm]} \leq dg\_std < 1.0 \times \phi s \text{ [mm]}.$$

When a length of the second inner hole portion in a direction in parallel with the optical axis is Lr, the following condition is satisfied:

$$0.2 \text{ [mm]} \leq Lr < 2.7 \text{ [mm]}.$$

According to another aspect of the present disclosure, an imaging lens module includes an imaging lens assembly, an image sensor, and a plastic lens barrel. The imaging lens assembly has an optical axis. The image sensor is disposed on an image side of the imaging lens assembly, and the image sensor has an image sensing surface facing towards the imaging lens assembly. The optical axis passes through the image sensing surface. The plastic lens barrel accommodates the imaging lens assembly, and the plastic lens barrel includes an object-end portion, a bottom portion, a first inner hole portion, and a second inner hole portion. The object-end portion has an object-end surface and at least one tapered surface. The object-end surface faces towards an object side direction of the imaging lens assembly. The at least one tapered surface is tapered off towards the object-end surface. The bottom portion is located on an image side of the object-end portion. The imaging lens assembly is disposed in the first inner hole portion. The second inner hole portion is located on an image side of the first inner hole portion, and the second inner hole portion includes an optical aligning structure. A relative position between the image sensing surface and the imaging lens assembly is aligned by the optical aligning structure. The plastic lens barrel has at least three gate traces.

When a standard deviation of minimum distances between each of the at least three gate traces and the optical axis is dg_std, and an aperture diameter of the imaging lens module is φs, the following condition is satisfied:

$$0 \text{ [mm]} \leq dg\_std < 1.0 \times \phi s \text{ [mm]}.$$

When an area surrounded by the object-end surface is Af, and an area surrounded by the bottom portion is Ab, the following condition is satisfied:

$$0 < Af/Ab < 0.35.$$

According to another aspect of the present disclosure, an electronic device includes one of the aforementioned imaging lens modules and a display module, wherein the display module is located on an object side of the imaging lens module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
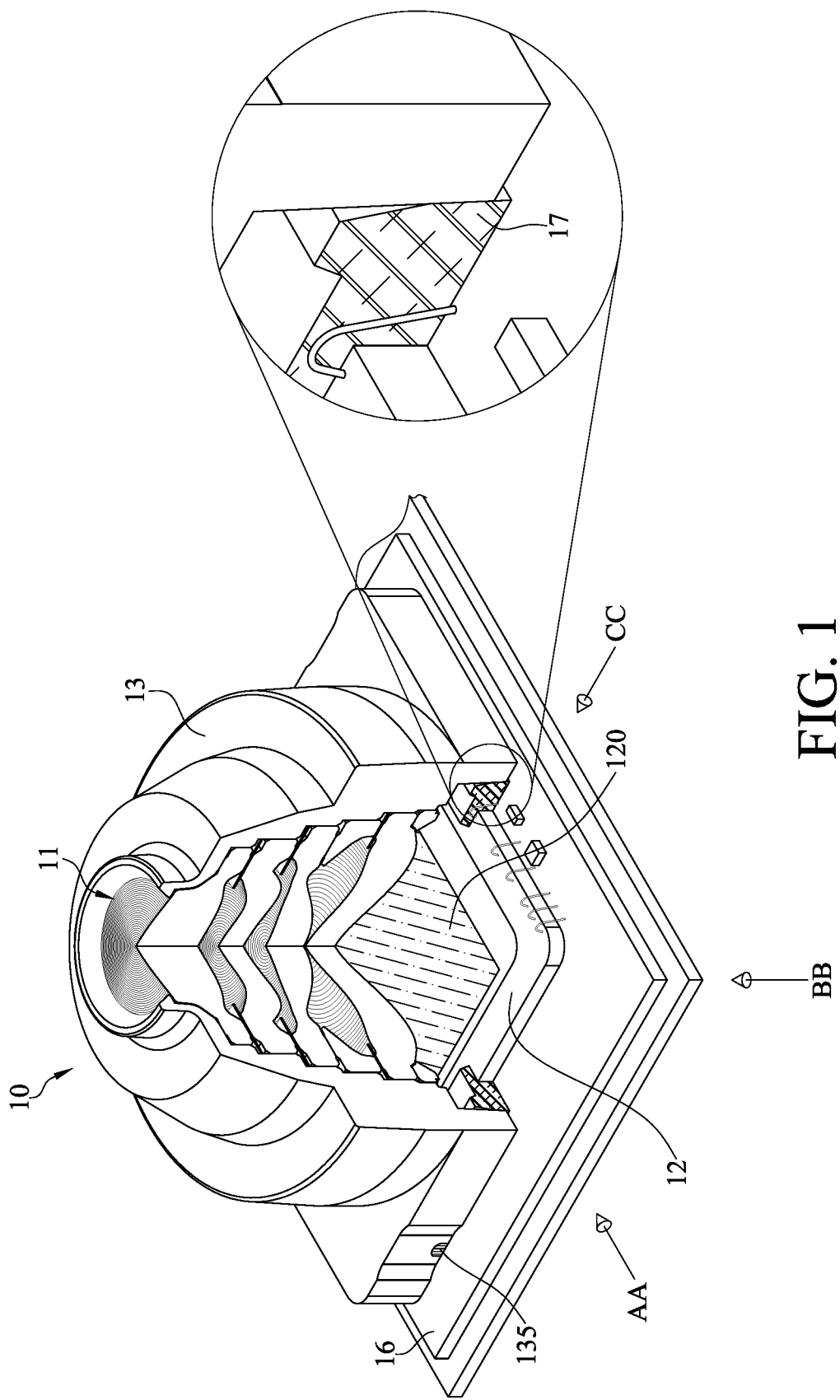
FIG. 1 is a perspective view of a partially sectioned imaging lens module and an image sensor thereof with a circuit board and a substrate according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module includes an imaging lens assembly, an image sensor, and a plastic lens barrel. The imaging lens assembly has an optical axis and an image surface. The image sensor is disposed on an image side of the imaging lens assembly, and the image sensor has an image sensing surface facing towards the imaging lens assembly. Specifically, the image sensing surface can be disposed on the image surface of the imaging lens assembly. The optical axis passes through the image sensing surface. The image sensor can collaborate with a circuit board and a substrate, the image sensor is electrically connected to the circuit board, and the circuit board can abut on the substrate to be fixed thereon. Therefore, the imaging signal of the image sensor can be transmitted to the circuit board. Moreover, the circuit board can be a printed circuit board (PCB), or a flexible printed circuit (FPC). Moreover, the substrate can be a molded plastic substrate that can be used for circuit package. Therefore, such design is favorable for controlling dimensional accuracy and for better collaborating with the imaging lens module. In the assembly process, a preferable imaging position of the imaging lens assembly can be determined by a testing machine, and the image sensor can be adjusted to the preferable imaging position by structure correction or feedback control and thus can be mounted in the plastic lens barrel. As the mount position is confirmed, the image sensor can be preliminarily fixed and then electrically connected to the circuit board and other circuit component. Therefore, it is favorable for preventing assembly deviation of the image sensor and for providing a parts-dismantlable, parts-replacable and re-operatable assembly process, thereby ensuring assembly quality and increasing assembly yield rate. Moreover, a baking process can be performed in assembling the image sensor, and warpage will not occur on the image sensor and the imaging lens module since both of them can withstand the environment of the baking process.

The plastic lens barrel accommodates the imaging lens assembly. The plastic lens barrel can be made of black plastic material and can be manufactured in one piece by injection molding. Therefore, it is favorable for reducing light reflection in the plastic lens barrel and reducing manufacturing cost of the plastic lens barrel. The plastic lens barrel includes an object-end portion, a bottom portion, a first inner hole portion, and a second inner hole portion. Moreover, the bottom portion is located on an image side of the object-end portion, and the second inner hole portion is located on an image side of the first inner hole portion. Moreover, the bore of the first inner hole portion can be substantially circular, and the bore of the second inner hole portion can be substantially rectangular, but the present disclosure is not limited thereto.

The object-end portion has an object-end surface and at least one tapered surface, wherein the object-end surface faces towards an object side direction of the imaging lens assembly, and the at least one tapered surface is tapered off towards the object-end surface.

The bottom portion can have a top surface and a bottom surface. The bottom surface is located at a position of the bottom portion farthest away from the object-end portion, the top surface and the bottom surface are disposed opposite to each other, and the image sensing surface is located between the top surface and the bottom surface. Therefore, the design of the image sensor accommodated in the plastic lens barrel is favorable for preventing light leakage from the imaging lens module, effectively reducing non-imaging light into the image sensing surface and reducing stray light. Moreover, the bottom surface of the bottom portion can be substantially quadrilateral. Therefore, it is favorable for collaborating with the structure of the image sensor and for allowing a robotic arm to easily grip thereon during automated assembly. Please refer to FIG. 10, which shows a schematic view of the appearance of the bottom surface 1322 of the bottom portion 132 according to the 1st embodiment of the present disclosure, wherein the bottom surface 1322 of the embodiment is substantially quadrilateral. Moreover, the bottom surface of the bottom portion can be substantially rectangular. Therefore, it is favorable for using a non-axisymmetric design to be applicable to an arrangement in a relative small space. Please refer to FIG. 47, which shows a schematic view of the appearance of the bottom surface 6322 of the bottom portion 632 according to the 11th embodiment of the present disclosure, wherein the bottom surface 6322 of the embodiment is substantially rectangular. Moreover, one side of the bottom surface of the bottom portion can be located closer to the object-end surface than the other three sides thereof. Therefore, it is favorable for providing a space for minute adjustment, such that the focus state of the image sensor can be further optimized. Please refer to FIG. 15 and FIG. 17, which show schematic views of the bottom portion 232 according to the 3rd embodiment of the present disclosure, wherein one side 2322a of the bottom surface 2322 of the embodiment is located closer to the object-end surface 2311 than the other sides 2322b thereof.

The imaging lens assembly is disposed in the first inner hole portion. Specifically, the first inner hole portion can be formed with at least four inner parallel annular surfaces. The at least four inner parallel annular surfaces are disposed in parallel with the optical axis, and at least one of the at least four inner parallel annular surfaces is in physical contact with the imaging lens assembly. Therefore, it is favorable for ensuring the axial alignment of the imaging lens assembly so as to increase concentricity of the imaging lens module.

The second inner hole portion includes an optical aligning structure. Therefore, it is favorable for the plastic lens barrel to be assembled with the image sensor by the optical aligning structure, such that the imaging lens module can be quickly assembled, thereby increasing manufacturing efficiency. Specifically, the optical aligning structure can provide the image sensor a space for adjustment, such that the image sensor can be controlled at a particular position in any directions of the X, Y and Z axes; or, the optical aligning structure can provide collaboration with the image sensor in at least one direction by controlling dimensional accuracy, such that the image sensor is positioned at the particular position. Therefore, it is favorable for lessening the situation that the physical image sensing surface is overall offset and skew from the optical image surface, thereby achieving an effect that the optical aligning structure is used for the image sensing surface to be aligned with the image surface of the imaging lens assembly. That is, a relative position between the image sensing surface and the imaging lens assembly is aligned by the optical aligning structure. Also, both of the circular first inner hole portion and the rectangular second inner hole portion can align each element with the optical axis defined by the imaging lens assembly. Moreover, the image sensor can be provided with a structure collaborating with the optical aligning structure, wherein the structure collaborating with the optical aligning structure can be manufactured by a molding and packaging process technology, but the present disclosure is not limited thereto. Moreover, the optical aligning structure can have at least one inner bevel surface configured to be axially aligned with the image sensor, wherein the axial alignment refers to aligning the optical axis with a point such as the geometric center of the image sensing surface. Therefore, it is favorable for increasing tightness between the plastic lens barrel and the image sensor so as to improve assembly stability. Moreover, the optical aligning structure can further have at least one inner flat surface configured to maintain an axial position of the image sensor (e.g., a relative position between the image sensing surface and the imaging lens assembly in a direction in parallel with the optical axis). The at least one inner flat surface extends in a direction perpendicular to the optical axis, and the at least one inner flat surface and the at least one inner bevel surface are angled to each other. Therefore, it is favorable for simplifying assembly process so as to improve the efficiency and yield rate of automated production.

The plastic lens barrel has at least three gate traces. Therefore, it is favorable for the entire plastic lens barrel of the present disclosure, designed to include the bottom portion, to have dimensional accuracy precisely controlled on each detailed structure by the design of disposing three gate traces or more; also, it is favorable for easily focusing the image sensor to the imaging position by collaborating with the assembly between the imaging lens assembly and the image sensor. Moreover, the at least three gate traces can be disposed on the bottom portion of the plastic lens barrel. Therefore, it is favorable for maintaining consistency of the injection direction so as to reduce the occurrence of incomplete filling during injection molding.

When a standard deviation of minimum distances between each of the at least three gate traces and the optical axis is dg_std, and an aperture diameter of the imaging lens module is $\phi s$, the following condition is satisfied: 0 [mm] $\leq$ dg_std<1.0×$\phi s$ [mm]. Therefore, it is favorable for the gate traces to be provided in a relatively applicable position range and for ensuring optical quality of the imaging lens module because the forming tolerance of the plastic lens barrel is relatively small under this condition. Moreover, the following condition can also be satisfied: 0 [mm] $\leq$ dg_std<0.85×$\phi s$ [mm]. Therefore, it is favorable for maintaining high-precision molding quality and for providing such condition range for a faster molding rate, and thus it is favorable for molding a plastic lens barrel with a relatively complicated structure. Moreover, the following condition can also be satisfied: 0 [mm] $\leq$ dg_std<0.7×$\phi s$ [mm]. Therefore, it is favorable for ensuring structural integrity of the optical aperture, thereby preventing stray light due to structural defects. Moreover, the following condition can also be satisfied: 0 [mm] $\leq$ dg_std<0.45×$\phi s$ [mm]. Therefore, it is favorable for the gate traces to be designed applicable to a non-axisymmetric plastic lens barrel, for maintaining applicability between the first inner hole portion of the plastic lens barrel and the imaging lens assembly and between the second inner hole portion of the plastic lens barrel and the image sensor and for providing optical image with high quality for the non-axisymmetric plastic lens barrel. It is noted that minimum distances between each of the at least three gate traces and the optical axis are respectively dg1, dg2, dg3, . . . , and dgN, an average value of the minimum distances is dg_avg= ($\Sigma$dgi)/N, and the standard deviation of the minimum distances is dg_std=$\sqrt{\{[\Sigma(dgi-dg\_avg)^2]/N\}}$, wherein i=1, 2, 3, . . . , N, and N refers to the number of the gate traces which is not smaller than three. In addition, the optical aperture of the imaging lens module surrounds the optical axis. The optical aperture can be the minimum inner hole of the plastic lens barrel or one optical element of the imaging lens assembly, and the present disclosure is not limited thereto. Please refer to FIG. 9, which shows a schematic view of the minimum distances dg1, dg2, dg3, and dg4 between each of the gate traces 135 (135a, 135b, 135c, and 135d) and the optical axis 110 according to the 1st embodiment of the present disclosure, wherein the number of the gate traces 135 is four. Please refer to FIG. 7, which shows a schematic view of the aperture diameter ($\phi s$ according to the 1st embodiment of the present disclosure, wherein the optical aperture 130 is the minimum inner hole of the plastic lens barrel 13, but the disclosure is not limited thereto. Please refer to FIG. 32, which shows a schematic view of the aperture stop 511a according to the 9th embodiment of the present disclosure, wherein the aperture stop 511a is one of the optical elements 511 of the imaging lens assembly 51.

When a length of the second inner hole portion in the direction in parallel with the optical axis is Lr, the following condition can be satisfied: 0.2 [mm]<Lr<2.7 [mm]. Therefore, it is favorable for providing the image sensor a sufficient disposing space and thus for preventing being offset and skew while being assembled and aligned. Moreover, the following condition can also be satisfied: 0.3 [mm] $\leq$ Lr<2.2 [mm]. Therefore, it is favorable for providing the image sensor a more proper disposing space and thus for having better assembling and aligning efficiency. Please refer to FIG. 7, which shows a schematic view of the length Lr of the second inner hole portion 134 in the direction in parallel with the optical axis 110 according to the 1st embodiment of the present disclosure.

When an area surrounded by the object-end surface is Af, and an area surrounded by the bottom portion is Ab, the following condition can be satisfied: 0<Af/Ab<0.35. Therefore, the design of the imaging lens module with a relative small size at an object side thereof is favorable for increasing the melt flow rate of the plastic material while being injection-molded and for miniaturizing the imaging lens module. Moreover, the following condition can also be satisfied: 0<Af/Ab$\leq$0.28. Therefore, the design of the imaging lens module with a smaller size at the object side thereof collaborating with the tapered surface is favorable for enhancing structural strength between the object-end surface and the bottom surface. It is noted that the area surrounded by the object-end surface refers to the area surrounded by the outer edge of the most object side of the object-end portion and can be presented as $Af=\pi(\phi o/2)^2$, wherein $\phi o$ refers to the outer diameter of the object-end surface. In addition, the area surrounded by the bottom portion refers to the area surrounded by the outer edge of the most image side of the bottom portion and is approximately equal to the long side multiplied by the short side of the bottom portion.

When an angle between the at least one tapered surface and the optical axis is α, the following condition can be satisfied: 1 [deg.]≤α≤65 [deg.]. Therefore, it is favorable for providing a small object-side lens design and for allowing the flow of the plastic material more uniform and smooth while being injection-molded. Please refer to FIG. 7, which shows a schematic view of the angles α (α1, α2, and α3) between the tapered surfaces 1312 and the optical axis 110 according to the 1st embodiment of the present disclosure, wherein the number of the tapered surfaces 1312 is three.

The present disclosure provides an electronic device including the aforementioned imaging lens module and a display module, wherein the display module is located on an object side of the imaging lens module. The display module can include a display panel, a backlight panel, a touch panel, a glass substrate or a protective plate, but the present disclosure is not limited thereto. Therefore, it is favorable for feasibility of providing an under-screen lens.

The top surface of the bottom portion of the imaging lens module is configured to have a supporting function for the display module to abut thereon. Therefore, it is favorable for increasing structural stability and reducing the possibility that light of the display module enters the imaging lens module. Please refer to FIG. 25, which shows a schematic view of the display module 39 abutting on the top surface 3321 of the bottom portion 332 according to the 6th embodiment of the present disclosure. Moreover, the display module can further include spacer such as cushion, plastic plate or metal plate, but the present disclosure is not limited thereto. Therefore, it is favorable for preventing the relative precise panel in the display module from being in direct contact with the top surface of the bottom portion so as to ensure normal working of the display module.

The plastic lens barrel of the imaging lens module can further include a step surface disposed opposite to the bottom surface. At least one of the top surface and the step surface is configured to have a supporting function for the display module to abut thereon. Therefore, it is favorable for increasing structural stability, for designing imaging lens modules to collaborate with different specifications of the display module and for reducing the possibility that light of the display module enters the imaging lens module. Please refer to FIG. 13, which shows a schematic view of the display module 19 abutting on the step surface 139 of the plastic lens barrel 13 according to the 2nd embodiment of the present disclosure.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
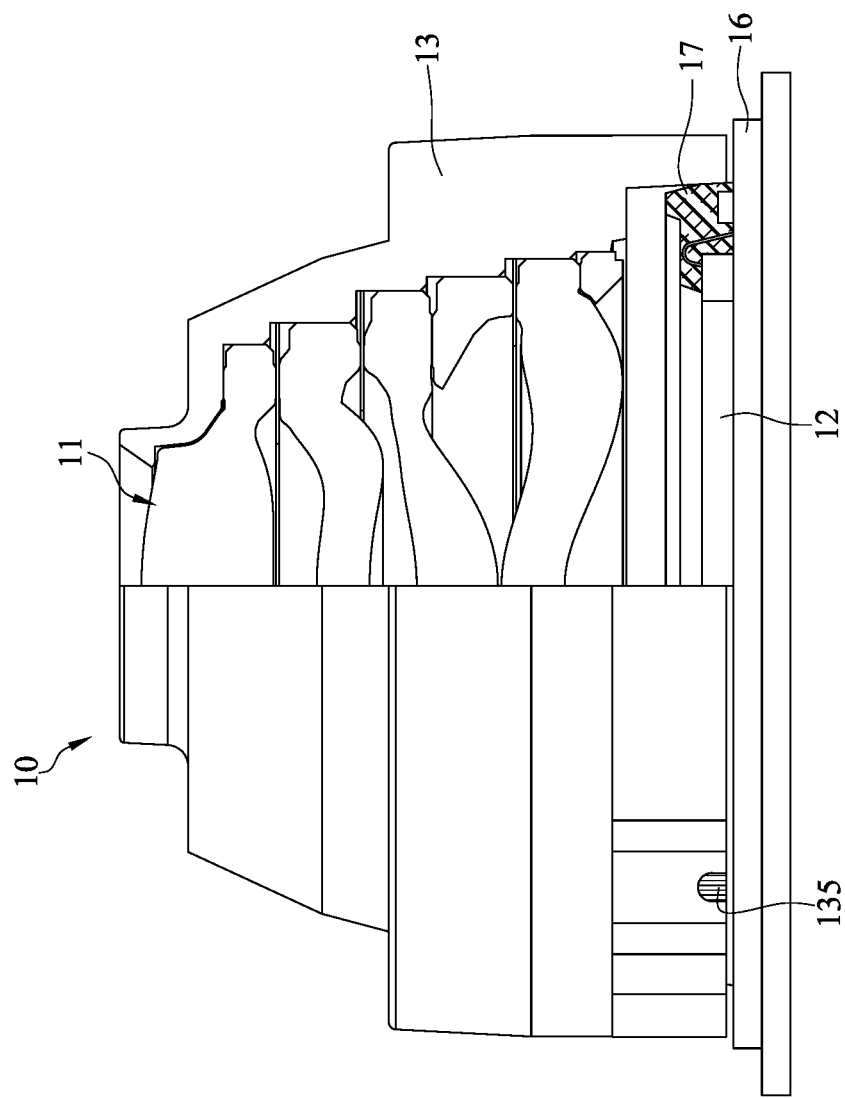
FIG. 2 is a side view of the partially sectioned imaging lens module and the image sensor thereof with the circuit board and the substrate viewing from an AA direction in FIG. 1.
Figure 3:
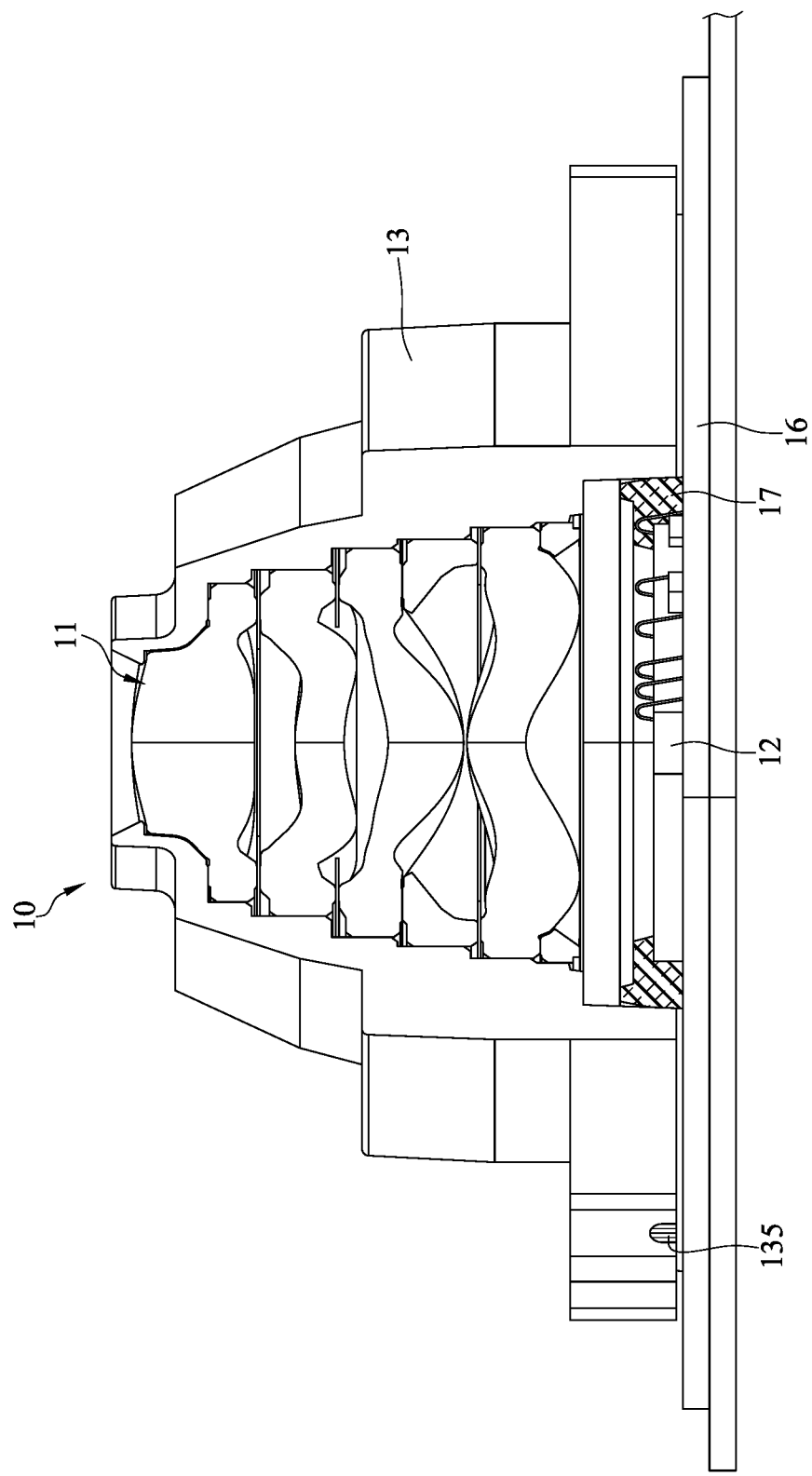
FIG. 3 is a side view of the partially sectioned imaging lens module and the image sensor thereof with the circuit board and the substrate viewing from a BB direction in FIG. 1.
Figure 4:
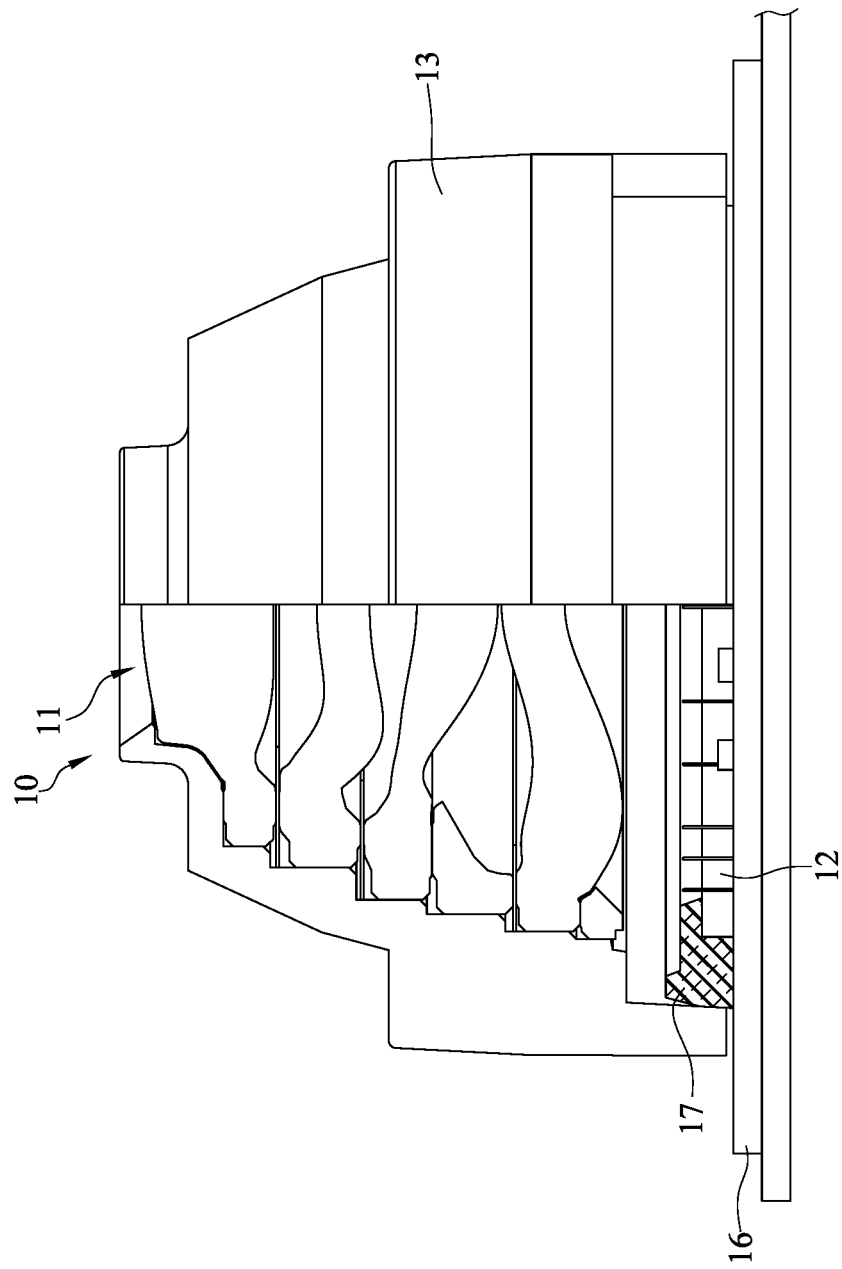
FIG. 4 is a side view of the partially sectioned imaging lens module and the image sensor thereof with the circuit board and the substrate viewing from a CC direction in FIG. 1.
Figure 5:
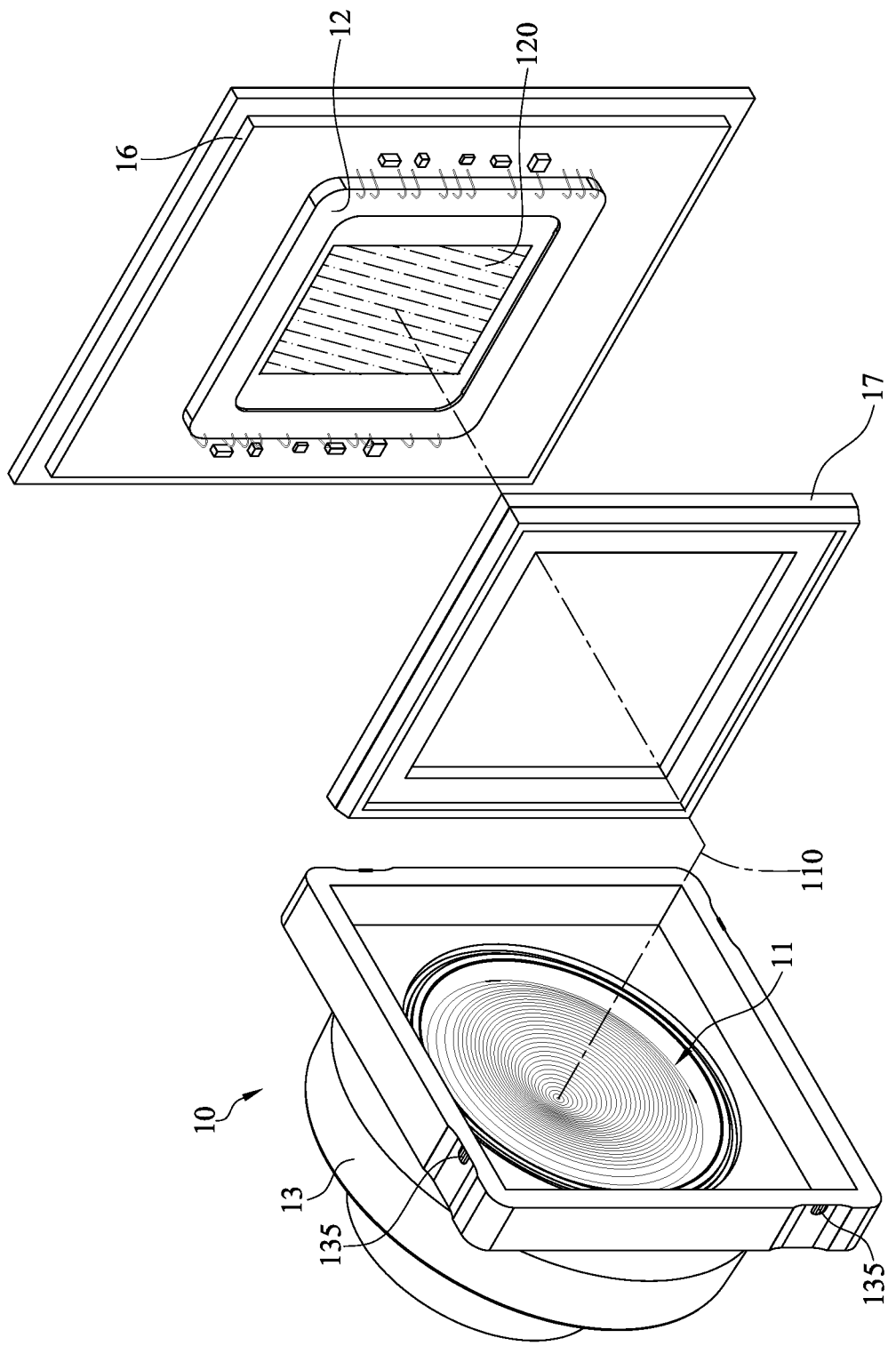
FIG. 5 is an exploded view of the imaging lens module and the image sensor thereof with the circuit board and the substrate in FIG. 1.
Figure 6:
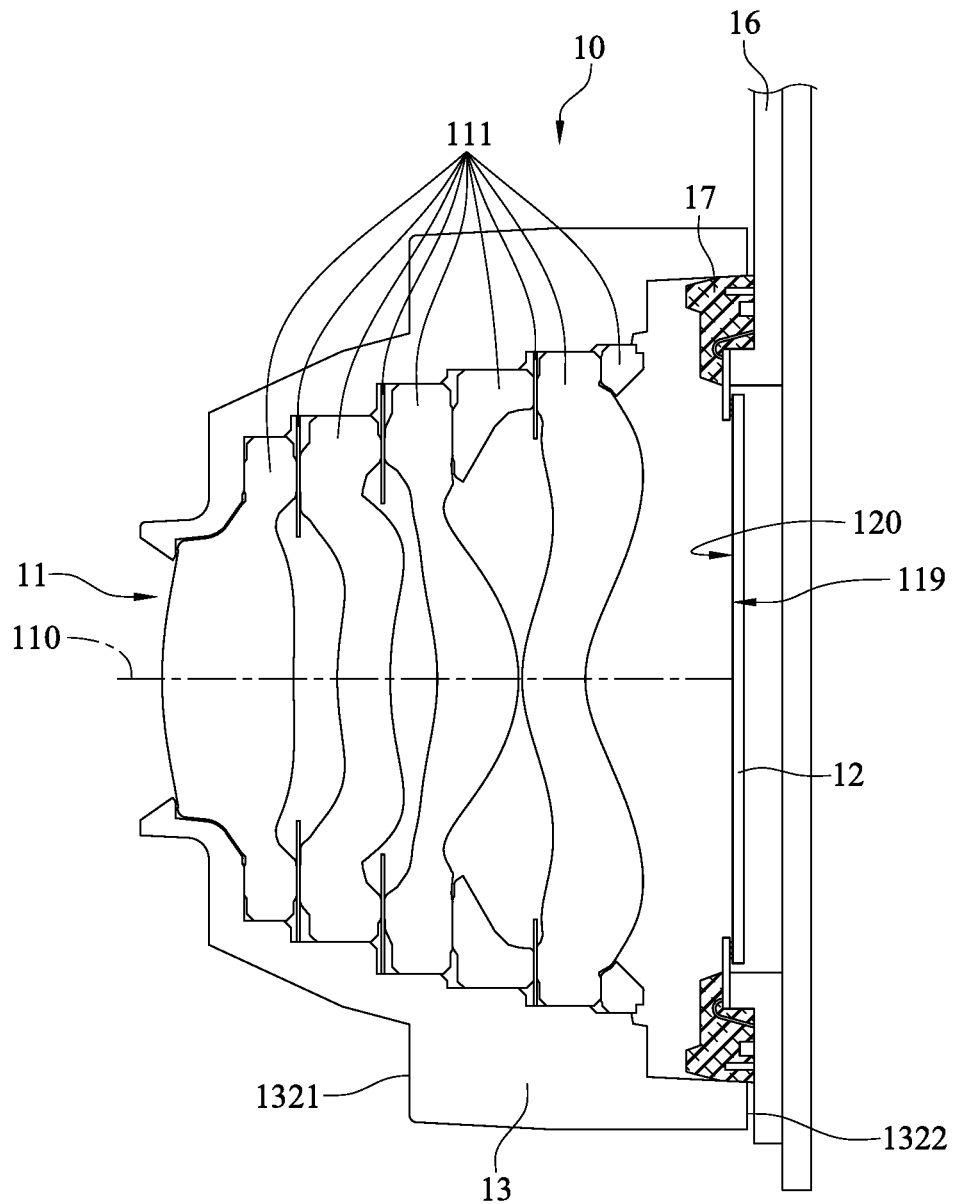
FIG. 6 is a cross-sectional view of the imaging lens module and the image sensor thereof with the circuit board and the substrate in FIG. 5.
Figure 7:
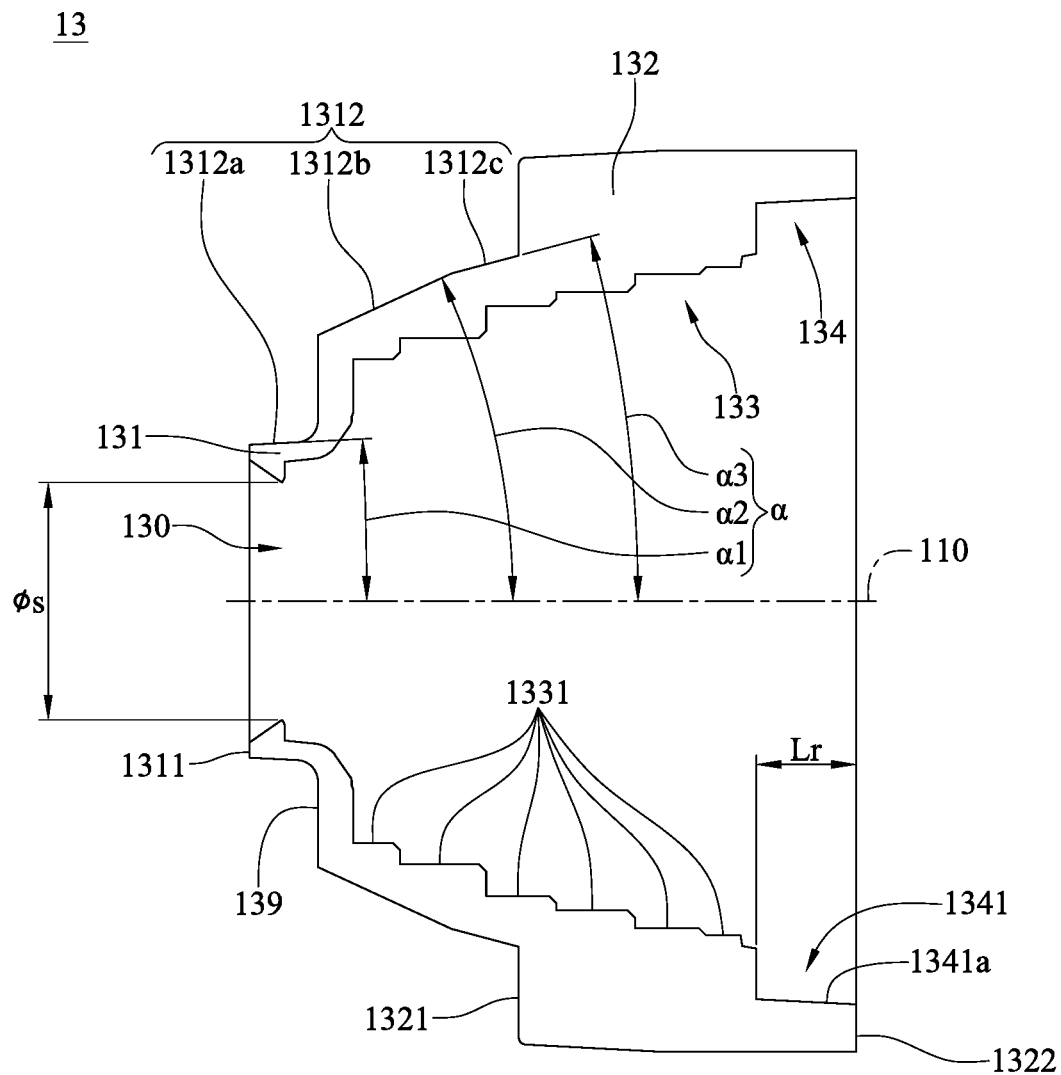
FIG. 7 is a cross-sectional view of a plastic lens barrel of the imaging lens module in FIG. 6.
Figure 8:
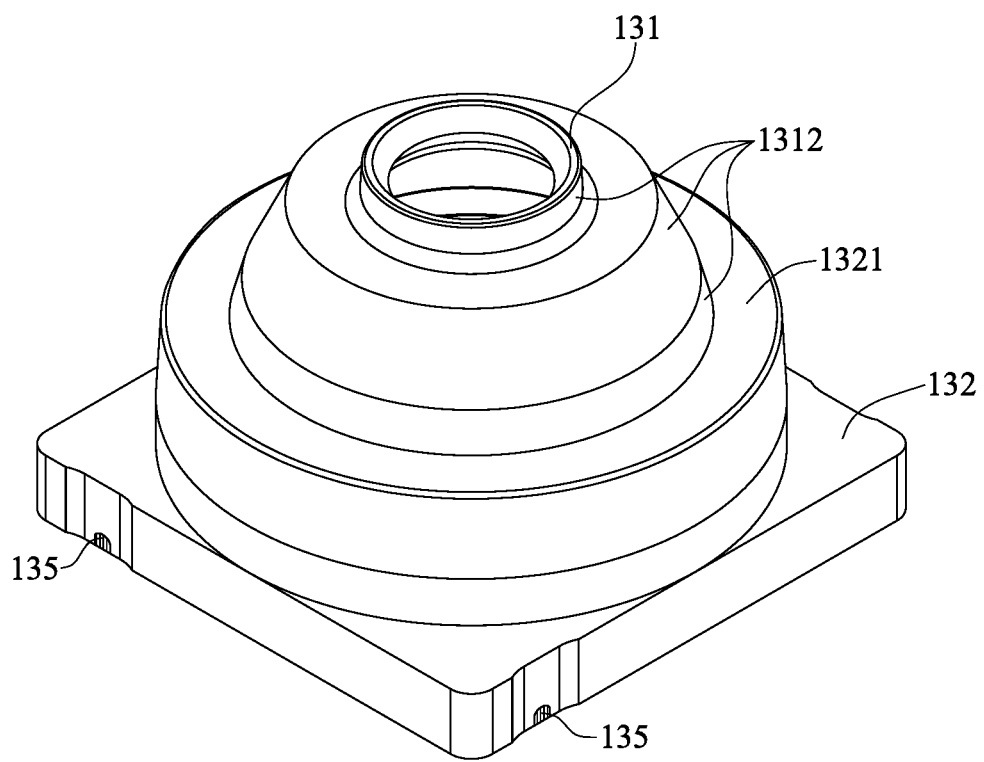
FIG. 8 is a perspective view of the plastic lens barrel of the imaging lens module in FIG. 6.
Figure 9:
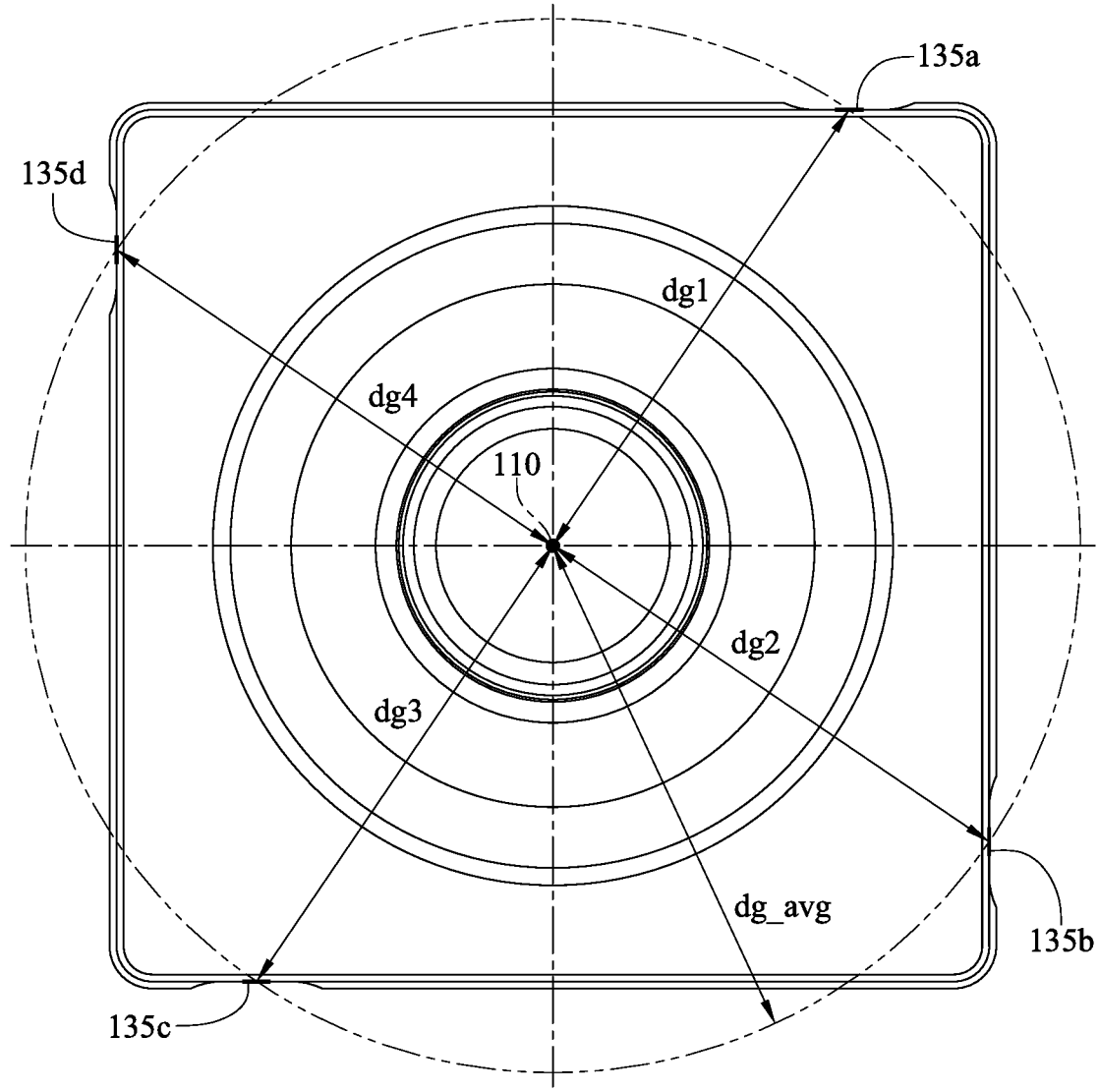
FIG. 9 is a top view of the plastic lens barrel of the imaging lens module in FIG. 6.
Figure 10:
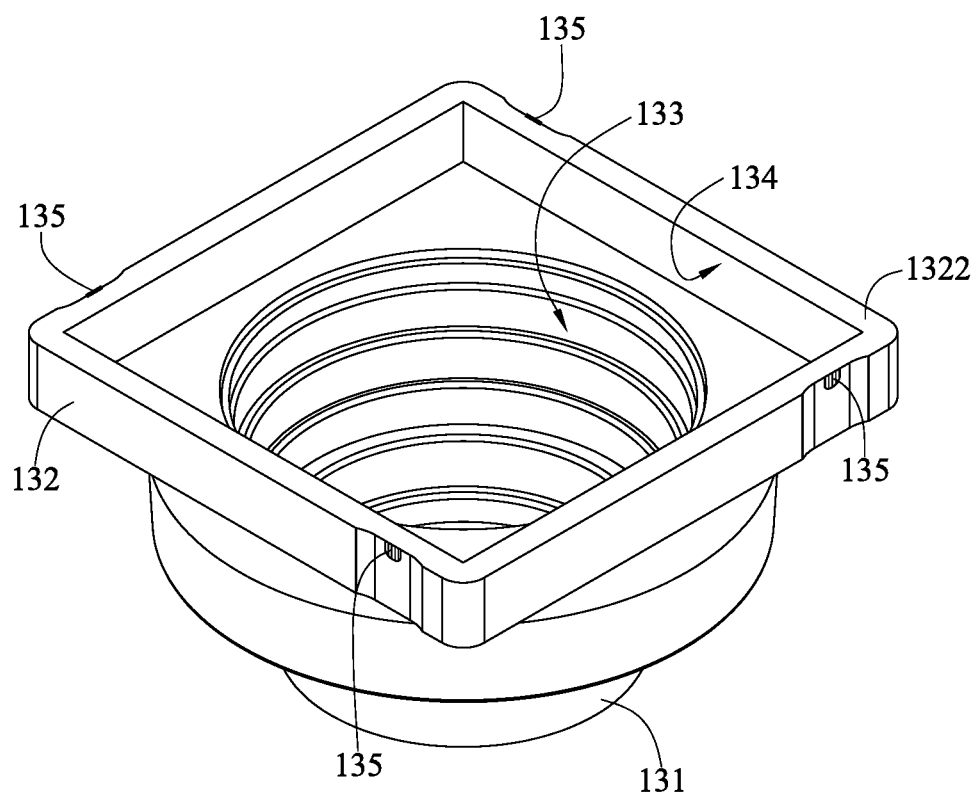
FIG. 10 is another perspective view of the plastic lens barrel of the imaging lens module in FIG. 6.
Figure 11:
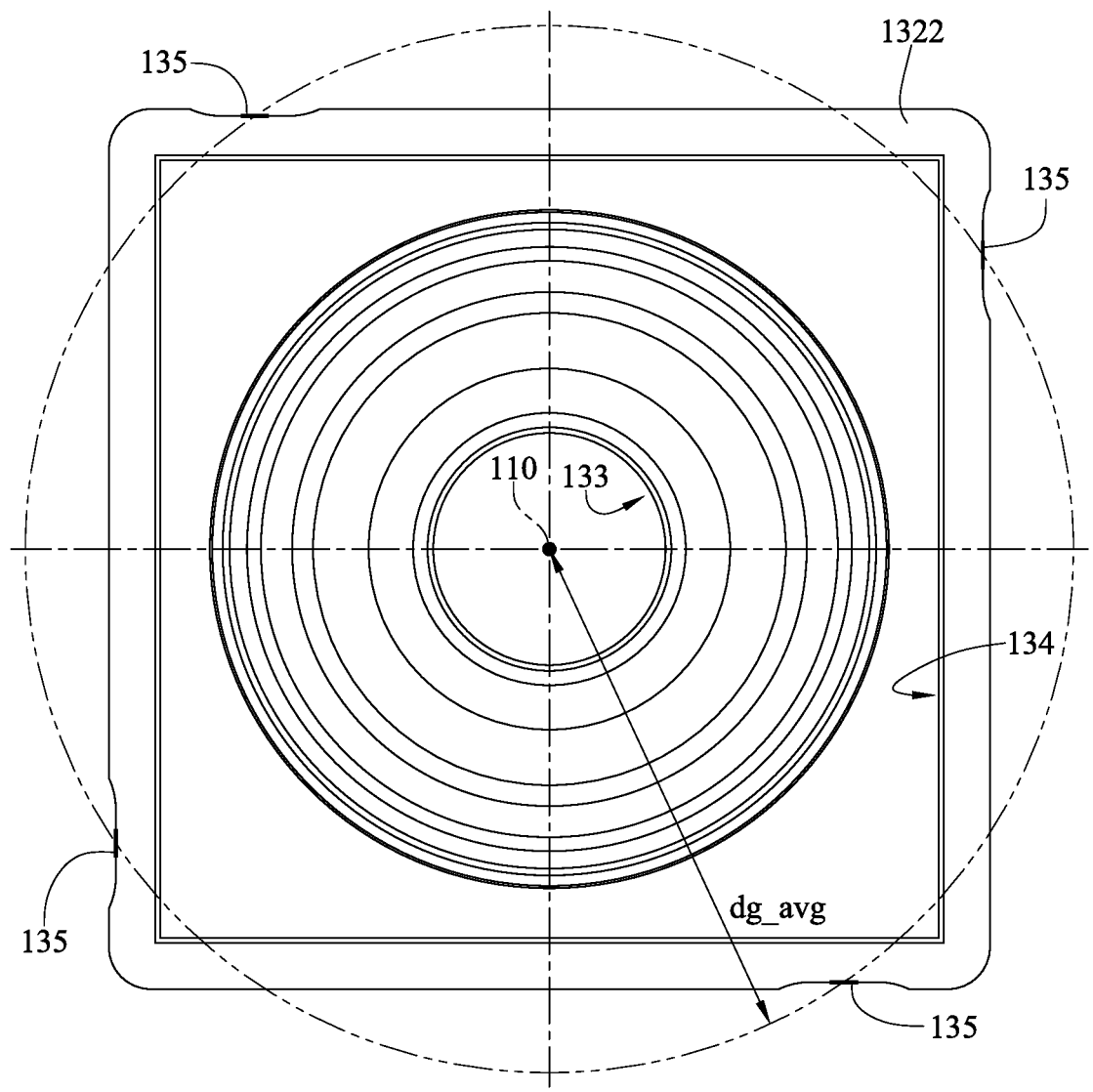
FIG. 11 is a bottom view of the plastic lens barrel of the imaging lens module in FIG. 6.
Figure 12:
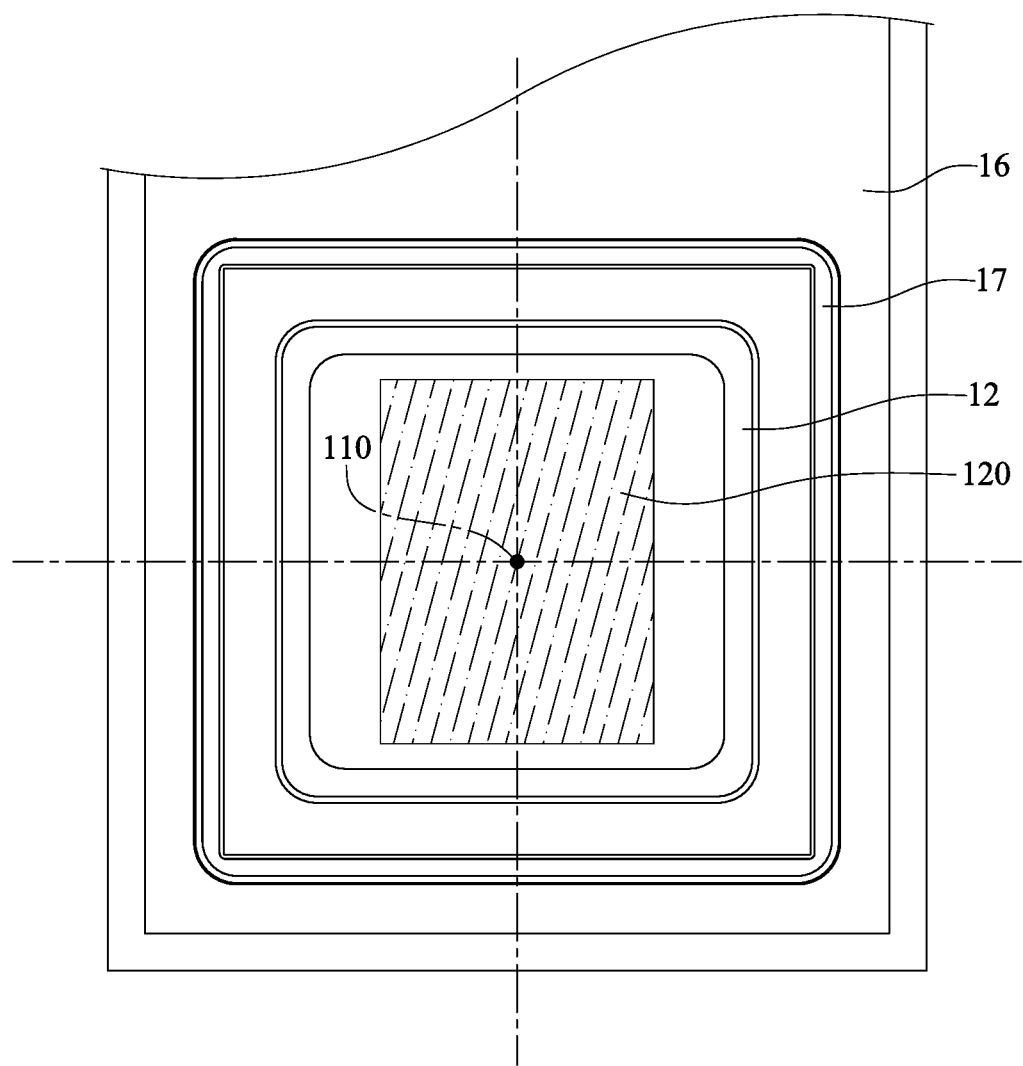
FIG. 12 is a front view of the image sensor of the imaging lens module with the circuit board and the substrate in FIG. 5.

Please refer to FIG. 1 to FIG. 12, where FIG. 1 is a perspective view of a partially sectioned imaging lens module and an image sensor thereof with a circuit board and a substrate according to the 1st embodiment of the present disclosure, FIG. 2 is a side view of the partially sectioned imaging lens module and the image sensor thereof with the circuit board and the substrate viewing from an AA direction in FIG. 1, FIG. 3 is a side view of the partially sectioned imaging lens module and the image sensor thereof with the circuit board and the substrate viewing from a BB direction in FIG. 1, FIG. 4 is a side view of the partially sectioned imaging lens module and the image sensor thereof with the circuit board and the substrate viewing from a CC direction in FIG. 1, FIG. 5 is an exploded view of the imaging lens module and the image sensor thereof with the circuit board and the substrate in FIG. 1, FIG. 6 is a cross-sectional view of the imaging lens module and the image sensor thereof with the circuit board and the substrate in FIG. 5, FIG. 7 is a cross-sectional view of a plastic lens barrel of the imaging lens module in FIG. 6, FIG. 8 is a perspective view of the plastic lens barrel of the imaging lens module in FIG. 6, FIG. 9 is a top view of the plastic lens barrel of the imaging lens module in FIG. 6, FIG. 10 is another perspective view of the plastic lens barrel of the imaging lens module in FIG. 6, FIG. 11 is a bottom view of the plastic lens barrel of the imaging lens module in FIG. 6, and FIG. 12 is a front view of the image sensor of the imaging lens module with the circuit board and the substrate in FIG. 5.

In this embodiment, an imaging lens module 10 is configured to be disposed on a circuit board 16 and a substrate 17, wherein the circuit board 16 is fixedly disposed on the substrate 17 by abutting thereon. The imaging lens module 10 includes an imaging lens assembly 11, an image sensor 12, and a plastic lens barrel 13. The imaging lens assembly 11 has an optical axis 110 and an image surface 119 and includes a plurality of optical elements 111, wherein the optical elements 111 include, for example, a lens element, an light-blocking element, an aperture stop, a stop, a spacer, a retainer, etc., and the present disclosure is not limited thereto. The optical axis 110 passes through the optical elements 111 and the image surface 119. The image sensor 12 is disposed on an image side of the imaging lens assembly 11, and the image sensor 12 has an image sensing surface 120 facing towards the imaging lens assembly 11. Specifically, the image sensing surface 120 is disposed on the image surface 119 of the imaging lens assembly 11, and the optical axis 110 passes through the image sensing surface 120. The image sensor 12 is electrically connected to the circuit board 16 so as to collaborate with the circuit board 16 and the substrate 17. The plastic lens barrel 13 accommodates the imaging lens assembly 11 and the image sensor 12. That is, both of the imaging lens assembly 11 and the image sensor 12 are disposed in the plastic lens barrel 13. The plastic lens barrel 13 is made of black plastic material and is an axisymmetric lens barrel (shown in FIG. 9 and FIG. 11) manufactured in one piece by injection molding, wherein the optical axis 110 substantially passes through the geometric center of the plastic lens barrel 13.

The minimum inner hole at an object side of the plastic lens barrel 13 forms an optical aperture 130 which surrounds the optical axis 110. The plastic lens barrel 13 includes an object-end portion 131, a bottom portion 132, a first inner hole portion 133, a second inner hole portion 134, and four gate traces 135. The bottom portion 132 is located on an image side of the object-end portion 131, the second inner hole portion 134 is located on an image side of the first inner hole portion 133, and the gate traces 135 are disposed on one side of the bottom portion 132 located away from the optical axis 110.

The object-end portion 131 has an object-end surface 1311 and three tapered surfaces 1312. The tapered surfaces 1312 are located on an image side of the object-end surface 1311. The object-end surface 1311 faces towards an object side direction of the imaging lens assembly 11. The tapered surfaces 1312 are tapered off towards the object-end surface 1311. The bottom portion 132 has a top surface 1321 and a bottom surface 1322. The bottom surface 1322 is located on an image side of the top surface 1321. Specifically, the bottom surface 1322 is substantially quadrilateral (shown in FIG. 10 and FIG. 11) and is located at a position of the bottom portion 132 farthest away from the object-end portion 131. The top surface 1321 and the bottom surface 1322 are disposed opposite to each other, and the image sensing surface 120 is located between the top surface 1321 and the bottom surface 1322.

The bore of the first inner hole portion 133 is substantially circular (shown in FIG. 10 and FIG. 11). The imaging lens assembly 11 is disposed in the first inner hole portion 133. Specifically, the first inner hole portion 133 has six inner parallel annular surfaces 1331. The six inner parallel annular surfaces 1331 are disposed in parallel with the optical axis 110, and the six inner parallel annular surfaces 1331 are respectively in physical contact with at least six of the optical elements 111 of the imaging lens assembly 11.

The bore of the second inner hole portion 134 is substantially rectangular (shown in FIG. 10 and FIG. 11). The second inner hole portion 134 includes an optical aligning structure 1341. A relative position between the image sensing surface 120 and the imaging lens assembly 11 is aligned by the optical aligning structure 1341. Specifically, the optical aligning structure 1341 has an inner bevel surface 1341a. The image sensor 12 is axially aligned with the optical aligning structure 1341 and aligned with the image surface 119 of the imaging lens assembly 11 through the slope of the inner bevel surface 1341a and the substrate 17 abutted on each other. In addition, the optical axis 110 is aligned with the geometric center of the image sensing surface 120 by the aforementioned axial alignment.

When minimum distances between each of the gate traces 135 (135a, 135b, 135c, and 135d) and the optical axis 110 are respectively dg1, dg2, dg3, and dg4, the following conditions are satisfied: dg1=dg2=dg3=dg4=3.77 [mm]. When an average value of the minimum distances dg1, dg2, dg3, and dg4 is dg_avg=(Σdgi)/4, wherein i=1, 2, 3, and 4, the following condition is satisfied: dg_avg=3.77 [mm]. When a standard deviation of the minimum distances dg1, dg2, dg3, and dg4 between each of the gate traces 135 and the optical axis 110 is dg_std=√{[Σ(dgi−dg_avg)$^2$]/4}, wherein i=1, 2, 3, and 4, the following condition is satisfied: dg_std=0 [mm]. When a diameter of the optical aperture 130 of the imaging lens module 10 is ϕs, the following condition is satisfied: ϕs=1.67 [mm].

When a length of the second inner hole portion 134 in a direction in parallel with the optical axis 110 is Lr, the following condition is satisfied: Lr=0.7 [mm].

When an area surrounded by the object-end surface 1311 is Af, and an area surrounded by the bottom portion 132 is Ab, the following condition is satisfied: Af/Ab=0.09, wherein Af=3.61 [mm$^2$], and Ab=39.91 [mm$^2$].

When angles between each of the tapered surfaces 1312 (1312a, 1312b, and 1312c) and the optical axis 110 are α1, α2, and α3, the following conditions are satisfied: α1=3 [deg.]; α2=25 [deg.]; and α3=15 [deg.].

2nd Embodiment

Figure 13:
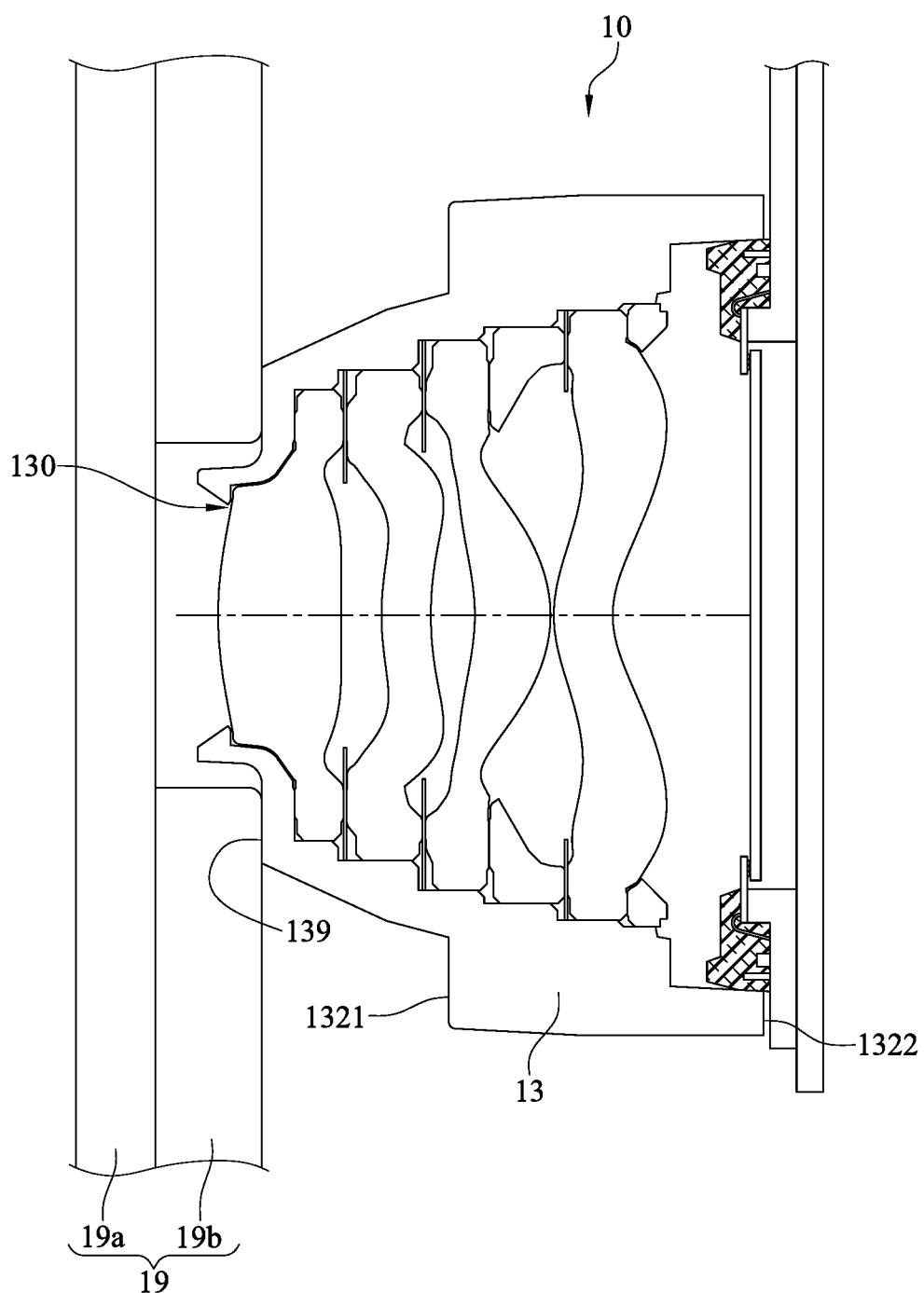
FIG. 13 is a partial and cross-sectional view of an electronic device and an image sensor thereof with a circuit board and a substrate according to the 2nd embodiment of the present disclosure.

Please refer to FIG. 13, which is a partial and cross-sectional view of an electronic device and an image sensor thereof with a circuit board and a substrate according to the 2nd embodiment of the present disclosure. Note that only the differences between this and the previous embodiment are illustrated hereinafter.

In this embodiment, an electronic device 1 includes the imaging lens module 10 disclosed in the 1st embodiment and a display module 19. The display module 19 is located on an object side of the imaging lens module 10. Specifically, the display module 19 includes a glass substrate 19a and a backlight panel 19b, and the glass substrate 19a is located on an object side of the backlight panel 19b and the object side of the imaging lens module 10. The plastic lens barrel 13 of the imaging lens module 10 further includes a step surface 139 disposed opposite to the bottom surface 1322, and the top surface 1321 is located between the step surface 139 and the bottom surface 1322. The backlight panel 19b of the display module 19 abuts on the step surface 139 of the plastic lens barrel 13, and the optical aperture 130 is located in the gap range of the backlight panel 19b and is exposed by the glass substrate 19a.

3rd Embodiment

Figure 14:
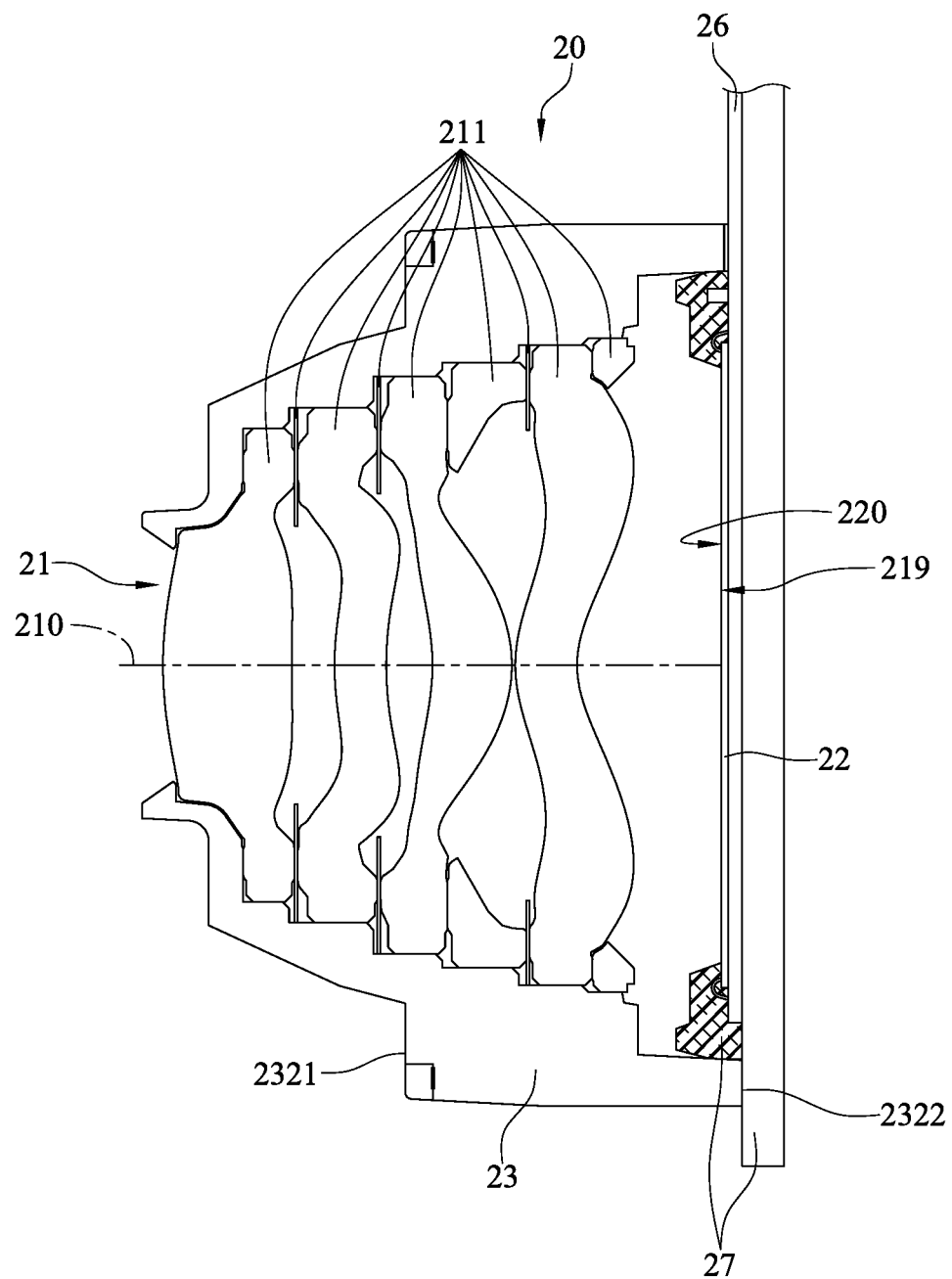
FIG. 14 is a cross-sectional view of an imaging lens module and an image sensor thereof with a circuit board and a substrate according to the 3rd embodiment of the present disclosure.
Figure 15:
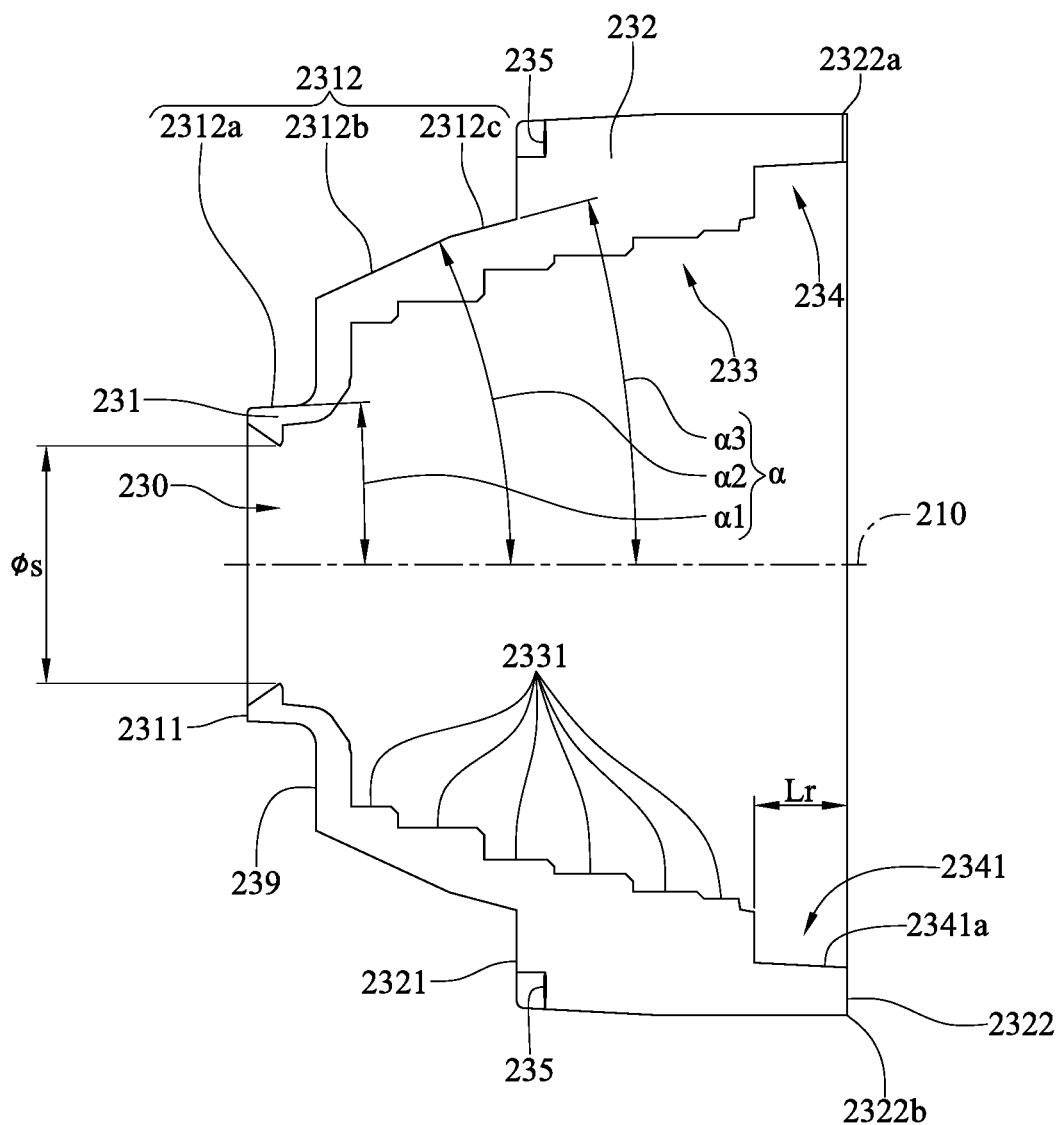
FIG. 15 is a cross-sectional view of a plastic lens barrel of the imaging lens module in FIG. 14.
Figure 16:
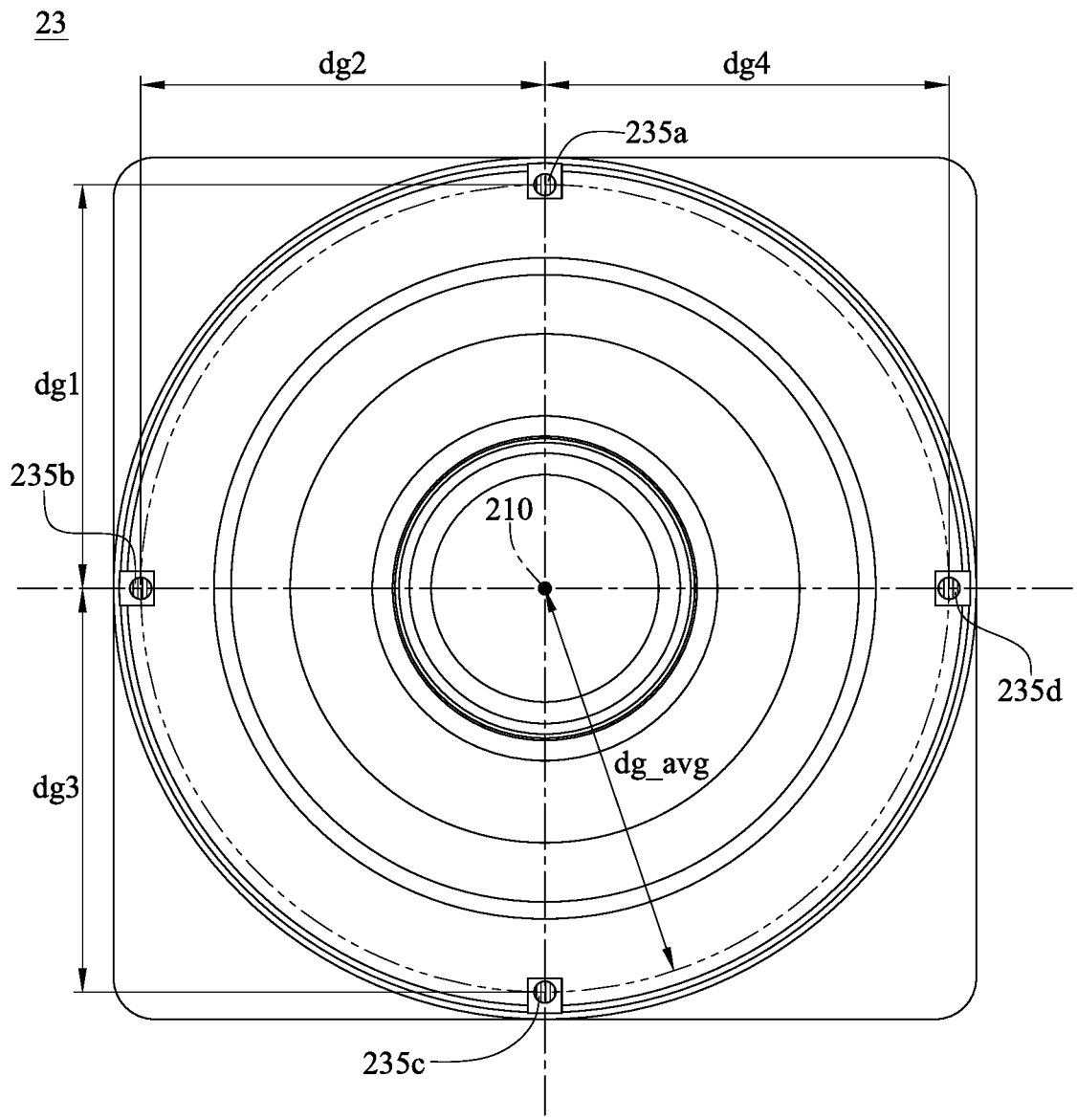
FIG. 16 is a top view of the plastic lens barrel of the imaging lens module in FIG. 14.
Figure 17:
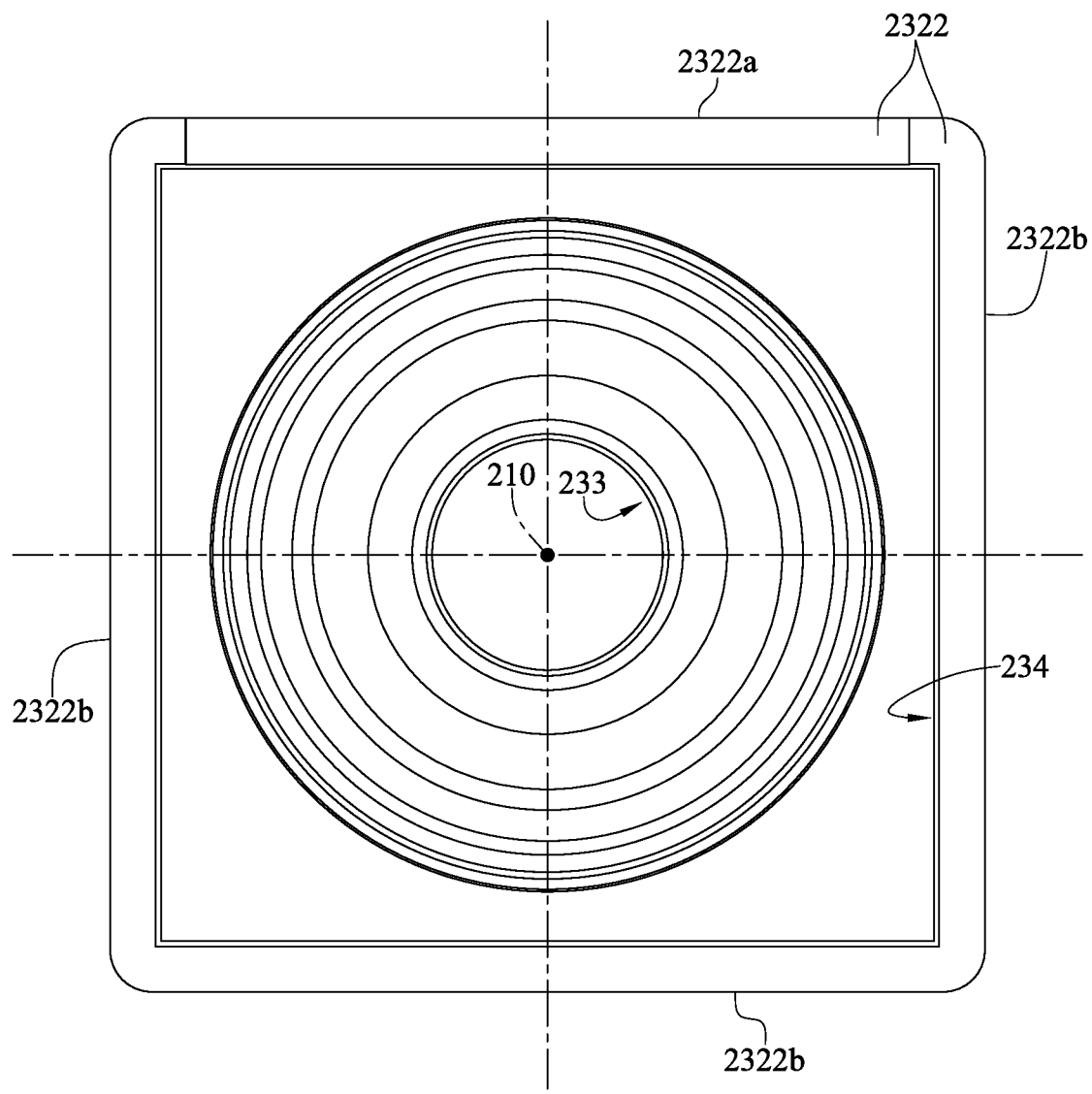
FIG. 17 is a bottom view of the plastic lens barrel of the imaging lens module in FIG. 14.
Figure 18:
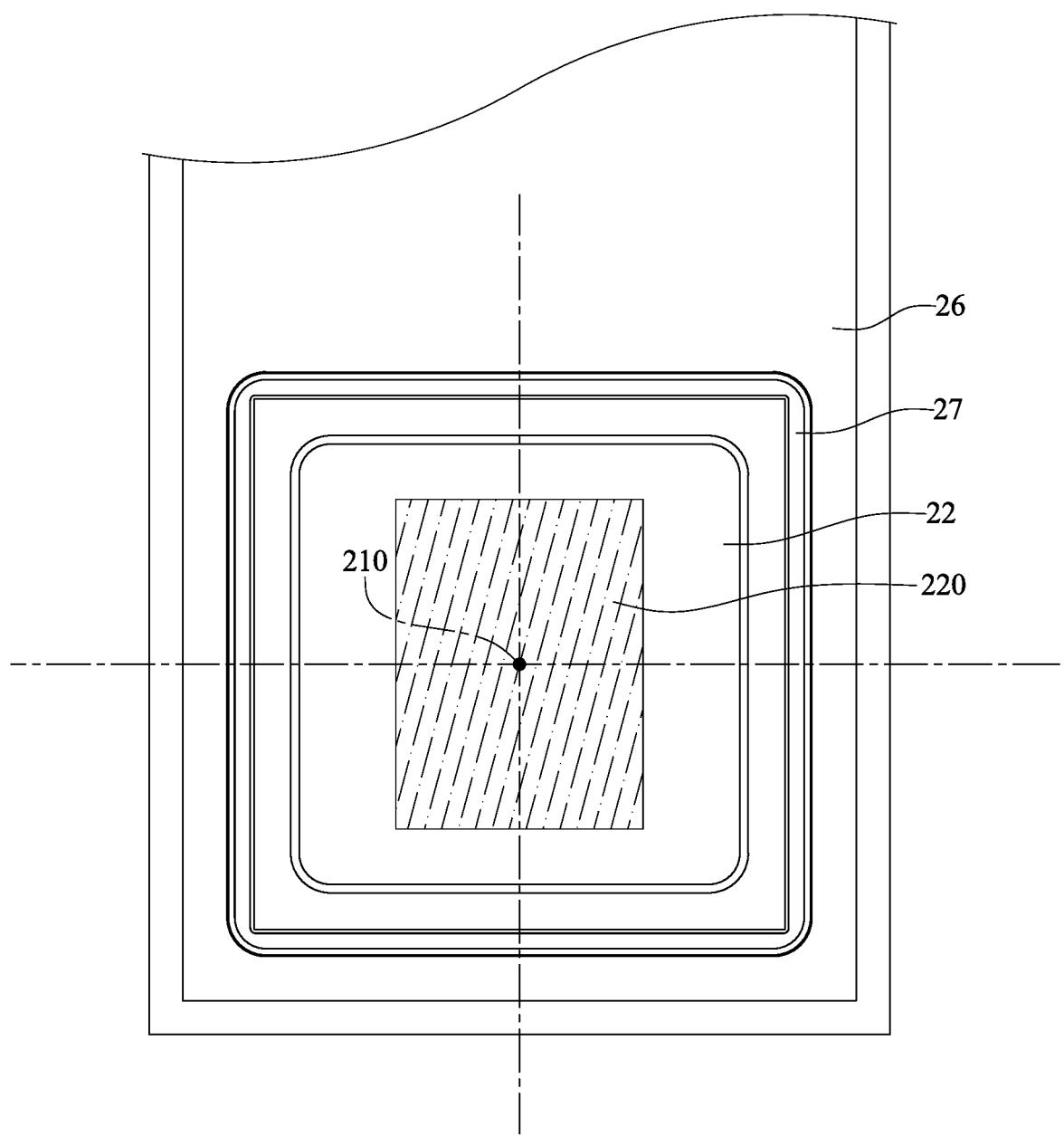
FIG. 18 is a front view of the image sensor of the imaging lens module with the circuit board and the substrate in FIG. 14.

Please refer to FIG. 14 to FIG. 18, where FIG. 14 is a cross-sectional view of an imaging lens module and an image sensor thereof with a circuit board and a substrate according to the 3rd embodiment of the present disclosure, FIG. 15 is a cross-sectional view of a plastic lens barrel of the imaging lens module in FIG. 14, FIG. 16 is a top view of the plastic lens barrel of the imaging lens module in FIG. 14, FIG. 17 is a bottom view of the plastic lens barrel of the imaging lens module in FIG. 14, and FIG. 18 is a front view of the image sensor of the imaging lens module with the circuit board and the substrate in FIG. 14.

In this embodiment, an imaging lens module 20 is configured to be disposed on a circuit board 26 and a substrate 27, wherein the circuit board 26 is fixedly disposed on the substrate 27 by abutting thereon. The imaging lens module 20 includes an imaging lens assembly 21, an image sensor 22, and a plastic lens barrel 23. The imaging lens assembly 21 has an optical axis 210 and an image surface 219 and includes a plurality of optical elements 211, wherein the optical elements 211 include, for example, a lens element, an light-blocking element, an aperture stop, a stop, a spacer, a retainer, etc., and the present disclosure is not limited thereto. The optical axis 210 passes through the optical elements 211 and the image surface 219. The image sensor 22 is disposed on an image side of the imaging lens assembly 21, and the image sensor 22 has an image sensing surface 220 facing towards the imaging lens assembly 21. Specifically, the image sensing surface 220 is disposed on the image surface 219 of the imaging lens assembly 21, and the optical axis 210 passes through the image sensing surface 220. The image sensor 22 is electrically connected to the circuit board 26 so as to collaborate with the circuit board 26 and the substrate 27. The plastic lens barrel 23 accommodates the imaging lens assembly 21 and the image sensor 22. That is, both of the imaging lens assembly 21 and the image sensor 22 are disposed in the plastic lens barrel 23. The plastic lens barrel 23 is made of black plastic material and is an axisymmetric lens barrel (shown in FIG. 16 and FIG. 17) manufactured in one piece by injection molding, wherein the optical axis 210 substantially passes through the geometric center of the plastic lens barrel 23.

The minimum inner hole at an object side of the plastic lens barrel 23 forms an optical aperture 230 which surrounds the optical axis 210. The plastic lens barrel 23 includes an object-end portion 231, a bottom portion 232, a first inner hole portion 233, a second inner hole portion 234, and four gate traces 235. The bottom portion 232 is located on an image side of the object-end portion 231, the second inner hole portion 234 is located on an image side of the first inner hole portion 233, and the gate traces 235 are disposed on one side of the bottom portion 232 located away from the optical axis 210.

The object-end portion 231 has an object-end surface 2311 and three tapered surfaces 2312. The tapered surfaces 2312 are located on an image side of the object-end surface 2311. The object-end surface 2311 faces towards an object side direction of the imaging lens assembly 21. The tapered surfaces 2312 are tapered off towards the object-end surface 2311. The bottom portion 232 has a top surface 2321 and a bottom surface 2322. The bottom surface 2322 is located on an image side of the top surface 2321. Specifically, the bottom surface 2322 is substantially quadrilateral (shown in FIG. 17) and is located at a position of the bottom portion 232 farthest away from the object-end portion 231. The top surface 2321 and the bottom surface 2322 are disposed opposite to each other, and the image sensing surface 220 is located between the top surface 2321 and the bottom surface 2322. One side 2322a of the bottom surface 2322 is located closer to the object-end surface 2311 than the other sides 2322b thereof.

The bore of the first inner hole portion 233 is substantially circular (shown in FIG. 17). The imaging lens assembly 21 is disposed in the first inner hole portion 233. Specifically, the first inner hole portion 233 has six inner parallel annular surfaces 2331. The six inner parallel annular surfaces 2331 are disposed in parallel with the optical axis 210, and the six inner parallel annular surfaces 2331 are respectively in physical contact with at least six of the optical elements 211 of the imaging lens assembly 21.

The bore of the second inner hole portion 234 is substantially rectangular (shown in FIG. 17). The second inner hole portion 234 includes an optical aligning structure 2341. A relative position between the image sensing surface 220 and the imaging lens assembly 21 is aligned by the optical aligning structure 2341. Specifically, the optical aligning structure 2341 has an inner bevel surface 2341a. The image sensor 22 is axially aligned with the optical aligning structure 2341 and aligned with the image surface 219 of the imaging lens assembly 21 through the slope of the inner bevel surface 2341a and the substrate 27 abutted on each other. In addition, the optical axis 210 is aligned with the geometric center of the image sensing surface 220 by the aforementioned axial alignment.

When minimum distances between each of the gate traces 235 (235a, 235b, 235c, and 235d) and the optical axis 210 are respectively dg1, dg2, dg3, and dg4, the following conditions are satisfied: dg1=dg2=dg3=dg4=2.97 [mm]. When an average value of the minimum distances dg1, dg2, dg3, and dg4 is dg_avg=(Σdgi)/4, wherein i=1, 2, 3, and 4, the following condition is satisfied: dg_avg=2.97 [mm]. When a standard deviation of the minimum distances dg1, dg2, dg3, and dg4 between each of the gate traces 235 and the optical axis 210 is dg_std=√{[Σ(dgi−dg_avg)$^2$]/4}, wherein i=1, 2, 3, and 4, the following condition is satisfied: dg_std=0 [mm]. When a diameter of the optical aperture 230 of the imaging lens module 20 is φs, the following condition is satisfied: φs=1.67 [mm].

When a length of the second inner hole portion 234 in a direction in parallel with the optical axis 210 is Lr, the following condition is satisfied: Lr=0.75 [mm].

When an area surrounded by the object-end surface 2311 is Af, and an area surrounded by the bottom portion 232 is Ab, the following condition is satisfied: Af/Ab=0.09, wherein Af=3.61 [mm$^2$], and Ab=40.07 [mm$^2$].

When angles between each of the tapered surfaces 2312 (2312a, 2312b, and 2312c) and the optical axis 210 are α1, α2, and α3, the following conditions are satisfied: α1=3 [deg.]; α2=25 [deg.]; and α3=15 [deg.].

4th Embodiment

Figure 19:
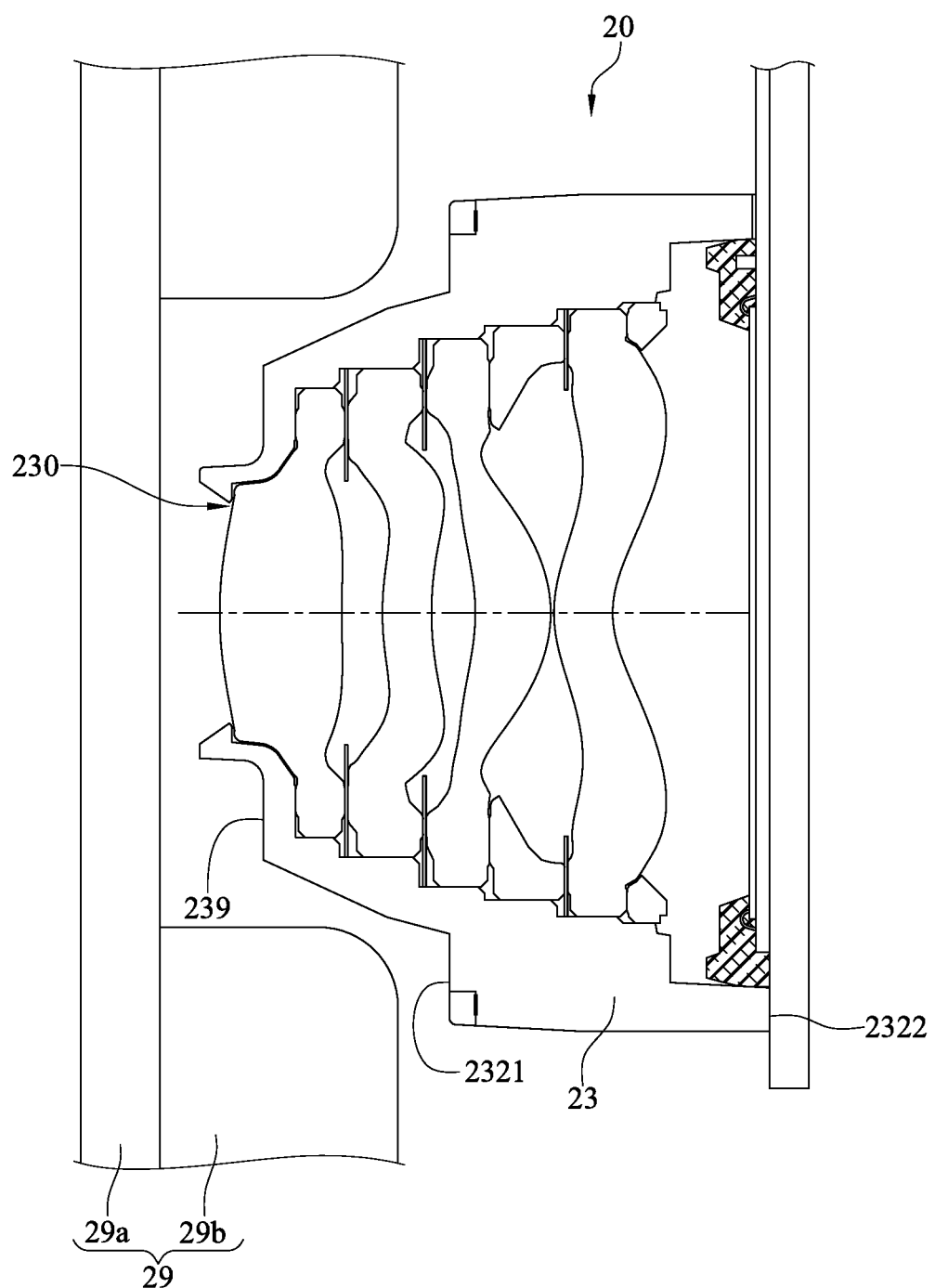
FIG. 19 is a partial and cross-sectional view of an electronic device and an image sensor thereof with a circuit board and a substrate according to the 4th embodiment of the present disclosure.

Please refer to FIG. 19, which is a partial and cross-sectional view of an electronic device and an image sensor thereof with a circuit board and a substrate according to the 4th embodiment of the present disclosure. Note that only the differences between this and the previous embodiment are illustrated hereinafter.

In this embodiment, an electronic device 2 includes the imaging lens module 20 disclosed in the 3rd embodiment and a display module 29. The display module 29 is located on an object side of the imaging lens module 20. Specifically, the display module 29 includes a glass substrate 29a and a backlight panel 29b, and the glass substrate 29a is located on an object side of the backlight panel 29b and the object side of the imaging lens module 20. The plastic lens barrel 23 of the imaging lens module 20 further includes a step surface 239 disposed opposite to the bottom surface 2322, and the top surface 2321 is located between the step surface 239 and the bottom surface 2322. The backlight panel 29b of the display module 29 indirectly abuts on the top surface 2321 of the plastic lens barrel 23 through a spacer (not shown), and the optical aperture 230 and the step surface 239 are located in the gap range of the backlight panel 29b and are exposed by the glass substrate 29a.

5th Embodiment

Figure 20:
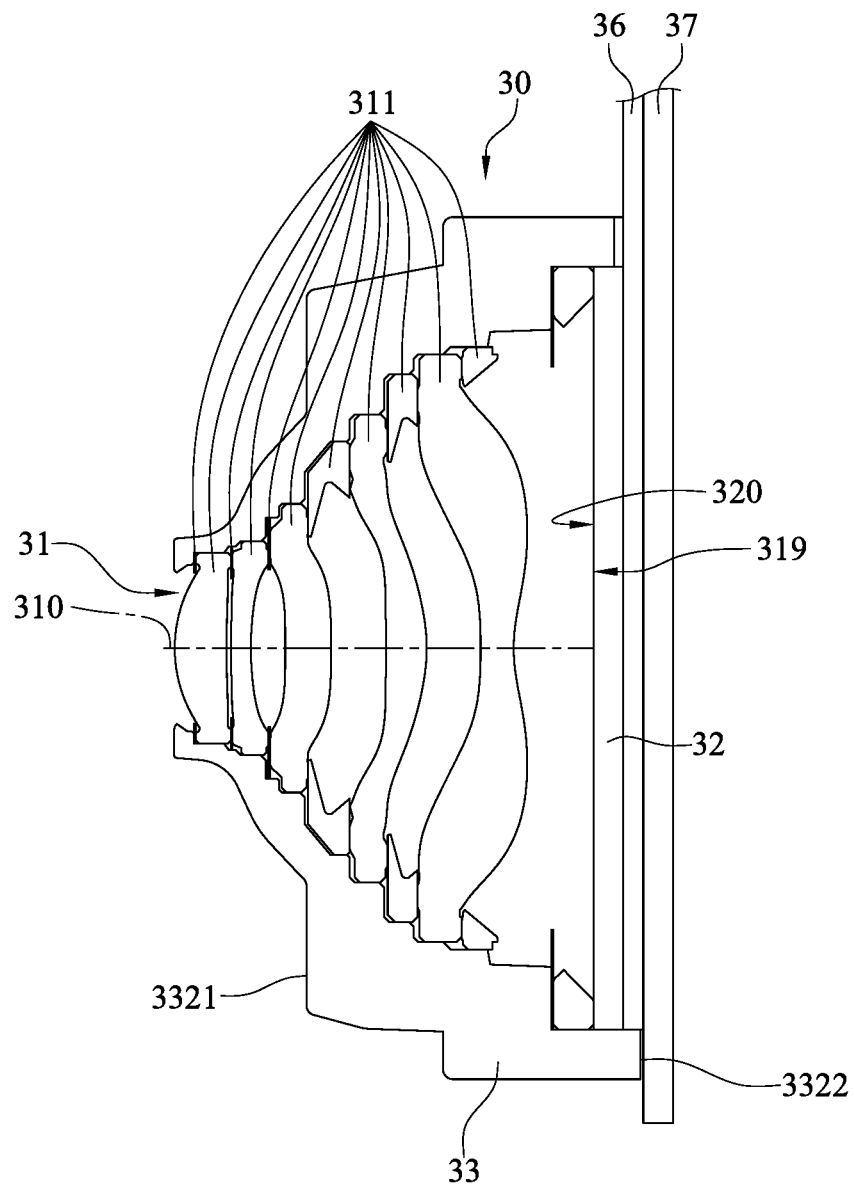
FIG. 20 is a cross-sectional view of an imaging lens module and an image sensor thereof with a circuit board and a substrate according to the 5th embodiment of the present disclosure.
Figure 21:
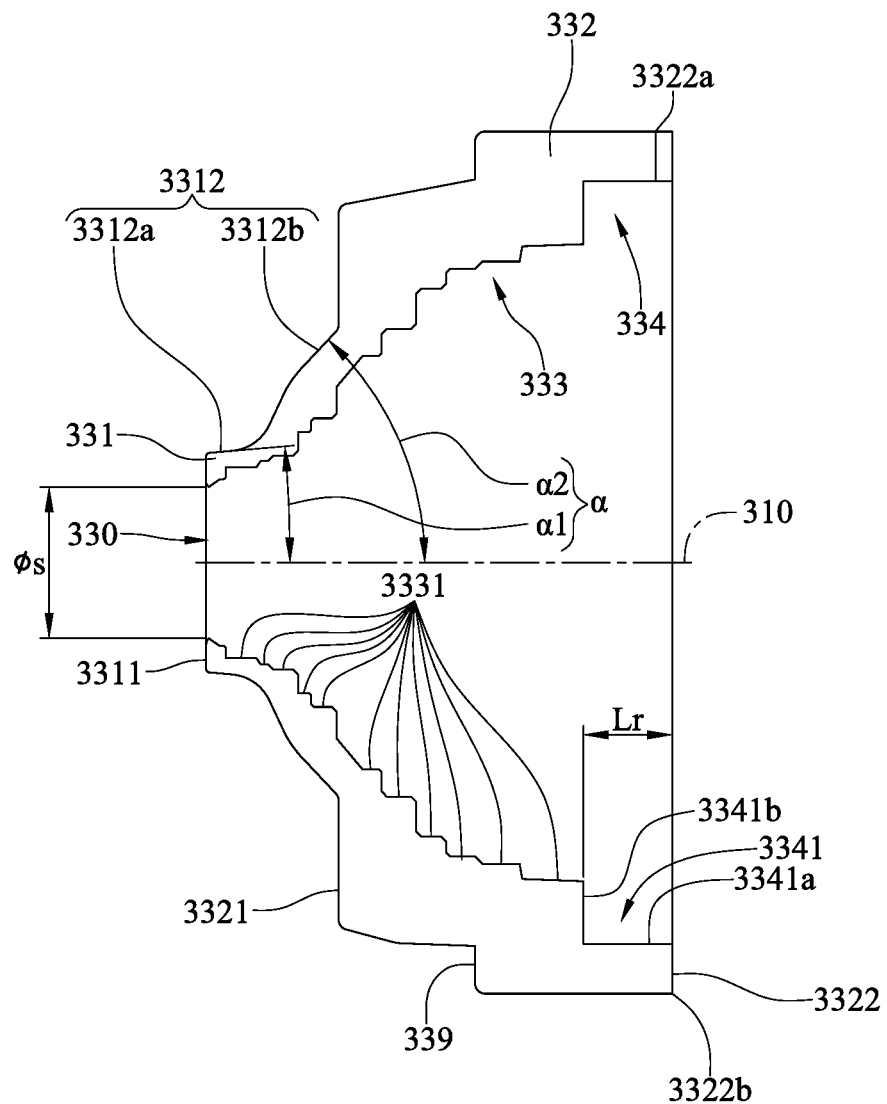
FIG. 21 is a cross-sectional view of a plastic lens barrel of the imaging lens module in FIG. 20.
Figure 22:
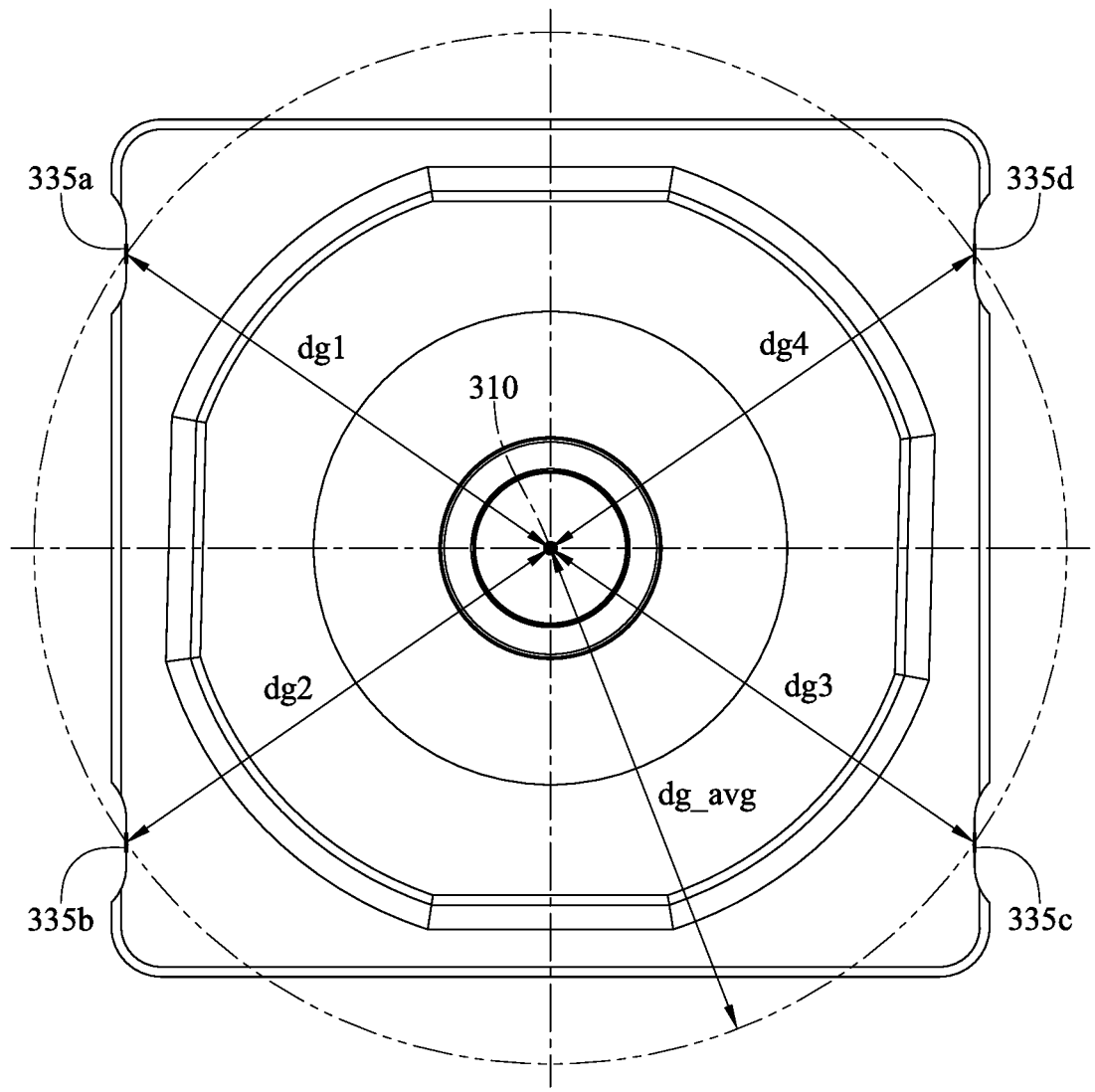
FIG. 22 is a top view of the plastic lens barrel of the imaging lens module in FIG. 20.
Figure 23:
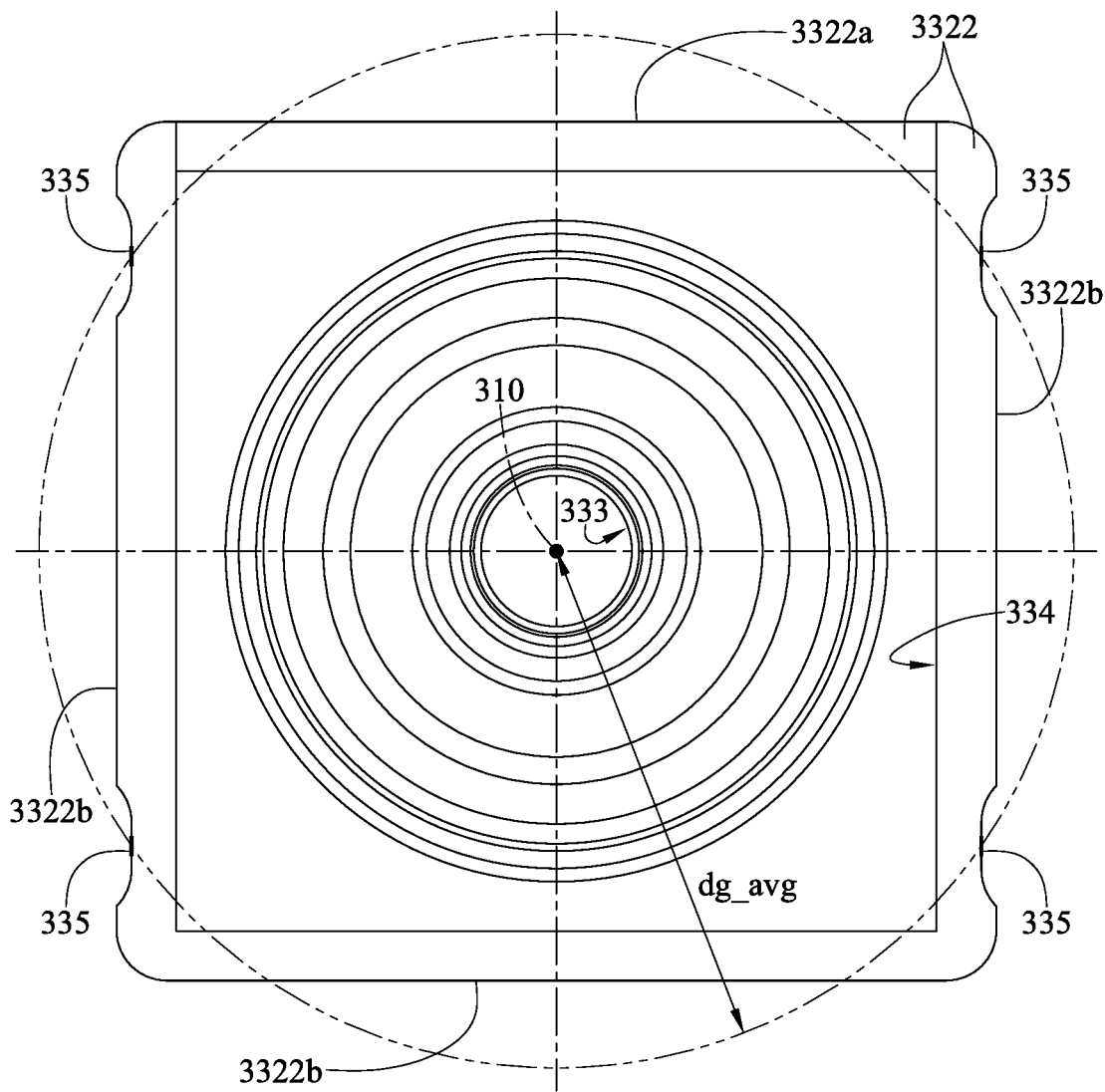
FIG. 23 is a bottom view of the plastic lens barrel of the imaging lens module in FIG. 20.
Figure 24:
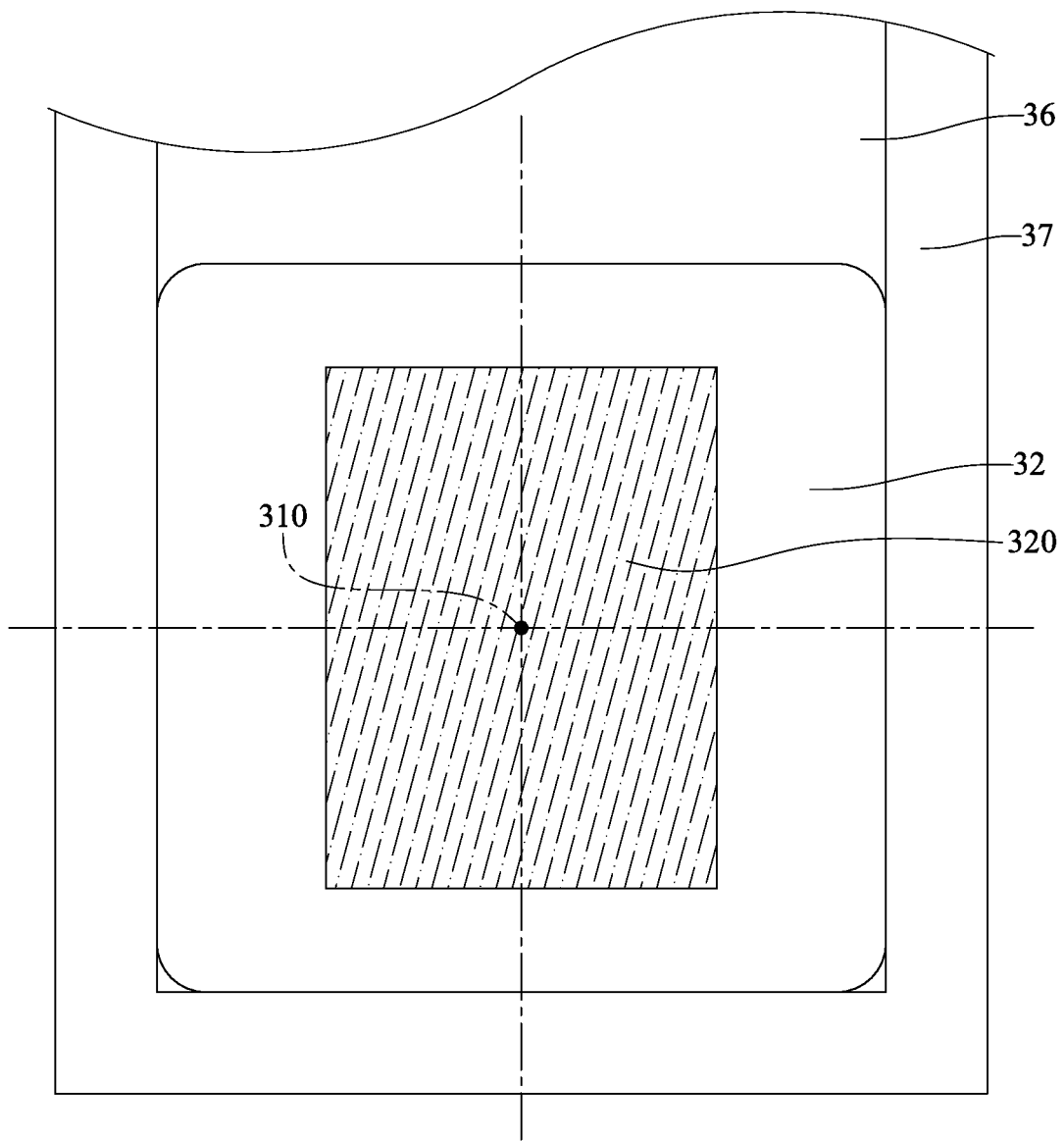
FIG. 24 is a front view of the image sensor of the imaging lens module with the circuit board and the substrate in FIG. 20.

Please refer to FIG. 20 to FIG. 24, where FIG. 20 is a cross-sectional view of an imaging lens module and an image sensor thereof with a circuit board and a substrate according to the 5th embodiment of the present disclosure, FIG. 21 is a cross-sectional view of a plastic lens barrel of the imaging lens module in FIG. 20, FIG. 22 is a top view of the plastic lens barrel of the imaging lens module in FIG. 20, FIG. 23 is a bottom view of the plastic lens barrel of the imaging lens module in FIG. 20, and FIG. 24 is a front view of the image sensor of the imaging lens module with the circuit board and the substrate in FIG. 20.

In this embodiment, an imaging lens module 30 is configured to be disposed on a circuit board 36 and a substrate 37, wherein the circuit board 36 is disposed on the substrate 37 and is located between the imaging lens module 30 and the substrate 37. The imaging lens module 30 includes an imaging lens assembly 31, an image sensor 32, and a plastic lens barrel 33. The imaging lens assembly 31 has an optical axis 310 and an image surface 319 and includes a plurality of optical elements 311, wherein the optical elements 311 include, for example, a lens element, an light-blocking element, an aperture stop, a stop, a spacer, a retainer, etc., and the present disclosure is not limited thereto. The optical axis 310 passes through the optical elements 311 and the image surface 319. The image sensor 32 is disposed on an image side of the imaging lens assembly 31, and the image sensor 32 has an image sensing surface 320 facing towards the imaging lens assembly 31. Specifically, the image sensing surface 320 is disposed on the image surface 319 of the imaging lens assembly 31, and the optical axis 310 passes through the image sensing surface 320. The image sensor 32 is electrically connected to the circuit board 36 so as to collaborate with the circuit board 36 and the substrate 37. The plastic lens barrel 33 accommodates the imaging lens assembly 31 and the image sensor 32. That is, both of the imaging lens assembly 31 and the image sensor 32 are disposed in the plastic lens barrel 33. The plastic lens barrel 33 is made of black plastic material and is an axisymmetric lens barrel (shown in FIG. 22 and FIG. 23) manufactured in one piece by injection molding, wherein the optical axis 310 substantially passes through the geometric center of the plastic lens barrel 33.

The minimum inner hole at an object side of the plastic lens barrel 33 forms an optical aperture 330 which surrounds the optical axis 310. The plastic lens barrel 33 includes an object-end portion 331, a bottom portion 332, a first inner hole portion 333, a second inner hole portion 334, and four gate traces 335. The bottom portion 332 is located on an image side of the object-end portion 331, the second inner hole portion 334 is located on an image side of the first inner hole portion 333, and the gate traces 335 are disposed on one side of the bottom portion 332 located away from the optical axis 310.

The object-end portion 331 has an object-end surface 3311 and two tapered surfaces 3312. The tapered surfaces 3312 are located on an image side of the object-end surface 3311. The object-end surface 3311 faces towards an object side direction of the imaging lens assembly 31. The tapered surfaces 3312 are tapered off towards the object-end surface 3311. The bottom portion 332 has a top surface 3321 and a bottom surface 3322. The bottom surface 3322 is located on an image side of the top surface 3321. Specifically, the bottom surface 3322 is substantially quadrilateral (shown in FIG. 23) and is located at a position of the bottom portion 332 farthest away from the object-end portion 331. The top surface 3321 and the bottom surface 3322 are disposed opposite to each other, and the image sensing surface 320 is located between the top surface 3321 and the bottom surface 3322. One side 3322a of the bottom surface 3322 is located closer to the object-end surface 3311 than the other sides 3322b thereof.

The bore of the first inner hole portion 333 is substantially circular (shown in FIG. 23). The imaging lens assembly 31 is disposed in the first inner hole portion 333. Specifically, the first inner hole portion 333 has ten inner parallel annular surfaces 3331. The ten inner parallel annular surfaces 3331 are disposed in parallel with the optical axis 310, and the ten inner parallel annular surfaces 3331 are respectively in physical contact with at least ten of the optical elements 311 of the imaging lens assembly 31.

The bore of the second inner hole portion 334 is substantially rectangular (shown in FIG. 23). The second inner hole portion 334 includes an optical aligning structure 3341. A relative position between the image sensing surface 320 and the imaging lens assembly 31 is aligned by the optical aligning structure 3341. Specifically, the optical aligning structure 3341 has an inner bevel surface 3341a and an inner flat surface 3341b, wherein the inner flat surface 3341b extends in a direction perpendicular to the optical axis 310 and the inner flat surface 3341b and the inner bevel surface 3341a are angled to each other. The image sensor 32 is axially aligned with the optical aligning structure 3341 through the inner bevel surface 3341a and the image sensor 32 abutted on each other. The axial position of the image sensor 32 (e.g., the relative position between the image sensing surface 320 and the imaging lens assembly 31 in a direction in parallel with the optical axis 310) is maintained through the inner flat surface 3341b and the image sensor 32 indirectly abutted on each other via at least one of the optical elements 311 located therebetween. Accordingly, the image sensor 32 is aligned with the image surface 319 of the imaging lens assembly 31, and the optical axis 310 is perpendicular to the image sensing surface 320 in a non-skew manner. In addition, the optical axis 310 is aligned with the geometric center of the image sensing surface 320 by the aforementioned axial alignment.

When minimum distances between each of the gate traces 335 (335a, 335b, 335c, and 335d) and the optical axis 310 are respectively dg1, dg2, dg3, and dg4, the following conditions are satisfied: dg1=dg2=dg3=dg4=5.21 [mm]. When an average value of the minimum distances dg1, dg2, dg3, and dg4 is dg_avg=(Σdgi)/4, wherein i=1, 2, 3, and 4, the following condition is satisfied: dg_avg=5.21 [mm]. When a standard deviation of the minimum distances dg1, dg2, dg3, and dg4 between each of the gate traces 335 and the optical axis 310 is dg_std=√{[Σ(dgi−dg_avg)$^2$]/4}, wherein i=1, 2, 3, and 4, the following condition is satisfied: dg_std=0 [mm]. When a diameter of the optical aperture 330 of the imaging lens module 30 is ϕs, the following condition is satisfied: ϕs=1.52 [mm].

When a length of the second inner hole portion 334 in the direction in parallel with the optical axis 310 is Lr, the following condition is satisfied: Lr=0.893 [mm].

When an area surrounded by the object-end surface 3311 is Af, and an area surrounded by the bottom portion 332 is Ab, the following condition is satisfied: Af/Ab=0.05, wherein Af=3.61 [mm$^2$], and Ab=74.78 [mm$^2$].

When angles between each of the tapered surfaces 3312 (3312a and 3312b) and the optical axis 310 are α1 and α2, the following conditions are satisfied: α1=5 [deg.]; and α2=47 [deg.].

6th Embodiment

Figure 25:
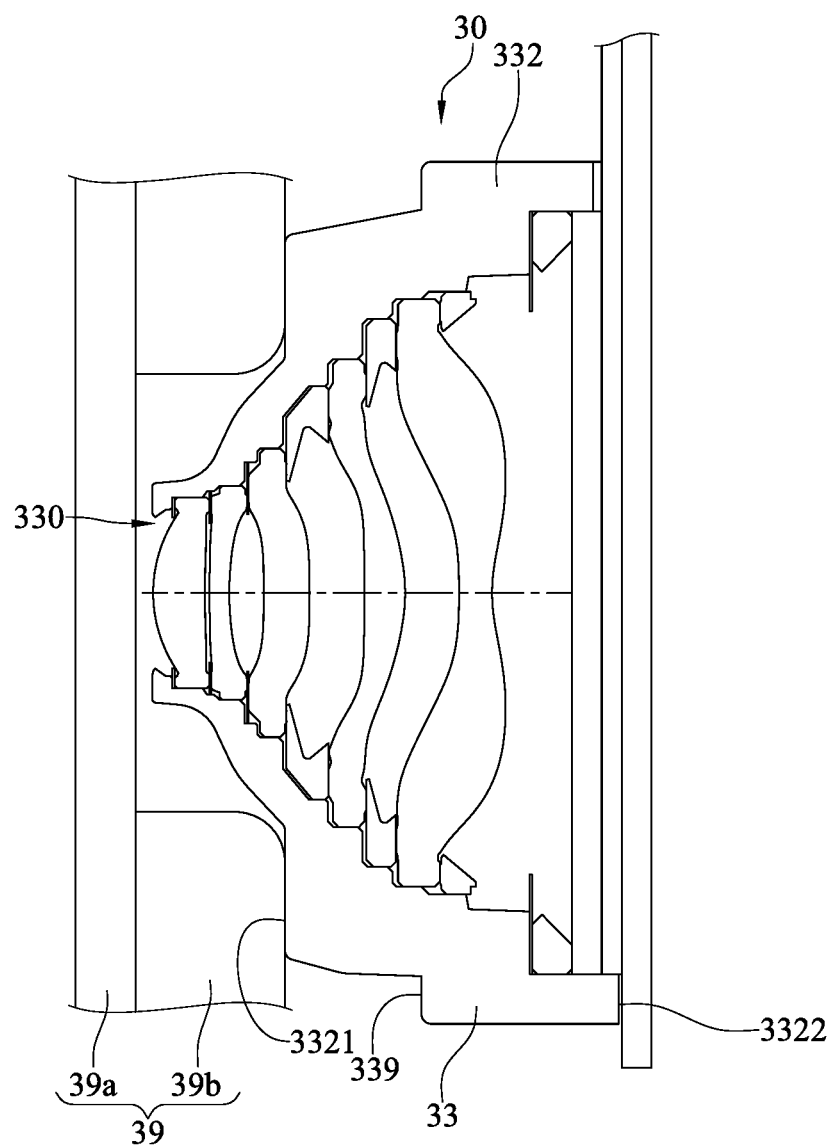
FIG. 25 is a partial and cross-sectional view of an electronic device and an image sensor thereof with a circuit board and a substrate according to the 6th embodiment of the present disclosure.

Please refer to FIG. 25, which is a partial and cross-sectional view of an electronic device and an image sensor thereof with a circuit board and a substrate according to the 6th embodiment of the present disclosure. Note that only the differences between this and the previous embodiment are illustrated hereinafter.

In this embodiment, an electronic device 3 includes the imaging lens module 30 disclosed in the 5th embodiment and a display module 39. The display module 39 is located on an object side of the imaging lens module 30. Specifically, the display module 39 includes a glass substrate 39a and a backlight panel 39b, and the glass substrate 39a is located on an object side of the backlight panel 39b and the object side of the imaging lens module 30. The plastic lens barrel 33 of the imaging lens module 30 further includes a step surface 339 disposed opposite to the bottom surface 3322, and the step surface 339 is located between the top surface 3321 and the bottom surface 3322. The backlight panel 39b of the display module 39 abuts on the top surface 3321 of the plastic lens barrel 33, and the optical aperture 330 is located in the gap range of the backlight panel 39b and are exposed by the glass substrate 39a.

7th Embodiment

Figure 26:
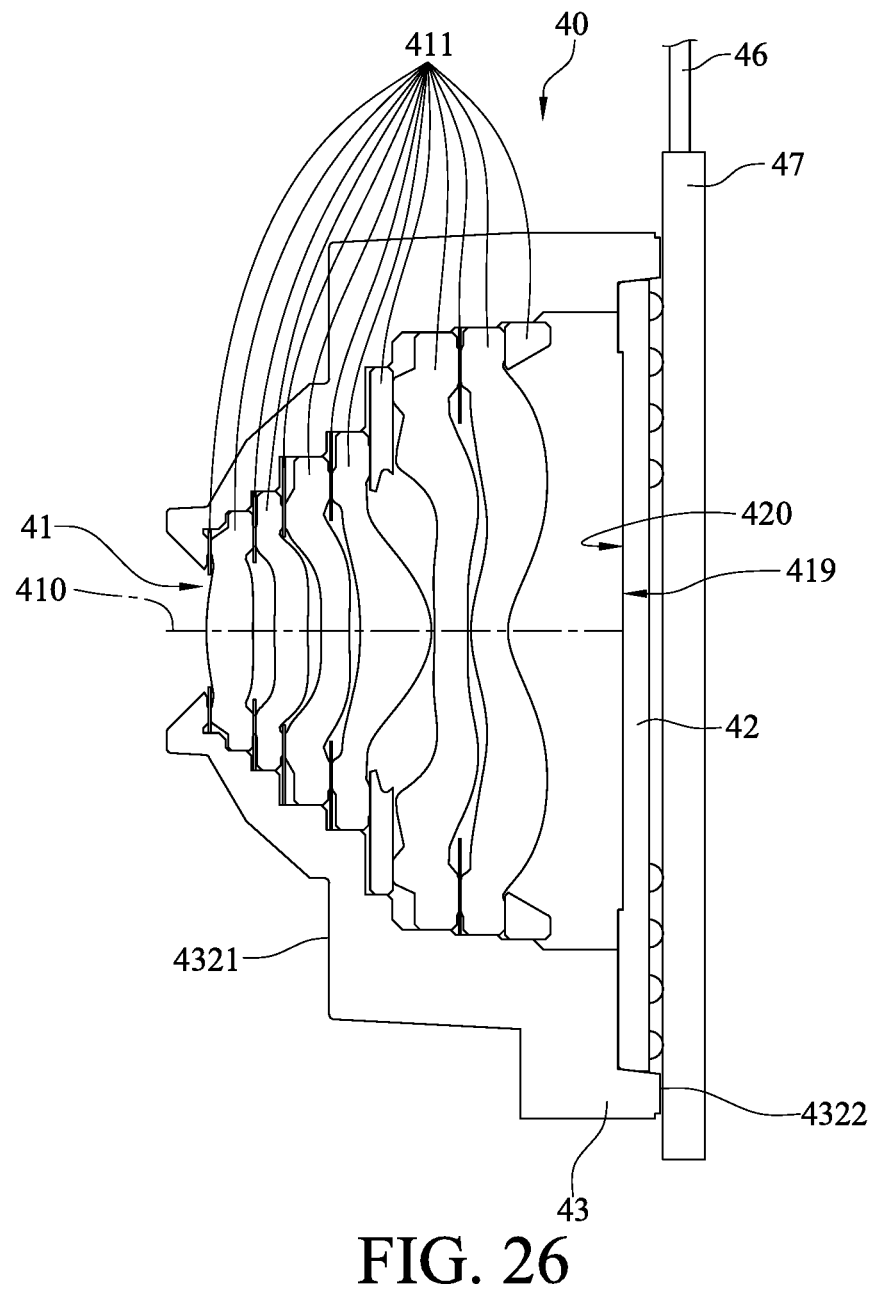
FIG. 26 is a cross-sectional view of an imaging lens module and an image sensor thereof with a circuit board and a substrate according to the 7th embodiment of the present disclosure.
Figure 27:
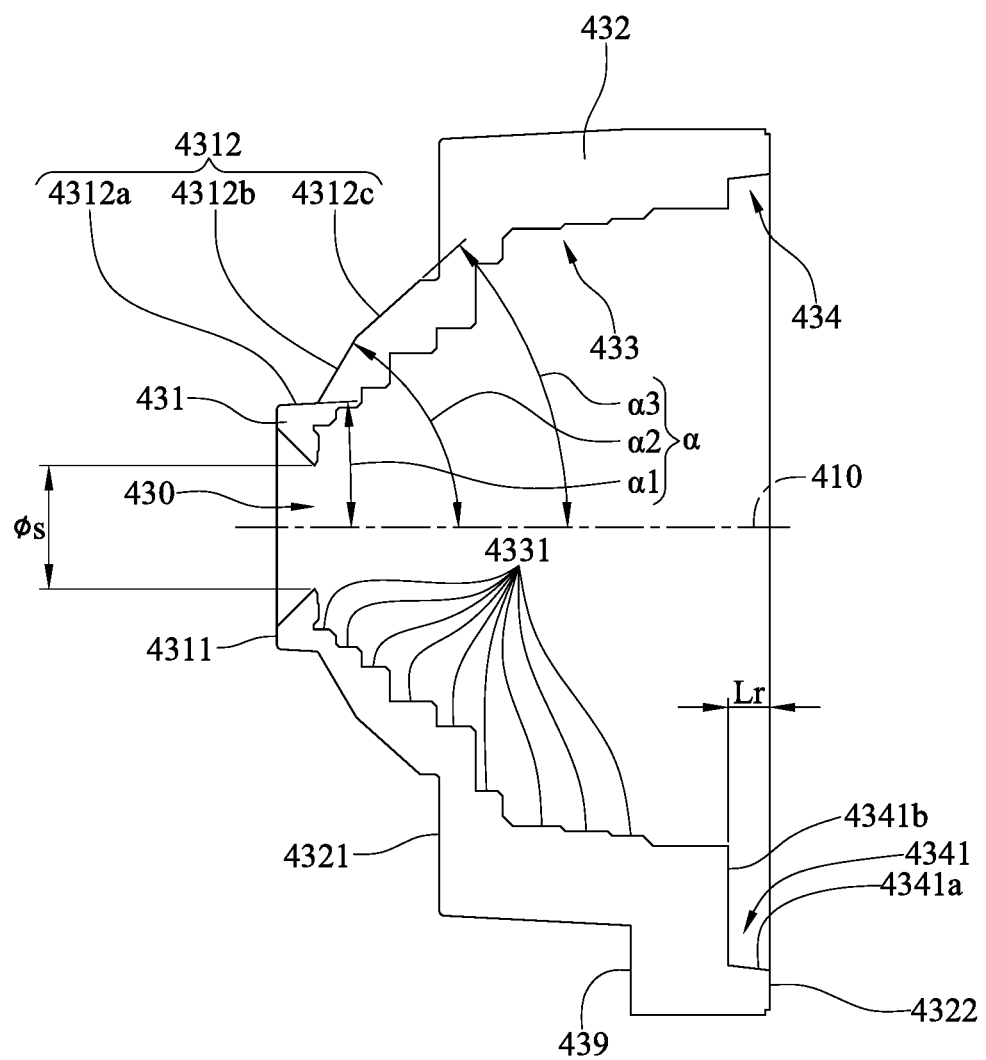
FIG. 27 is a cross-sectional view of a plastic lens barrel of the imaging lens module in FIG. 26.
Figure 28:
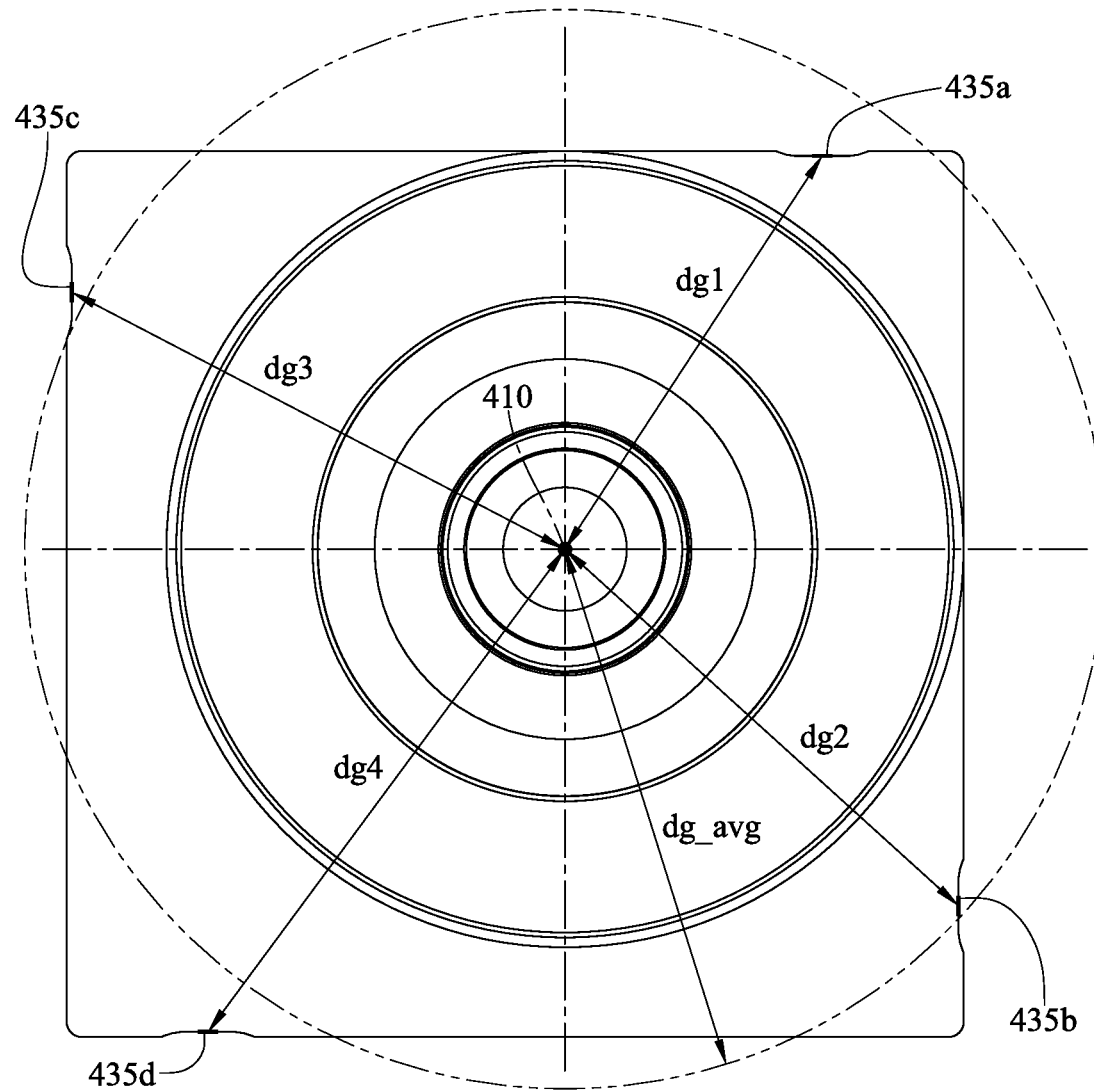
FIG. 28 is a top view of the plastic lens barrel of the imaging lens module in FIG. 26.

Please refer to FIG. 26 to FIG. 30, where FIG. 26 is a cross-sectional view of an imaging lens module and an image sensor thereof with a circuit board and a substrate according to the 7th embodiment of the present disclosure, FIG. 27 is a cross-sectional view of a plastic lens barrel of the imaging lens module in FIG. 26, FIG. 28 is a top view of the plastic lens barrel of the imaging lens module in FIG.

Figure 29:
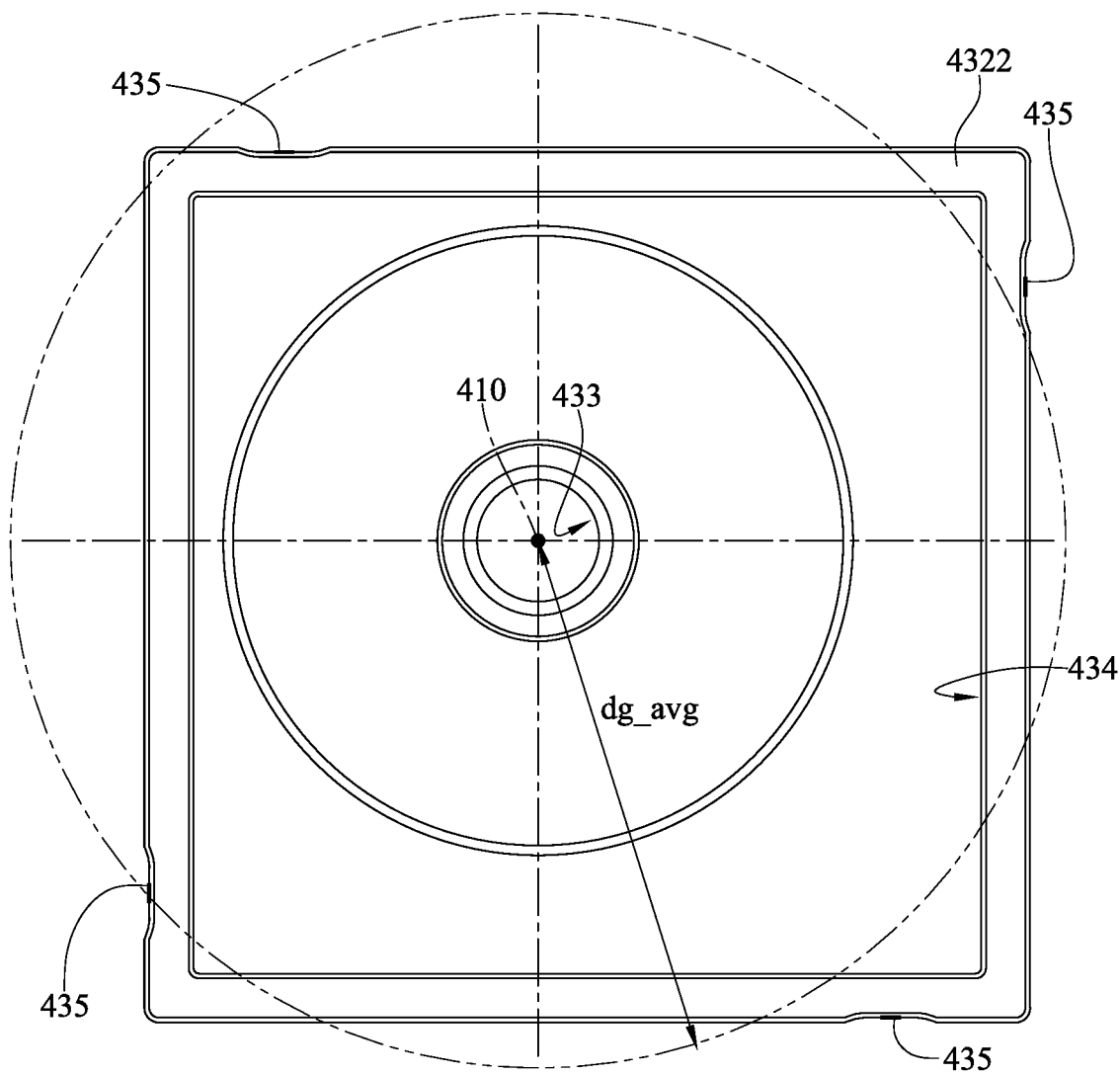
FIG. 29 is a bottom view of the plastic lens barrel of the imaging lens module in FIG. 26.
Figure 30:
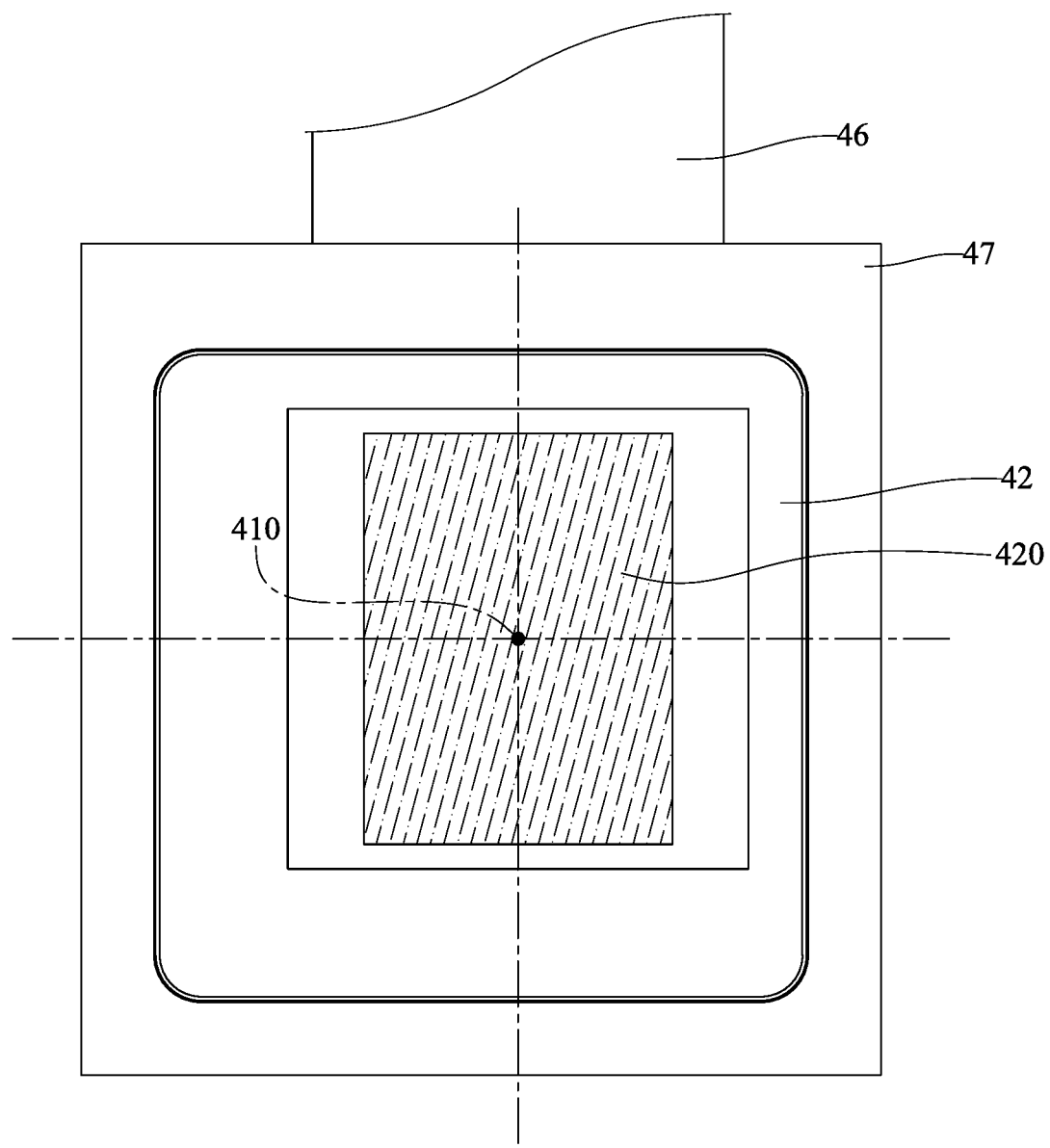
FIG. 30 is a front view of the image sensor of the imaging lens module with the circuit board and the substrate in FIG. 26.

26, FIG. 29 is a bottom view of the plastic lens barrel of the imaging lens module in FIG. 26, and FIG. 30 is a front view of the image sensor of the imaging lens module with the circuit board and the substrate in FIG. 26.

In this embodiment, an imaging lens module 40 is configured to be disposed on a substrate 47, wherein there is a circuit board 46 disposed on one side of the substrate 47. The imaging lens module 40 includes an imaging lens assembly 41, an image sensor 42, and a plastic lens barrel 43. The imaging lens assembly 41 has an optical axis 410 and an image surface 419 and includes a plurality of optical elements 411, wherein the optical elements 411 include, for example, a lens element, an light-blocking element, an aperture stop, a stop, a spacer, a retainer, etc., and the present disclosure is not limited thereto. The optical axis 410 passes through the optical elements 411 and the image surface 419. The image sensor 42 is disposed on an image side of the imaging lens assembly 41, and the image sensor 42 has an image sensing surface 420 facing towards the imaging lens assembly 41. Specifically, the image sensing surface 420 is disposed on the image surface 419 of the imaging lens assembly 41, and the optical axis 410 passes through the image sensing surface 420. The image sensor 42 is electrically connected to the circuit board 46 via the substrate 47 so as to collaborate with the circuit board 46 and the substrate 47. The plastic lens barrel 43 accommodates the imaging lens assembly 41 and the image sensor 42. That is, both of the imaging lens assembly 41 and the image sensor 42 are disposed in the plastic lens barrel 43. The plastic lens barrel 43 is made of black plastic material and is a non-axisymmetric lens barrel (shown in FIG. 28 and FIG. 29) manufactured in one piece by injection molding, wherein the optical axis 410 does not pass through the geometric center of the plastic lens barrel 43.

The minimum inner hole at an object side of the plastic lens barrel 43 forms an optical aperture 430 which surrounds the optical axis 410. The plastic lens barrel 43 includes an object-end portion 431, a bottom portion 432, a first inner hole portion 433, a second inner hole portion 434, and four gate traces 435. The bottom portion 432 is located on an image side of the object-end portion 431, the second inner hole portion 434 is located on an image side of the first inner hole portion 433, and the gate traces 435 are disposed on one side of the bottom portion 432 located away from the optical axis 410.

The object-end portion 431 has an object-end surface 4311 and three tapered surfaces 4312. The tapered surfaces 4312 are located on an image side of the object-end surface 4311. The object-end surface 4311 faces towards an object side direction of the imaging lens assembly 41. The tapered surfaces 4312 are tapered off towards the object-end surface 4311. The bottom portion 432 has a top surface 4321 and a bottom surface 4322. The bottom surface 4322 is located on an image side of the top surface 4321. Specifically, the bottom surface 4322 is substantially quadrilateral (shown in FIG. 29) and is located at a position of the bottom portion 432 farthest away from the object-end portion 431. The top surface 4321 and the bottom surface 4322 are disposed opposite to each other, and the image sensing surface 420 is located between the top surface 4321 and the bottom surface 4322.

The bore of the first inner hole portion 433 is substantially circular (shown in FIG. 29). The imaging lens assembly 41 is disposed in the first inner hole portion 433. Specifically, the first inner hole portion 433 has nine inner parallel annular surfaces 4331. The nine inner parallel annular surfaces 4331 are disposed in parallel with the optical axis 410, and the nine inner parallel annular surfaces 4331 are respectively in physical contact with at least nine of the optical elements 411 of the imaging lens assembly 41.

The bore of the second inner hole portion 434 is substantially rectangular (shown in FIG. 29). The second inner hole portion 434 includes an optical aligning structure 4341. A relative position between the image sensing surface 420 and the imaging lens assembly 41 is aligned by the optical aligning structure 4341. Specifically, the optical aligning structure 4341 has an inner bevel surface 4341a and an inner flat surface 4341b, wherein the inner flat surface 4341b extends in a direction perpendicular to the optical axis 410 and the inner flat surface 4341b and the inner bevel surface 4341a are angled to each other. The image sensor 42 is axially aligned with the optical aligning structure 4341 through the slope of the inner bevel surface 4341a and the image sensor 42 abutted on each other. The axial position of the image sensor 42 (e.g., the relative position between the image sensing surface 420 and the imaging lens assembly 41 in a direction in parallel with the optical axis 410) is maintained through the inner flat surface 4341b and the image sensor 42 abutted on each other. Accordingly, the image sensor 42 is aligned with the image surface 419 of the imaging lens assembly 41, and the optical axis 410 is perpendicular to the image sensing surface 420 in a non-skew manner. In addition, the optical axis 410 is aligned with the geometric center of the image sensing surface 420 by the aforementioned axial alignment.

When minimum distances between each of the gate traces 435 (435a, 435b, 435c, and 435d) and the optical axis 410 are respectively dg1, dg2, dg3, and dg4, the following conditions are satisfied: dg1=4.72 [mm]; dg2=5.33 [mm]; dg3=5.58 [mm]; and dg4=6.03 [mm]. When an average value of the minimum distances dg1, dg2, dg3, and dg4 is dg_avg=($\Sigma$dgi)/4, wherein i=1, 2, 3, and 4, the following condition is satisfied: dg_avg=5.42 [mm]. When a standard deviation of the minimum distances dg1, dg2, dg3, and dg4 between each of the gate traces 435 and the optical axis 410 is dg_std=$\sqrt{\{[\Sigma(dgi-dg\_avg)^2]/4\}}$, wherein i=1, 2, 3, and 4, the following condition is satisfied: dg_std=0.473 [mm]. When a diameter of the optical aperture 430 of the imaging lens module 40 is $\phi$s, the following condition is satisfied: $\phi$s=1.13 [mm].

When a length of the second inner hole portion 434 in the direction in parallel with the optical axis 410 is Lr, the following condition is satisfied: Lr=0.42 [mm].

When an area surrounded by the object-end surface 4311 is Af, and an area surrounded by the bottom portion 432 is Ab, the following condition is satisfied: Af/Ab=0.06, wherein Af=4.36 [mm$^2$], and Ab=78.15 [mm$^2$].

When angles between each of the tapered surfaces 4312 (4312a, 4312b, and 4312c) and the optical axis 410 are $\alpha$1, $\alpha$2, and $\alpha$3, the following conditions are satisfied: $\alpha$1=3 [deg.]; $\alpha$2=60 [deg.]; and $\alpha$3=42 [deg.].

8th Embodiment

Figure 31:
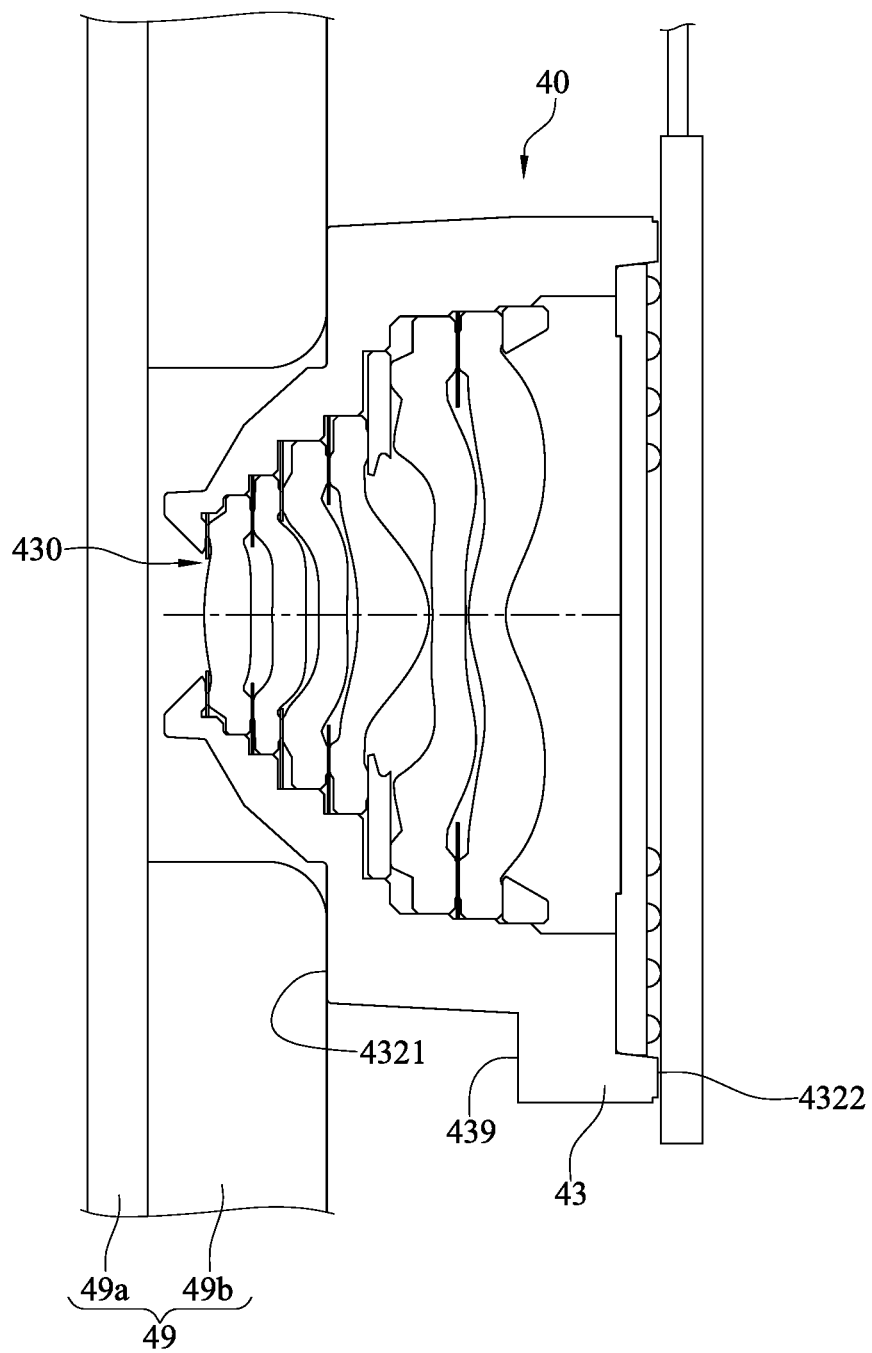
FIG. 31 is a partial and cross-sectional view of an electronic device and an image sensor thereof with a circuit board and a substrate according to the 8th embodiment of the present disclosure.

Please refer to FIG. 31, which is a partial and cross-sectional view of an electronic device and an image sensor thereof with a circuit board and a substrate according to the 8th embodiment of the present disclosure. Note that only the differences between this and the previous embodiment are illustrated hereinafter.

In this embodiment, an electronic device 4 includes the imaging lens module 40 disclosed in the 7th embodiment and a display module 49. The display module 49 is located on an object side of the imaging lens module 40. Specifically, the display module 49 includes a protective plate 49a and a display panel 49b, and the protective plate 49a is located on an object side of the display panel 49b and the object side of the imaging lens module 40. The plastic lens barrel 43 of the imaging lens module 40 further includes a step surface 439 disposed opposite to the bottom surface 4322, and the step surface 439 is located between the top surface 4321 and the bottom surface 4322. The display panel 49b of the display module 49 abuts on the top surface 4321 of the plastic lens barrel 43, and the optical aperture 430 is located in the gap range of the display panel 49b and are exposed by the protective plate 49a.

9th Embodiment

Figure 32:
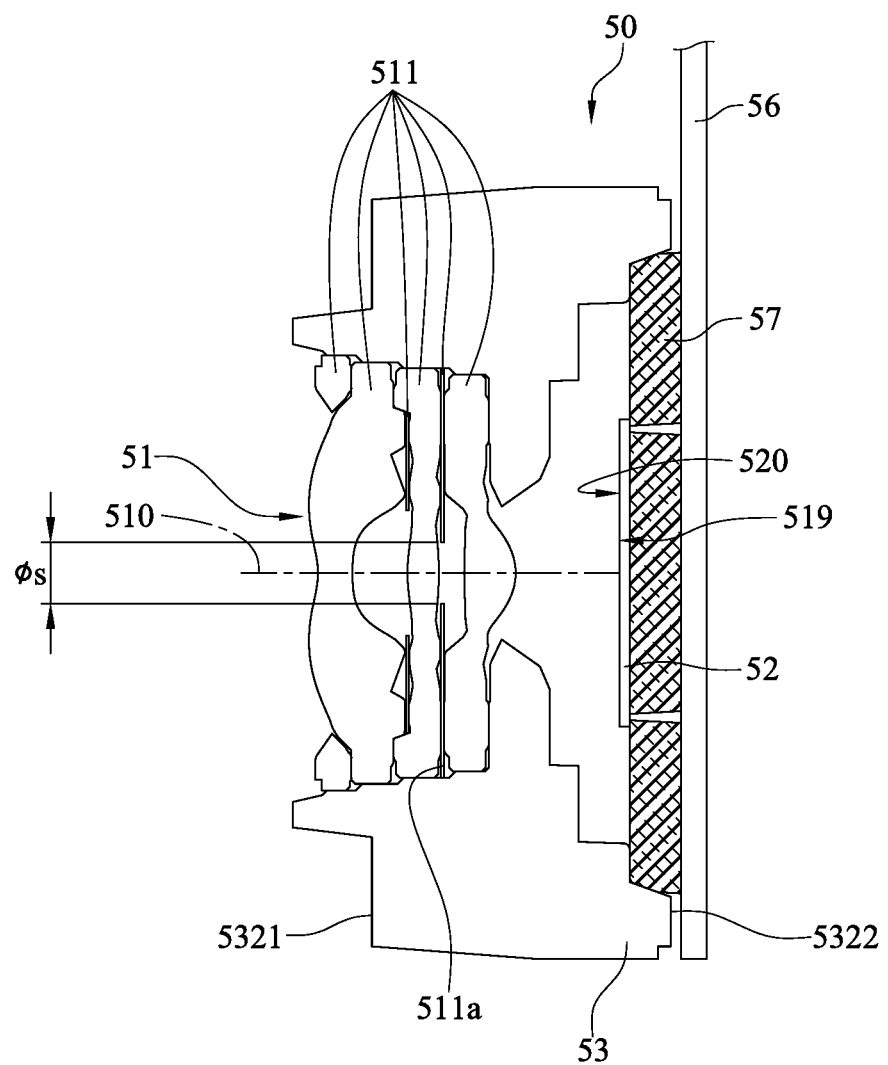
FIG. 32 is a cross-sectional view of an imaging lens module and an image sensor thereof with a circuit board and a substrate according to the 9th embodiment of the present disclosure.
Figure 33:
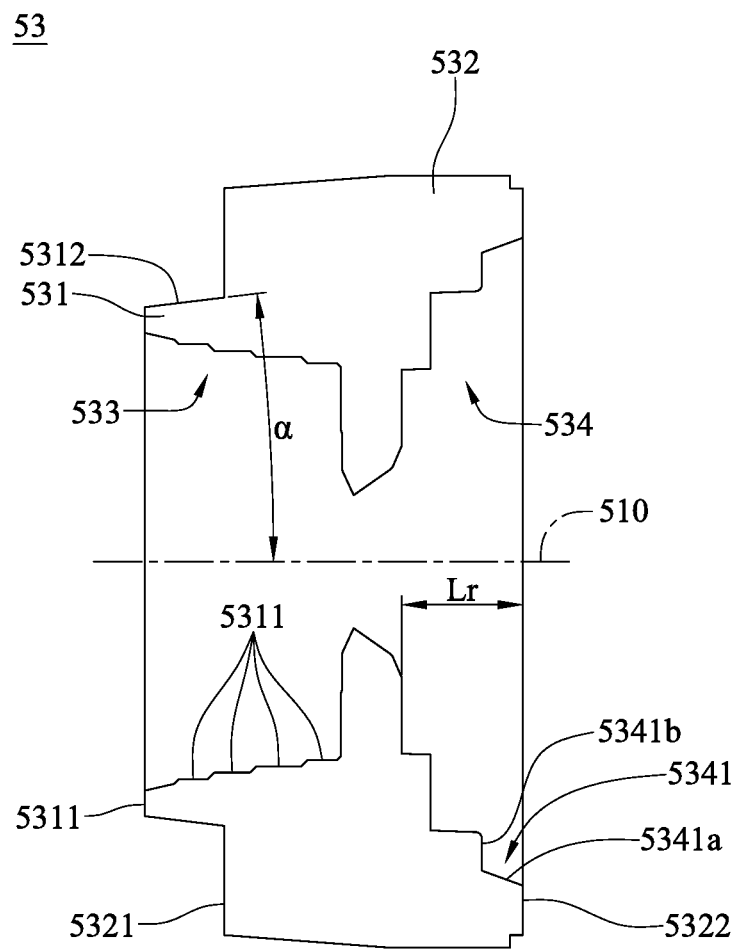
FIG. 33 is a cross-sectional view of a plastic lens barrel of the imaging lens module in FIG. 32.
Figure 34:
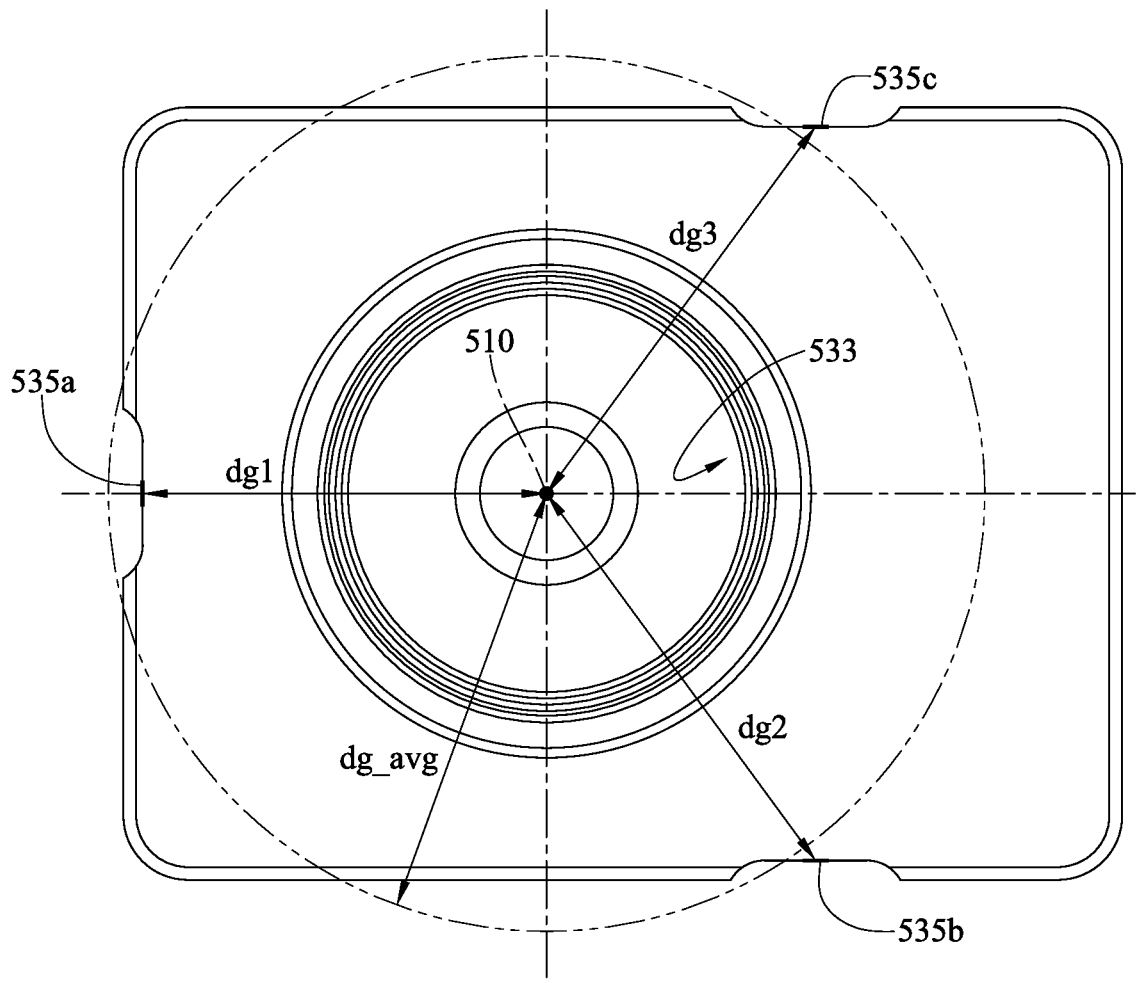
FIG. 34 is a top view of the plastic lens barrel of the imaging lens module in FIG. 32.
Figure 35:
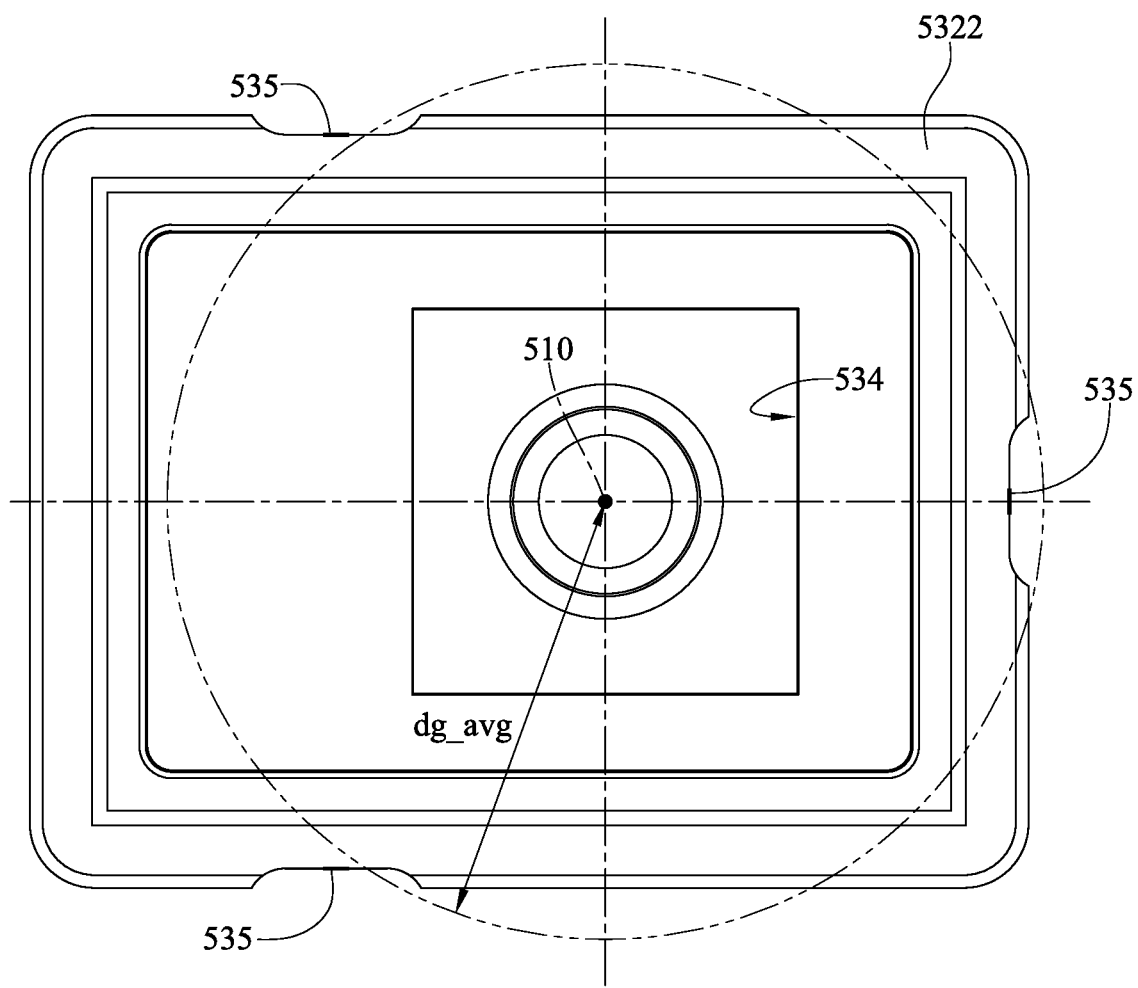
FIG. 35 is a bottom view of the plastic lens barrel of the imaging lens module in FIG. 32.
Figure 36:
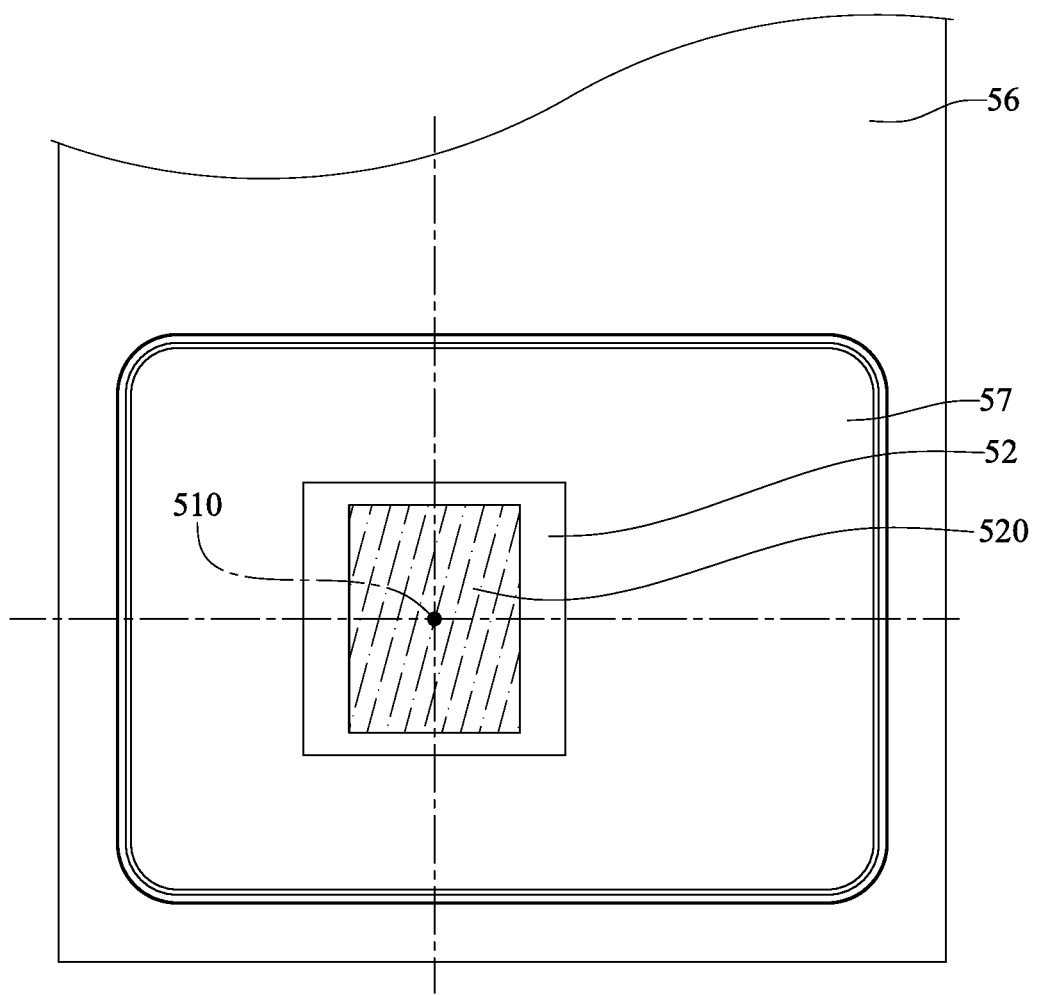
FIG. 36 is a front view of the image sensor of the imaging lens module with the circuit board and the substrate in FIG. 32.

Please refer to FIG. 32 to FIG. 36, where FIG. 32 is a cross-sectional view of an imaging lens module and an image sensor thereof with a circuit board and a substrate according to the 9th embodiment of the present disclosure, FIG. 33 is a cross-sectional view of a plastic lens barrel of the imaging lens module in FIG. 32, FIG. 34 is a top view of the plastic lens barrel of the imaging lens module in FIG. 32, FIG. 35 is a bottom view of the plastic lens barrel of the imaging lens module in FIG. 32, and FIG. 36 is a front view of the image sensor of the imaging lens module with the circuit board and the substrate in FIG. 32.

In this embodiment, an imaging lens module 50 is configured to be disposed on a substrate 57, wherein there is a circuit board 56 fixedly disposed on the substrate 57 by abutting thereon. The imaging lens module 50 includes an imaging lens assembly 51, an image sensor 52, and a plastic lens barrel 53. The imaging lens assembly 51 has an optical axis 510 and an image surface 519 and includes a plurality of optical elements 511, wherein the optical elements 511 include an aperture stop 511a and further include other type of elements such as a lens element, an light-blocking element, a stop, a spacer, and a retainer, and the present disclosure is not limited thereto. The optical axis 510 passes through the optical elements 511 and the image surface 519, and the aperture stop 511a surrounds the optical axis 510. The image sensor 52 is disposed on an image side of the imaging lens assembly 51, and the image sensor 52 has an image sensing surface 520 facing towards the imaging lens assembly 51. Specifically, the image sensing surface 520 is disposed on the image surface 519 of the imaging lens assembly 51, and the optical axis 510 passes through the image sensing surface 520. The image sensor 52 is electrically connected to the circuit board 56 so as to collaborate with the circuit board 56 and the substrate 57. The plastic lens barrel 53 accommodates the imaging lens assembly 51 and the image sensor 52. That is, both of the imaging lens assembly 51 and the image sensor 52 are disposed in the plastic lens barrel 53. The plastic lens barrel 53 is made of black plastic material and is a non-axisymmetric lens barrel (shown in FIG. 34 and FIG. 35) manufactured in one piece by injection molding, wherein the optical axis 510 does not pass through the geometric center of the plastic lens barrel 53.

The plastic lens barrel 53 includes an object-end portion 531, a bottom portion 532, a first inner hole portion 533, a second inner hole portion 534, and three gate traces 535. The bottom portion 532 is located on an image side of the object-end portion 531, the second inner hole portion 534 is located on an image side of the first inner hole portion 533, and the gate traces 535 are disposed on one side of the bottom portion 532 located away from the optical axis 510.

The object-end portion 531 has an object-end surface 5311 and a tapered surface 5312. The tapered surface 5312 is located on an image side of the object-end surface 5311. The object-end surface 5311 faces towards an object side direction of the imaging lens assembly 51. The tapered surface 5312 is tapered off towards the object-end surface 5311. The bottom portion 532 has a top surface 5321 and a bottom surface 5322. The bottom surface 5322 is located on an image side of the top surface 5321. Specifically, the bottom surface 5322 is substantially rectangular (shown in FIG. 35) and is located at a position of the bottom portion 532 farthest away from the object-end portion 531. The top surface 5321 and the bottom surface 5322 are disposed opposite to each other, and the image sensing surface 520 is located between the top surface 5321 and the bottom surface 5322.

The bore of the first inner hole portion 533 is substantially circular (shown in FIG. 34). The imaging lens assembly 51 is disposed in the first inner hole portion 533. Specifically, the first inner hole portion 533 has four inner parallel annular surfaces 5331. The four inner parallel annular surfaces 5331 are disposed in parallel with the optical axis 510, and the four inner parallel annular surfaces 5331 are respectively in physical contact with at least four of the optical elements 511 of the imaging lens assembly 51.

The bore of the second inner hole portion 534 is substantially rectangular (shown in FIG. 35). The second inner hole portion 534 includes an optical aligning structure 5341. A relative position between the image sensing surface 520 and the imaging lens assembly 51 is aligned by the optical aligning structure 5341. Specifically, the optical aligning structure 5341 has an inner bevel surface 5341a and an inner flat surface 5341b, wherein the inner flat surface 5341b extends in a direction perpendicular to the optical axis 510 and the inner flat surface 5341b and the inner bevel surface 5341a are angled to each other. The image sensor 52 is axially aligned with the optical aligning structure 5341 through the slope of the inner bevel surface 5341a and the substrate 57 abutted on each other. The axial position of the image sensor 52 (e.g., the relative position between the image sensing surface 520 and the imaging lens assembly 51 in a direction in parallel with the optical axis 510) is maintained through the inner flat surface 5341b and the substrate 57 abutted on each other. Accordingly, the image sensor 52 is aligned with the image surface 519 of the imaging lens assembly 51, and the optical axis 510 is perpendicular to the image sensing surface 520 in a non-skew manner. In addition, the optical axis 510 is aligned with the geometric center of the image sensing surface 520 by the aforementioned axial alignment.

When minimum distances between each of the gate traces 535 (535a, 535b, and 535c) and the optical axis 510 are respectively dg1, dg2, and dg3, the following conditions are satisfied: dg1=3.15 [mm]; and dg2=dg3=3.55 [mm]. When an average value of the minimum distances dg1, dg2, and dg3 is dg_avg=(Σdgi)/3, wherein i=1, 2, and 3, the following condition is satisfied: dg_avg=3.42 [mm]. When a standard deviation of the minimum distances dg1, dg2, and dg3 between each of the gate traces 535 and the optical axis 510 is dg_std=$\sqrt{\{[\Sigma(dgi-dg\_avg)^2]/3\}}$, wherein i=1, 2, and 3, the following condition is satisfied: dg_std=0.189 [mm]. When an aperture diameter of the aperture stop 511a of the imaging lens module 50 is ϕs, the following condition is satisfied: ϕs=0.48 [mm].

When a length of the second inner hole portion 534 in the direction in parallel with the optical axis 510 is Lr, the following condition is satisfied: Lr=0.945 [mm].

When an area surrounded by the object-end surface 5311 is Af, and an area surrounded by the bottom portion 532 is Ab, the following condition is satisfied: Af/Ab=0.27, wherein Af=12.42 [mm$^2$], and Ab=46.30 [mm$^2$].

When an angle between the tapered surface 5312 and the optical axis 510 is α, the following conditions are satisfied: α=7 [deg.].

10th Embodiment

Figure 37:
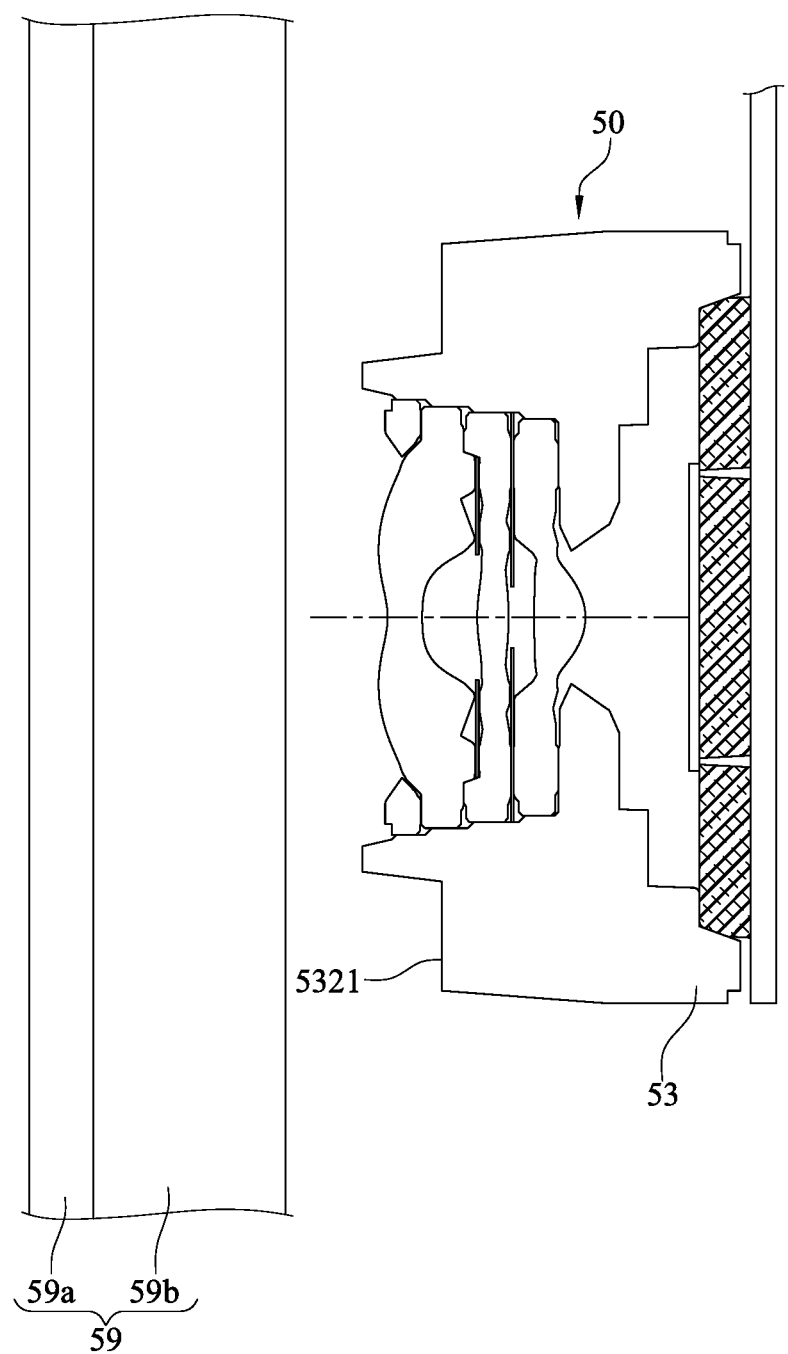
FIG. 37 is a partial and cross-sectional view of an electronic device and an image sensor thereof with a circuit board and a substrate according to the 10th embodiment of the present disclosure.

Please refer to FIG. 37, which is a partial and cross-sectional view of an electronic device and an image sensor thereof with a circuit board and a substrate according to the 10th embodiment of the present disclosure. Note that only the differences between this and the previous embodiment are illustrated hereinafter.

In this embodiment, an electronic device 5 includes the imaging lens module 50 disclosed in the 9th embodiment and a display module 59. The display module 59 is located on an object side of the imaging lens module 50. Specifically, the display module 59 includes a touch panel 59a and a display panel 59b, and the touch panel 59a is located on an object side of the display panel 59b and the object side of the imaging lens module 50. The display panel 59b of the display module 59 indirectly abuts on the top surface 5321 of the plastic lens barrel 53 through a spacer (not shown), and the imaging lens module 50 is not exposed by the display module 59.

11th Embodiment

Figure 38:
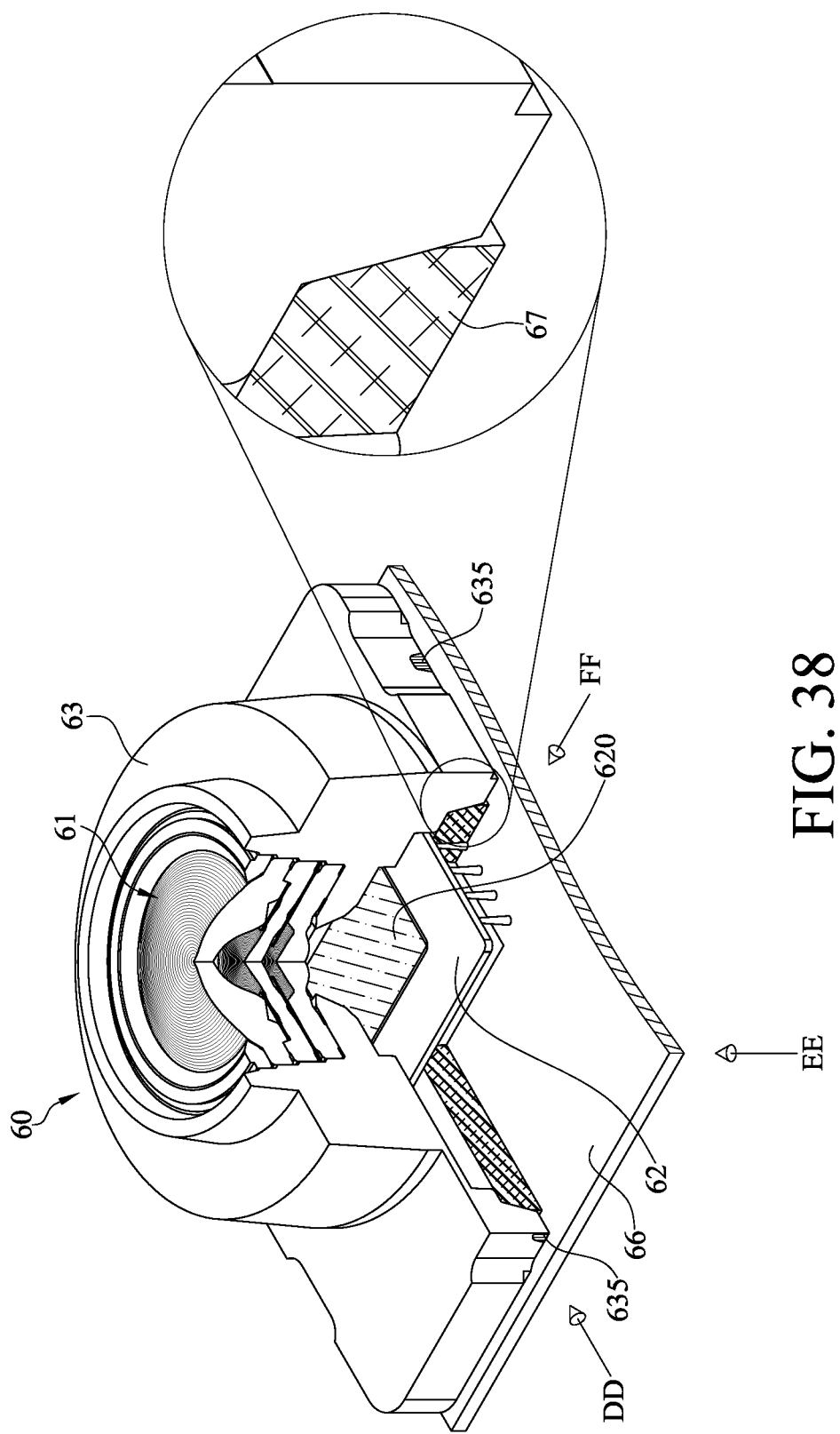
FIG. 38 is a perspective view of a partially sectioned imaging lens module and an image sensor thereof with a circuit board and a substrate according to the 11th embodiment of the present disclosure.
Figure 39:
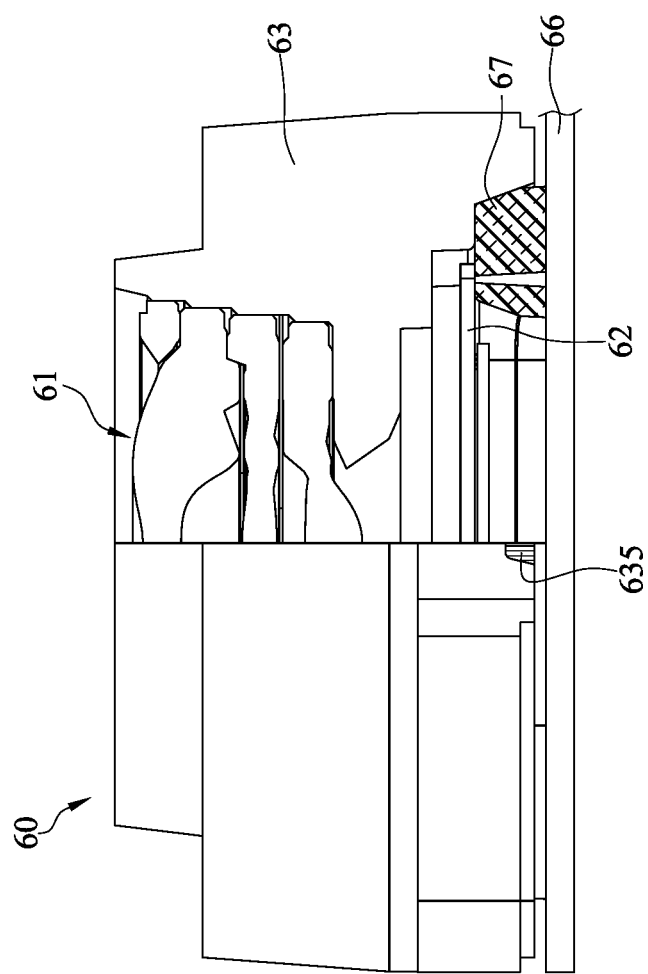
FIG. 39 is a side view of the partially sectioned imaging lens module and the image sensor thereof with the circuit board and the substrate viewing from a DD direction in FIG. 38.
Figure 40:
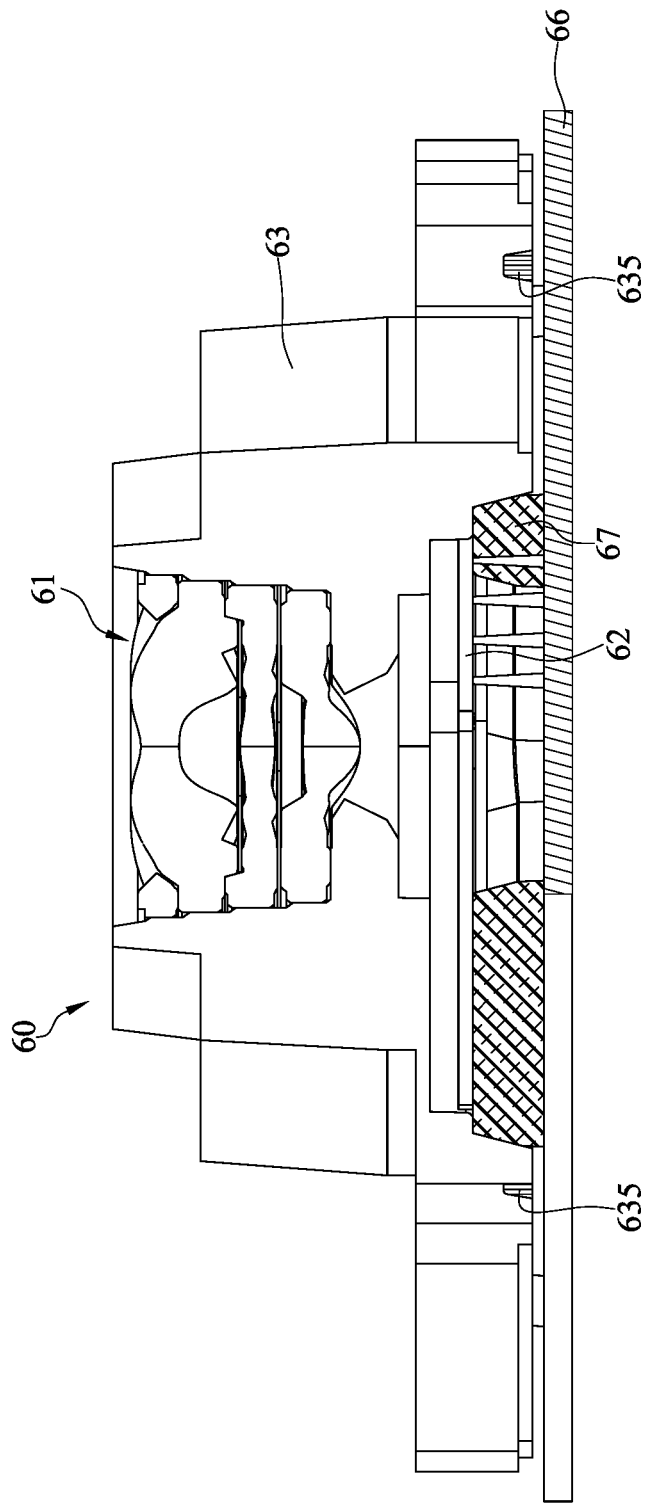
FIG. 40 is a side view of the partially sectioned imaging lens module and the image sensor thereof with the circuit board and the substrate viewing from an EE direction in FIG. 38.
Figure 41:
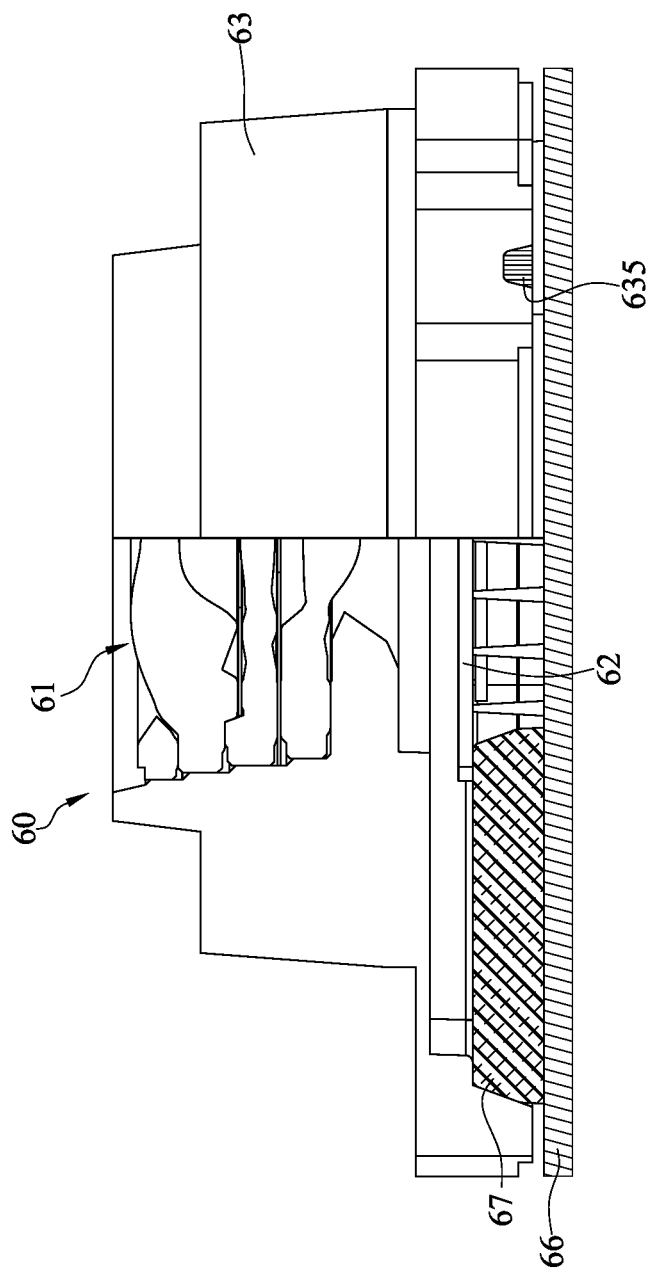
FIG. 41 is a side view of the partially sectioned imaging lens module and the image sensor thereof with the circuit board and the substrate viewing from an FF direction in FIG. 38.
Figure 42:
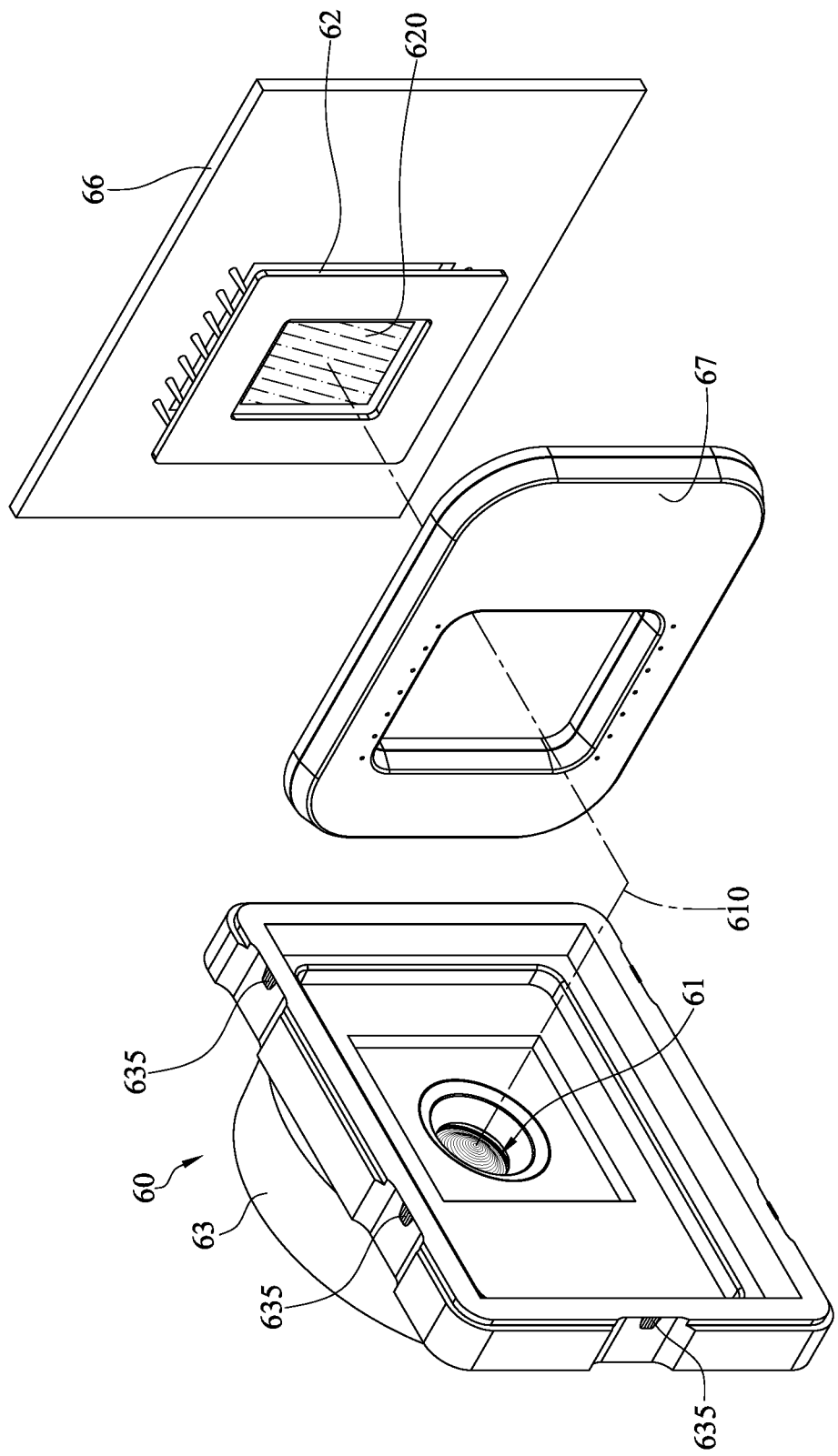
FIG. 42 is an exploded view of the imaging lens module and the image sensor thereof with the circuit board and the substrate in FIG. 38.
Figure 43:
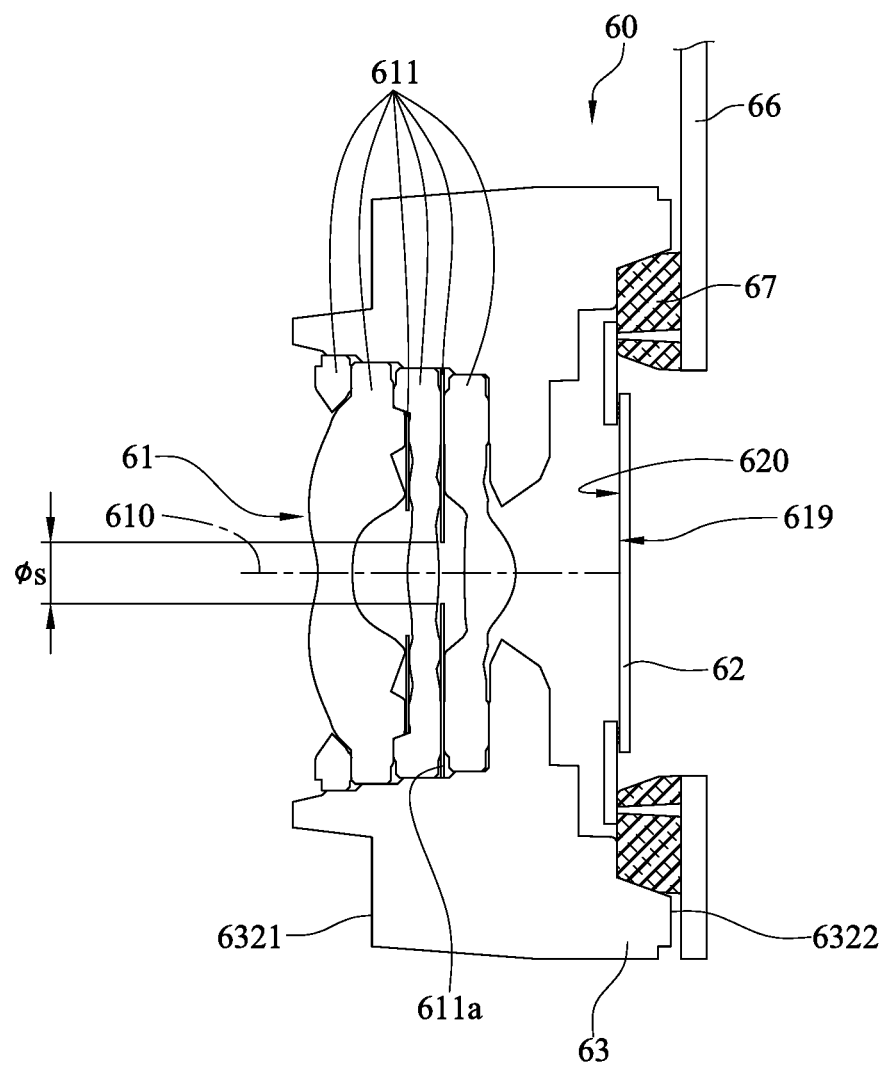
FIG. 43 is a cross-sectional view of the imaging lens module and the image sensor thereof with the circuit board and the substrate in FIG. 42.
Figure 44:
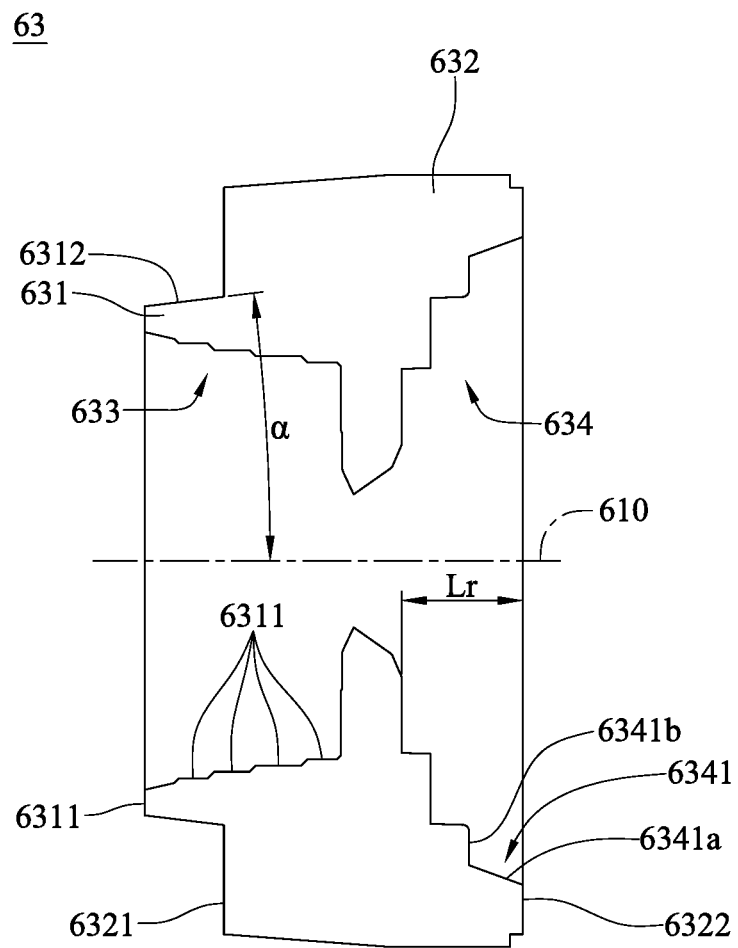
FIG. 44 is a cross-sectional view of a plastic lens barrel of the imaging lens module in FIG. 43.
Figure 45:
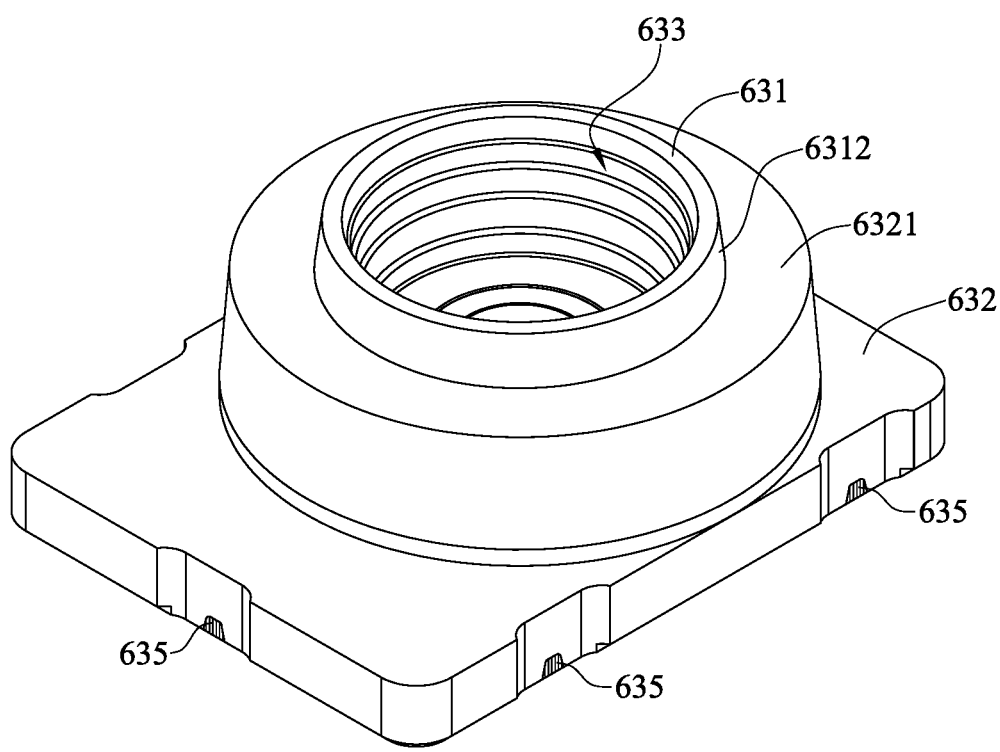
FIG. 45 is a perspective view of the plastic lens barrel of the imaging lens module in FIG. 43.
Figure 46:
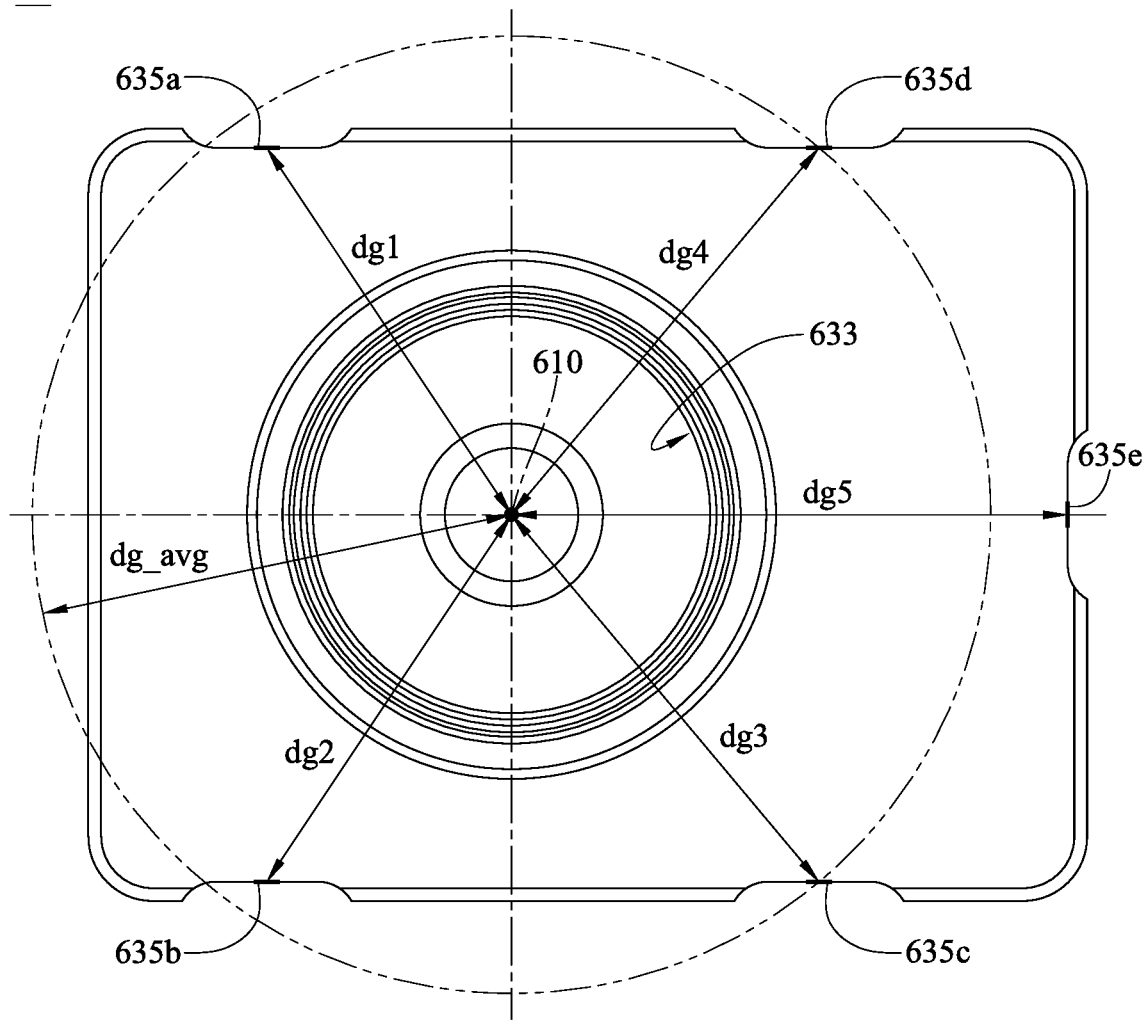
FIG. 46 is a top view of the plastic lens barrel of the imaging lens module in FIG. 43.
Figure 47:
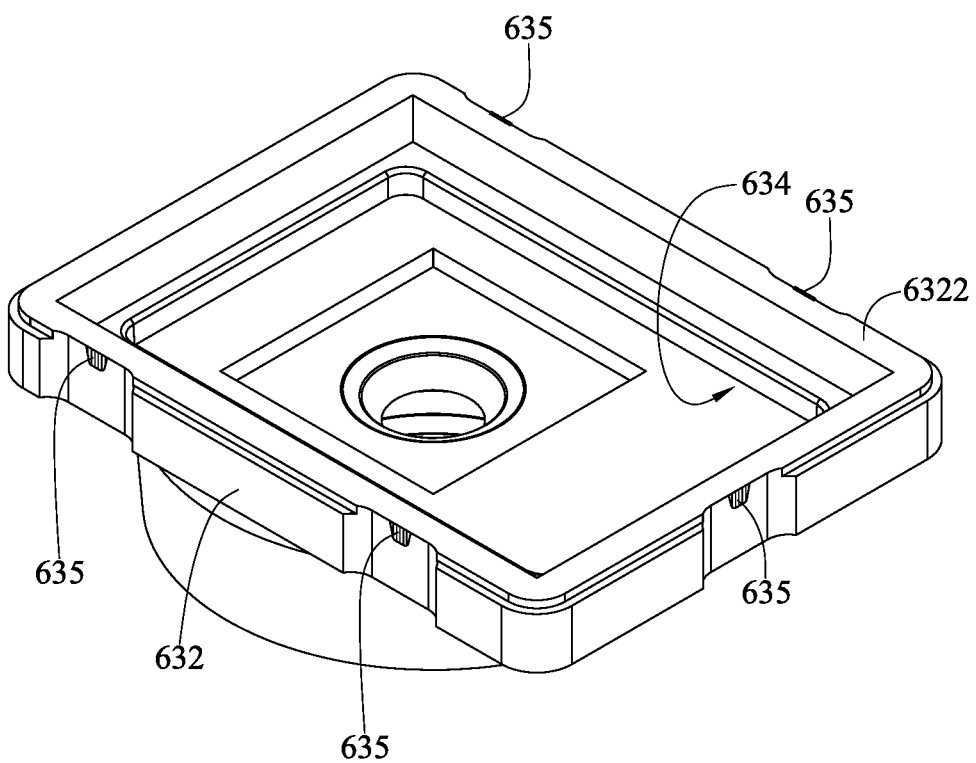
FIG. 47 is another perspective view of the plastic lens barrel of the imaging lens module in FIG. 43.
Figure 48:
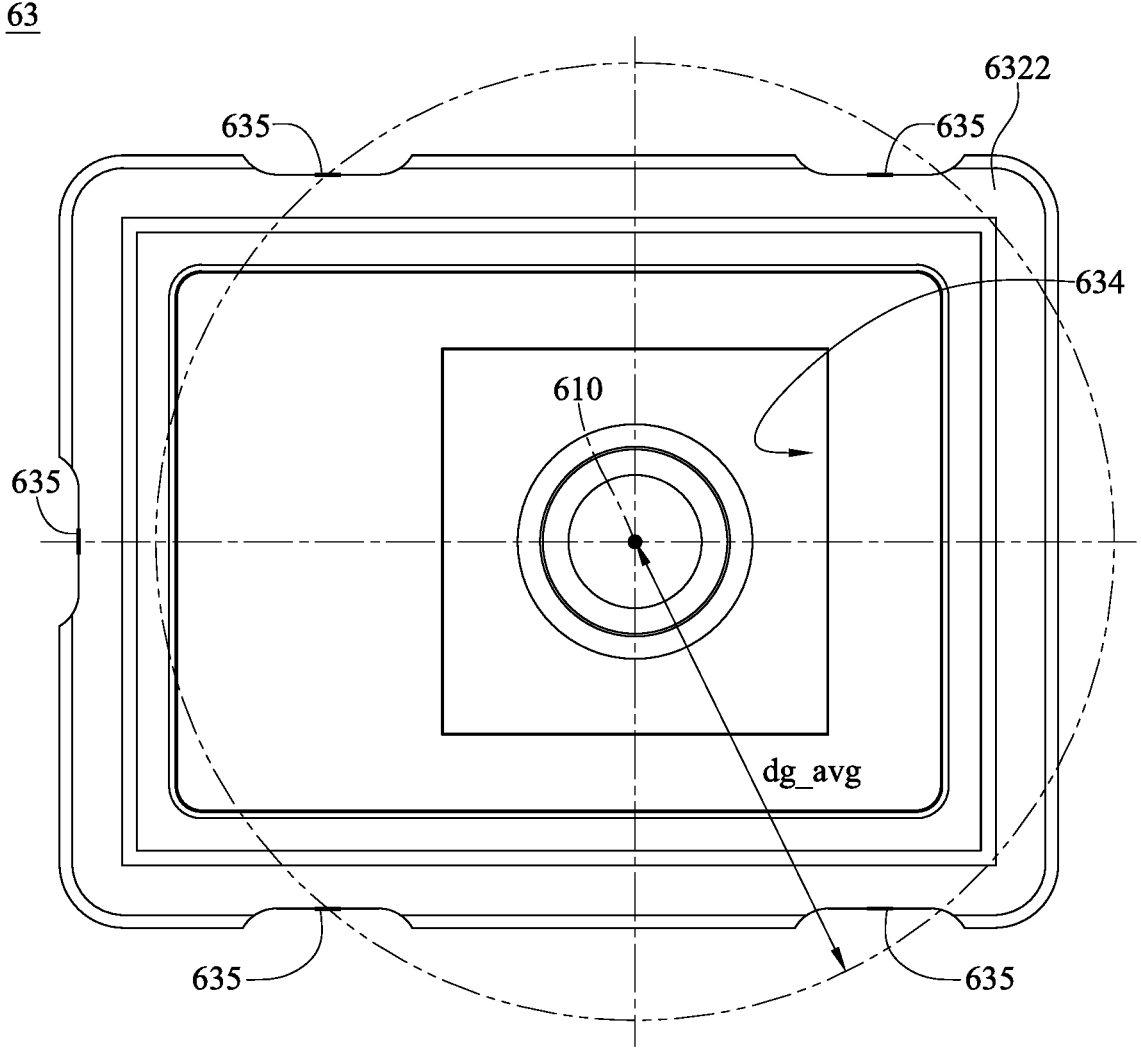
FIG. 48 is a bottom view of the plastic lens barrel of the imaging lens module in FIG. 43.
Figure 49:
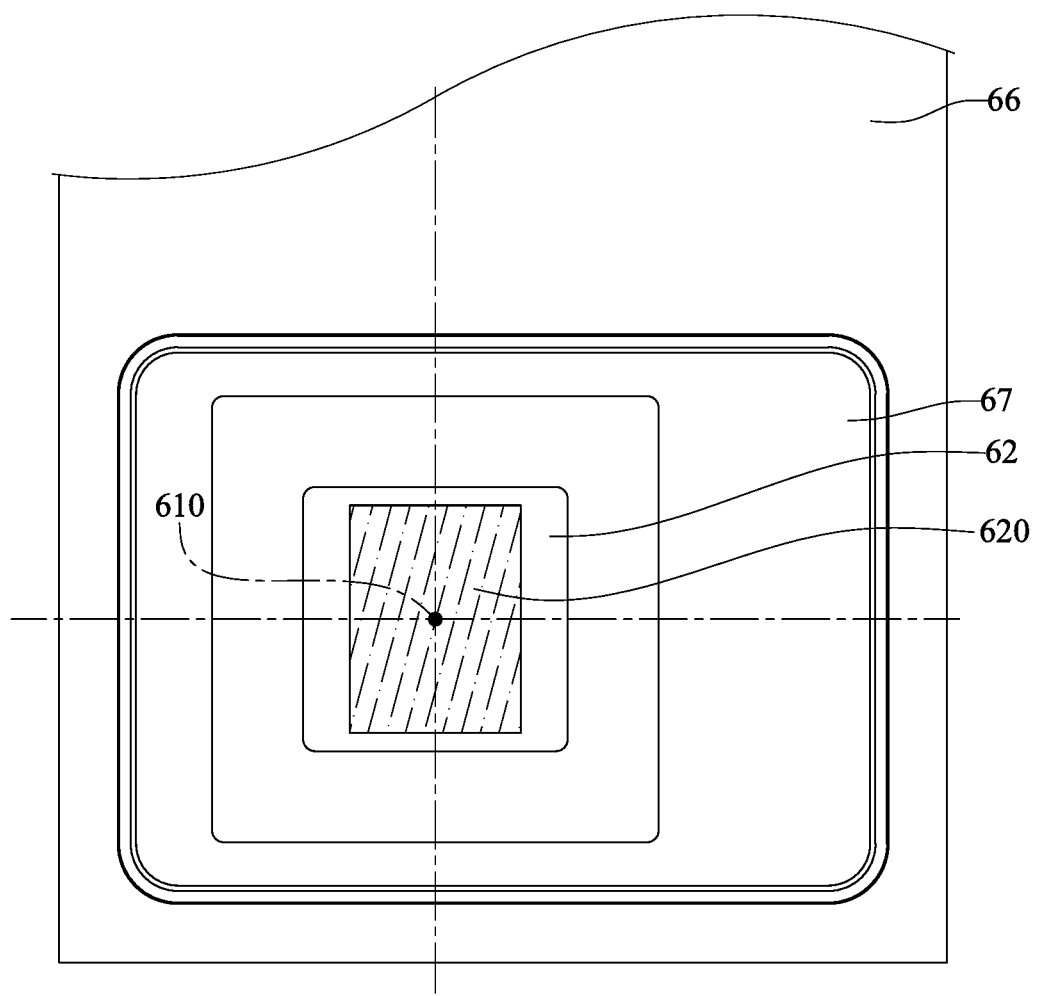
FIG. 49 is a front view of the image sensor of the imaging lens module with the circuit board and the substrate in FIG. 42.

Please refer to FIG. 38 to FIG. 49, where FIG. 38 is a perspective view of a partially sectioned imaging lens module and an image sensor thereof with a circuit board and a substrate according to the 11th embodiment of the present disclosure, FIG. 39 is a side view of the partially sectioned imaging lens module and the image sensor thereof with the circuit board and the substrate viewing from a DD direction in FIG. 38, FIG. 40 is a side view of the partially sectioned imaging lens module and the image sensor thereof with the circuit board and the substrate viewing from an EE direction in FIG. 38, FIG. 41 is a side view of the partially sectioned imaging lens module and the image sensor thereof with the circuit board and the substrate viewing from an FF direction in FIG. 38, FIG. 42 is an exploded view of the imaging lens module and the image sensor thereof with the circuit board and the substrate in FIG. 38, FIG. 43 is a cross-sectional view of the imaging lens module and the image sensor thereof with the circuit board and the substrate in FIG. 42, FIG. 44 is a cross-sectional view of a plastic lens barrel of the imaging lens module in FIG. 43, FIG. 45 is a perspective view of the plastic lens barrel of the imaging lens module in FIG. 43, FIG. 46 is a top view of the plastic lens barrel of the imaging lens module in FIG. 43, FIG. 47 is another perspective view of the plastic lens barrel of the imaging lens module in FIG. 43, FIG. 48 is a bottom view of the plastic lens barrel of the imaging lens module in FIG. 43, and FIG. 49 is a front view of the image sensor of the imaging lens module with the circuit board and the substrate in FIG. 42.

In this embodiment, an imaging lens module 60 is configured to be disposed on a substrate 67, wherein there is a circuit board 66 fixedly disposed on the substrate 67 by abutting thereon. The imaging lens module 60 includes an imaging lens assembly 61, an image sensor 62, and a plastic lens barrel 63. The imaging lens assembly 61 has an optical axis 610 and an image surface 619 and includes a plurality of optical elements 611, wherein the optical elements 611 include an aperture stop 611a and further include other types of elements such as a lens element, an light-blocking element, a stop, a spacer, and a retainer, and the present disclosure is not limited thereto. The optical axis 610 passes through the optical elements 611 and the image surface 619, and the aperture stop 611a surrounds the optical axis 610. The image sensor 62 is disposed on an image side of the imaging lens assembly 61, and the image sensor 62 has an image sensing surface 620 facing towards the imaging lens assembly 61. Specifically, the image sensing surface 620 is disposed on the image surface 619 of the imaging lens assembly 61, and the optical axis 610 passes through the image sensing surface 620. The image sensor 62 is electrically connected to the circuit board 66 so as to collaborate with the circuit board 66 and the substrate 67. The plastic lens barrel 63 accommodates the imaging lens assembly 61 and the image sensor 62. That is, both of the imaging lens assembly 61 and the image sensor 62 are disposed in the plastic lens barrel 63. The plastic lens barrel 63 is made of black plastic material and is a non-axisymmetric lens barrel (shown in FIG. 46 and FIG. 48) manufactured in one piece by injection molding, wherein the optical axis 610 does not pass through the geometric center of the plastic lens barrel 63.

The plastic lens barrel 63 includes an object-end portion 631, a bottom portion 632, a first inner hole portion 633, a second inner hole portion 634, and five gate traces 635. The bottom portion 632 is located on an image side of the object-end portion 631, the second inner hole portion 634 is located on an image side of the first inner hole portion 633, and the gate traces 635 are disposed on one side of the bottom portion 632 located away from the optical axis 610.

The object-end portion 631 has an object-end surface 6311 and a tapered surface 6312. The tapered surface 6312 is located on an image side of the object-end surface 6311. The object-end surface 6311 faces towards an object side direction of the imaging lens assembly 61. The tapered surface 6312 is tapered off towards the object-end surface 6311. The bottom portion 632 has a top surface 6321 and a bottom surface 6322. The bottom surface 6322 is located on an image side of the top surface 6321. Specifically, the bottom surface 6322 is substantially rectangular (shown in FIG. 47 and FIG. 48) and is located at a position of the bottom portion 632 farthest away from the object-end portion 631. The top surface 6321 and the bottom surface 6322 are disposed opposite to each other, and the image sensing surface 620 is located between the top surface 6321 and the bottom surface 6322.

The bore of the first inner hole portion 633 is substantially circular (shown in FIG. 45 and FIG. 46). The imaging lens assembly 61 is disposed in the first inner hole portion 633. Specifically, the first inner hole portion 633 has four inner parallel annular surfaces 6331. The four inner parallel annular surfaces 6331 are disposed in parallel with the optical axis 610, and the four inner parallel annular surfaces 6331 are respectively in physical contact with at least four of the optical elements 611 of the imaging lens assembly 61.

The bore of the second inner hole portion 634 is substantially rectangular (shown in FIG. 47 and FIG. 48). The second inner hole portion 634 includes an optical aligning structure 6341. A relative position between the image sensing surface 620 and the imaging lens assembly 61 is aligned by the optical aligning structure 6341. Specifically, the optical aligning structure 6341 has an inner bevel surface 6341a and an inner flat surface 6341b, wherein the inner flat surface 6341b extends in a direction perpendicular to the optical axis 610 and the inner flat surface 6341b and the inner bevel surface 6341a are angled to each other. The image sensor 62 is axially aligned with the optical aligning structure 6341 through the slope of the inner bevel surface 6341a and the substrate 67 abutted on each other. The axial position of the image sensor 62 (e.g., the relative position between the image sensing surface 620 and the imaging lens assembly 61 in a direction in parallel with the optical axis 610) is maintained through the inner flat surface 6341b and the substrate 67 abutted on each other. Accordingly, the image sensor 62 is aligned with the image surface 619 of the imaging lens assembly 61, and the optical axis 610 is perpendicular to the image sensing surface 620 in a non-skew manner. In addition, the optical axis 610 is aligned with the geometric center of the image sensing surface 620 by the aforementioned axial alignment.

When minimum distances between each of the gate traces 635 (635a, 635b, 635c, 635d, and 635e) and the optical axis 610 are respectively dg1, dg2, dg3, dg4, and dg5, the following conditions are satisfied: dg1=dg2=3.45 [mm]; dg3=dg4=3.74 [mm]; and dg5=4.34 [mm]. When an average value of the minimum distances dg1, dg2, dg3, dg4, and dg5 is dg_avg=(Σdgi)/5, wherein i=1, 2, 3, 4, and 5, the following condition is satisfied: dg_avg=3.74 [mm]. When a standard deviation of the minimum distances dg1, dg2, dg3, dg4, and dg5 between each of the gate traces 635 and the optical axis 610 is dg_std=Σ{[Σ(dgi−dg_avg)$^2$]/5}, wherein i=1, 2, 3, 4, and 5, the following condition is satisfied: dg_std=0.325 [mm]. When an aperture diameter of the aperture stop 611a of the imaging lens module 60 is ϕs, the following condition is satisfied: ϕs=0.48 [mm].

When a length of the second inner hole portion 634 in the direction in parallel with the optical axis 610 is Lr, the following condition is satisfied: Lr=0.945 [mm].

When an area surrounded by the object-end surface 6311 is Af, and an area surrounded by the bottom portion 632 is Ab, the following condition is satisfied: Af/Ab=0.27, wherein Af=12.42 [mm$^2$], and Ab=45.95 [mm$^2$].

When an angle between the tapered surface 6312 and the optical axis 610 is α, the following conditions are satisfied: α=7 [deg.].

12th Embodiment

Figure 50:
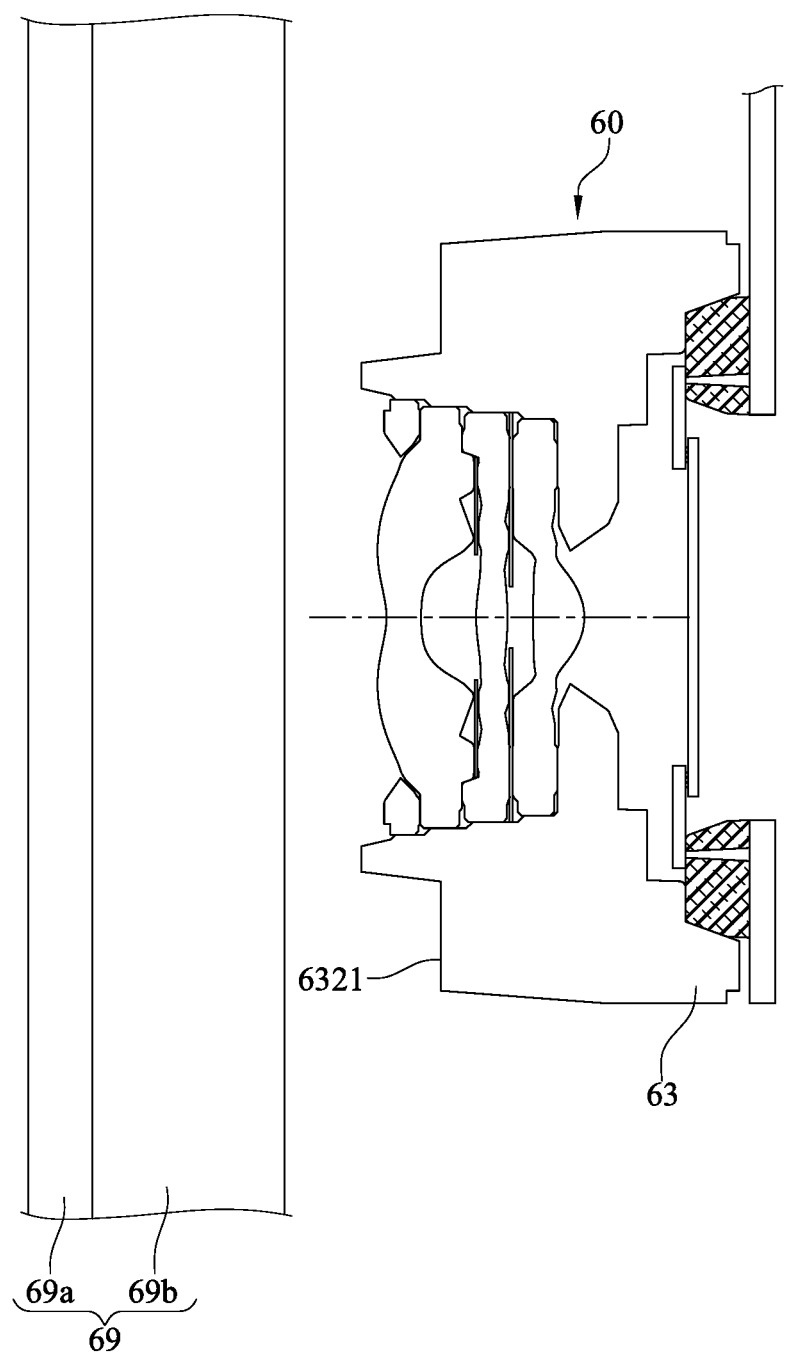
FIG. 50 is a partial and cross-sectional view of an electronic device and an image sensor thereof with a circuit board and a substrate according to the 12th embodiment of the present disclosure.

Please refer to FIG. 50, which is a partial and cross-sectional view of an electronic device and an image sensor thereof with a circuit board and a substrate according to the 12th embodiment of the present disclosure. Note that only the differences between this and the previous embodiment are illustrated hereinafter.

In this embodiment, an electronic device 6 includes the imaging lens module 60 disclosed in the 11th embodiment and a display module 69. The display module 69 is located on an object side of the imaging lens module 60. Specifically, the display module 69 includes a touch panel 59a and a display panel 69b, and the touch panel 59a is located on an object side of the display panel 69b and the object side of the imaging lens module 60. The display panel 69b of the display module 69 indirectly abuts on the top surface 6321 of the plastic lens barrel 63 through a spacer (not shown), and the imaging lens module 60 is not exposed by the display module 69.

13th Embodiment

Figure 51:
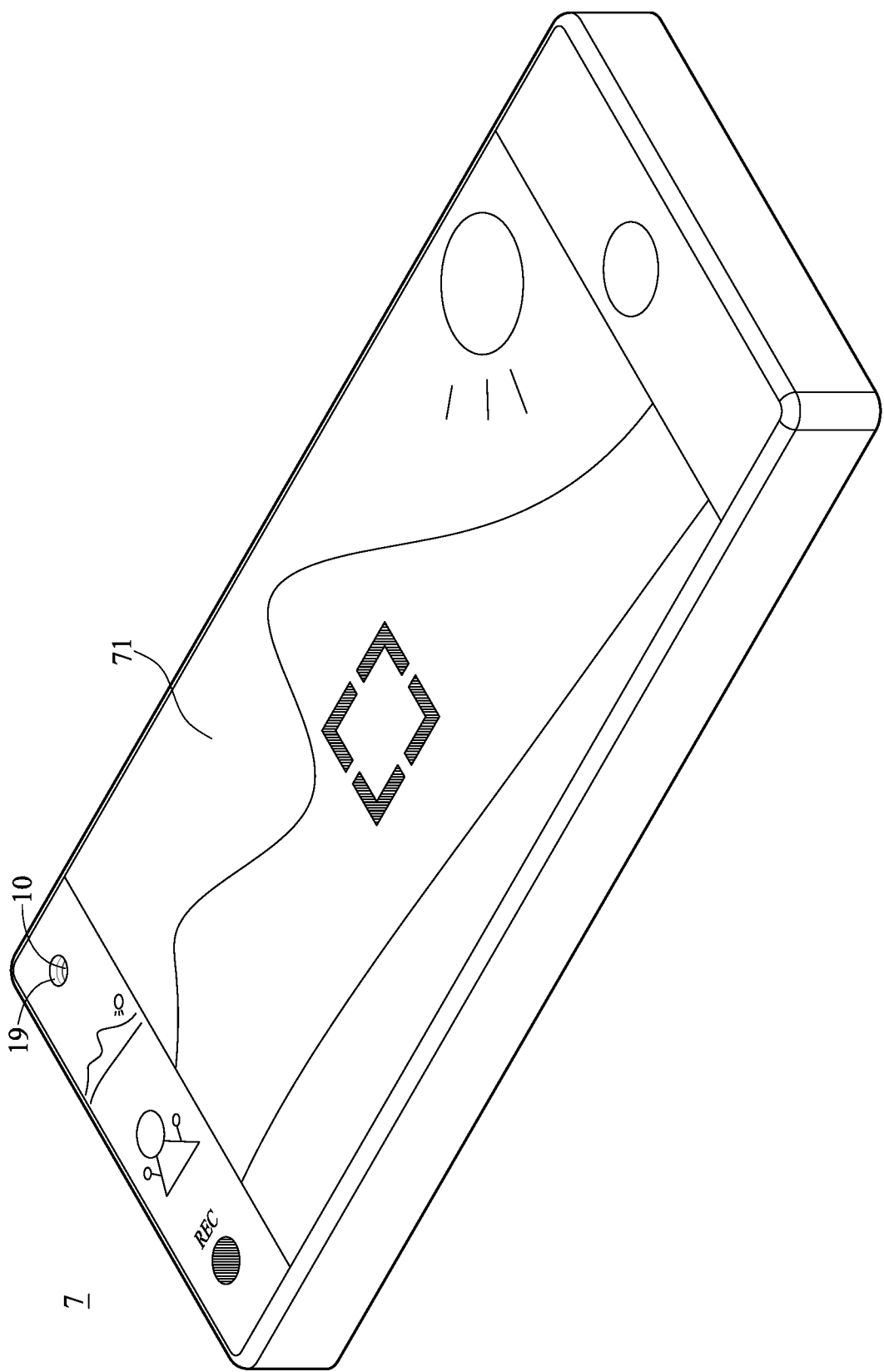
FIG. 51 is a perspective view of an electronic device according to the 13th embodiment of the present disclosure.

Please refer to FIG. 51, which is a perspective view of an electronic device according to the 13th embodiment of the present disclosure. In this embodiment, an electronic device 7 is a smartphone including the imaging lens module 10 disclosed in the 1st embodiment and a display device 71; the electronic device 7 may include the imaging lens module disclosed in other embodiments, and the present disclosure is not limited thereto. In this embodiment, the imaging lens module 10 and the display device 71 are disposed on the same side of the electronic device 7. That is, the imaging lens module 10 can be a front-facing camera of the electronic device 7 for taking selfies, but the present disclosure is not limited thereto. The display device 71 includes the display module 19 disclosed in the 2nd embodiment, and the display module 19 is located on the object side of the imaging lens module 10. In addition, the electronic device 7 may also include the imaging lens module disclosed in other embodiments as a rear camera on the opposite side thereof (not shown), and the present disclosure is not limited thereto.

14th Embodiment

Figure 52:
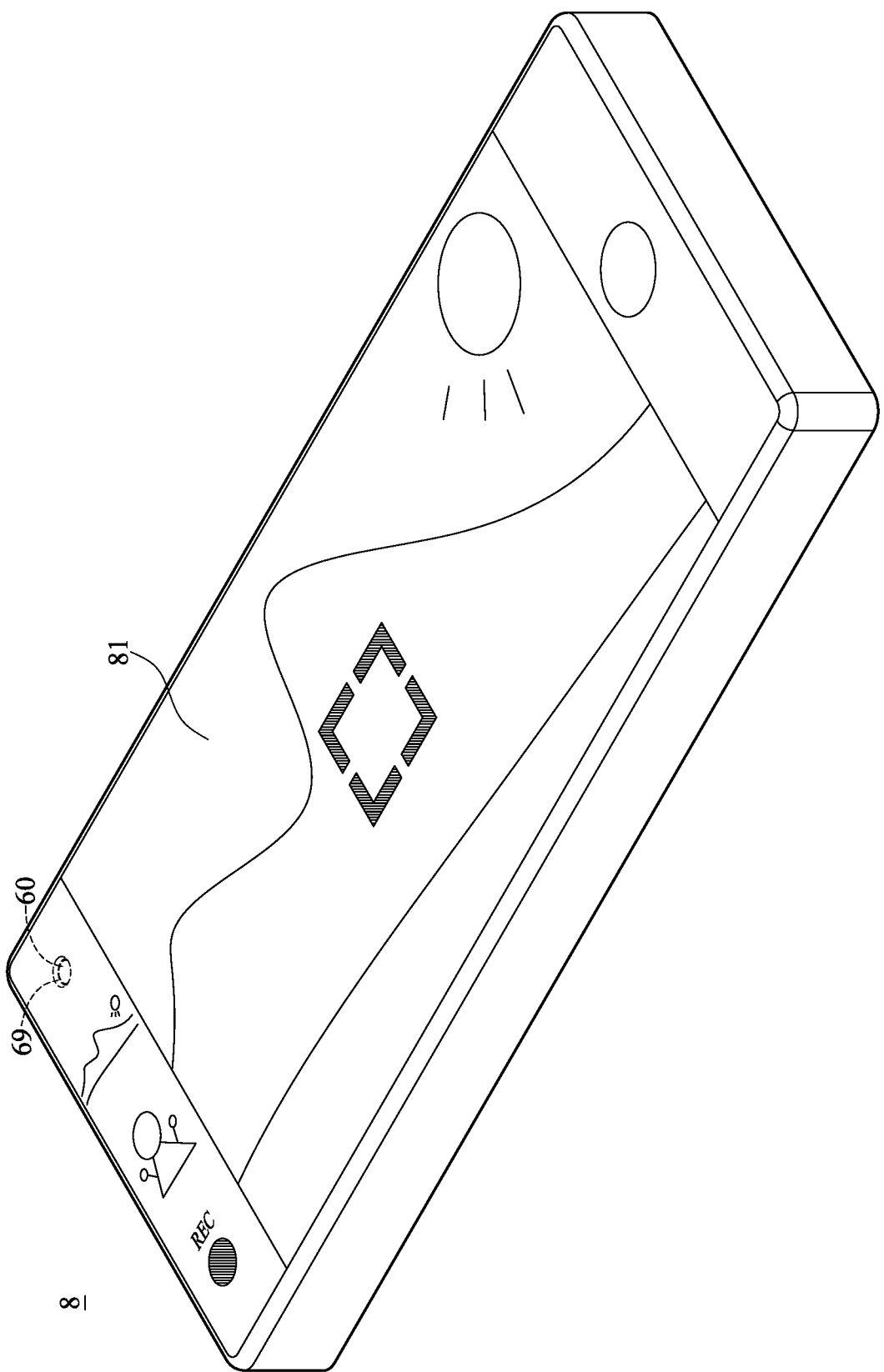
FIG. 52 is a perspective view of the electronic device according to the 14th embodiment of the present disclosure.

Please refer to FIG. 52, which is a perspective view of the electronic device according to the 14th embodiment of the present disclosure. In this embodiment, an electronic device 8 is a smartphone including the imaging lens module 60 disclosed in the 11th embodiment and a display device 81; the electronic device 8 may include the imaging lens module disclosed in other embodiments, and the present disclosure is not limited thereto. In this embodiment, the imaging lens module 60 and the display device 81 are disposed on the same side of the electronic device 8. That is, the imaging lens module 60 can be an under-screen and front-facing camera of the electronic device 8 for taking selfies, but the present disclosure is not limited thereto. The display device 81 includes the display module 69 disclosed in the 12th embodiment, and the display module 69 is located on the object side of the imaging lens module 60 which is not exposed by the display module 69. In addition, the electronic device 8 may also include the imaging lens module disclosed in other embodiments as a rear camera on the opposite side thereof (not shown), and the present disclosure is not limited thereto.

The smartphones in these embodiments are only exemplary for showing the imaging lens modules 10-60 of the present disclosure installed in electronic devices 7-8, and the present disclosure is not limited thereto. The imaging lens modules 10-60 can be optionally applied to optical systems with a movable focus. Furthermore, the imaging lens modules 10-60 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module, comprising:
an imaging lens assembly, having an optical axis;
an image sensor, wherein the image sensor is disposed on an image side of the imaging lens assembly, the image sensor has an image sensing surface facing towards the imaging lens assembly, and the optical axis passes through the image sensing surface; and
a plastic lens barrel, accommodating the imaging lens assembly and comprising:
an object-end portion, having an object-end surface and at least one tapered surface, wherein the object-end surface faces towards an object side direction of the imaging lens assembly, and the at least one tapered surface is tapered off towards the object-end surface;
a bottom portion, located on an image side of the object-end portion;
a first inner hole portion, wherein the imaging lens assembly is disposed in the first inner hole portion; and
a second inner hole portion, wherein the second inner hole portion is located on an image side of the first inner hole portion, and the second inner hole portion comprises an optical aligning structure;
wherein a relative position between the image sensing surface and the imaging lens assembly is aligned by the optical aligning structure;
wherein the plastic lens barrel has at least three gate traces, a standard deviation of minimum distances between each of the at least three gate traces and the optical axis is dg_std, an aperture diameter of the imaging lens module is ϕs, and the following condition is satisfied:

0 [mm]≤$dg\_std$<1.0×ϕ$s$ [mm]; and wherein a length of the second inner hole portion in a direction in parallel with the optical axis is Lr, and the following condition is satisfied:

0.2 [mm]<$Lr$<2.7 [mm].

2. The imaging lens module of claim 1, wherein the at least three gate traces are disposed on the bottom portion of the plastic lens barrel.

3. The imaging lens module of claim 1, wherein the first inner hole portion forms at least four inner parallel annular surfaces, the at least four inner parallel annular surfaces are disposed in parallel with the optical axis, and at least one of the at least four inner parallel annular surfaces is in physical contact with the imaging lens assembly.

4. The imaging lens module of claim 3, wherein the bottom portion has a top surface and a bottom surface, the bottom surface is located at a position of the bottom portion farthest away from the object-end portion, the top surface and the bottom surface are disposed opposite to each other, and the image sensing surface is located between the top surface and the bottom surface.

5. The imaging lens module of claim 1, wherein the length of the second inner hole portion in the direction in parallel with the optical axis is Lr, and the following condition is satisfied:

0.3 [mm]≤$Lr$<2.2 [mm].

6. The imaging lens module of claim 1, wherein the standard deviation of the minimum distances between each of the at least three gate traces and the optical axis is dg_std, the aperture diameter of the imaging lens module is ϕs, and the following condition is satisfied:

0 [mm]≤$dg\_std$<0.85×ϕ$s$ [mm].

7. The imaging lens module of claim 6, wherein the standard deviation of the minimum distances between each of the at least three gate traces and the optical axis is dg_std, the aperture diameter of the imaging lens module is ϕs, and the following condition is satisfied:

0 [mm]≤$dg\_std$<0.7×ϕ$s$ [mm].

8. The imaging lens module of claim 6, wherein the standard deviation of the minimum distances between each of the at least three gate traces and the optical axis is dg_std, the aperture diameter of the imaging lens module is ϕs, and the following condition is satisfied:

0 [mm]≤$dg\_std$<0.45×ϕ$s$ [mm].

9. The imaging lens module of claim 1, wherein an angle between the at least one tapered surface and the optical axis is α, and the following condition is satisfied:

1 [deg.]≤α≤65 [deg.].

10. The imaging lens module of claim 1, wherein the optical aligning structure has at least one inner bevel surface configured to be axially aligned with the image sensor to align the optical axis with a center of the image sensing surface.

11. The imaging lens module of claim 10, wherein the optical aligning structure further has at least one inner flat surface configured to maintain an axial position of the image sensor, the axial position is a relative position between the image sensing surface and the imaging lens assembly in the direction in parallel with the optical axis, the at least one inner flat surface extends in a direction perpendicular to the optical axis, and the at least one inner flat surface and the at least one inner bevel surface are angled to each other.

12. An imaging lens module, comprising:
an imaging lens assembly, having an optical axis;
an image sensor, wherein the image sensor is disposed on an image side of the imaging lens assembly, the image sensor has an image sensing surface facing towards the imaging lens assembly, and the optical axis passes through the image sensing surface; and
a plastic lens barrel, accommodating the imaging lens assembly and comprising:
an object-end portion, having an object-end surface and at least one tapered surface, wherein the object-end surface faces towards an object side direction of the imaging lens assembly, and the at least one tapered surface is tapered off towards the object-end surface;
a bottom portion, located on an image side of the object-end portion;
a first inner hole portion, wherein the imaging lens assembly is disposed in the first inner hole portion; and
a second inner hole portion, wherein the second inner hole portion is located on an image side of the first inner hole portion, and the second inner hole portion comprises an optical aligning structure;
wherein a relative position between the image sensing surface and the imaging lens assembly is aligned by the optical aligning structure;

wherein the plastic lens barrel has at least three gate traces, a standard deviation of minimum distances between each of the at least three gate traces and the optical axis is dg_std, an aperture diameter of the imaging lens module is ϕs, and the following condition is satisfied:

0 [mm]≤*dg_std*<1.0×ϕ*s* [mm]; and wherein an area surrounded by the object-end surface is Af, an area surrounded by the bottom portion is Ab, and the following condition is satisfied:

0<*Af/Ab*<0.35.

13. The imaging lens module of claim 12, wherein the bottom portion has a top surface and a bottom surface, the bottom surface is located at a position of the bottom portion farthest away from the object-end portion, the top surface and the bottom surface are disposed opposite to each other, and the image sensing surface is located between the top surface and the bottom surface.

14. The imaging lens module of claim 13, wherein the bottom surface of the bottom portion is substantially quadrilateral.

15. The imaging lens module of claim 14, wherein the bottom surface of the bottom portion is substantially rectangular.

16. The imaging lens module of claim 14, wherein one side of the bottom surface of the bottom portion is located closer to the object-end surface than other sides thereof.

17. The imaging lens module of claim 12, wherein the standard deviation of the minimum distances between each of the at least three gate traces and the optical axis is dg_std, the aperture diameter of the imaging lens module is ϕs, and the following condition is satisfied:

0 [mm]≤*dg_std*<0.85×ϕ*s* [mm].

18. The imaging lens module of claim 17, wherein the standard deviation of the minimum distances between each of the at least three gate traces and the optical axis is dg_std, the aperture diameter of the imaging lens module is ϕs, and the following condition is satisfied:

0 [mm]≤*dg_std*<0.45×ϕ*s* [mm].

19. The imaging lens module of claim 12, wherein the area surrounded by the object-end surface is Af, the area surrounded by the bottom portion is Ab, and the following condition is satisfied:

0<*Af/Ab*≤0.28.

20. The imaging lens module of claim 12, wherein the at least three gate traces are disposed on the bottom portion of the plastic lens barrel.

21. An electronic device, comprising:
the imaging lens module of claim 12; and
a display module, located on an object side of the imaging lens module.

22. The electronic device of claim 21, wherein the bottom portion has a top surface and a bottom surface, the bottom surface is located at a position of the bottom portion farthest away from the object-end portion, the top surface and the bottom surface are disposed opposite to each other, and the image sensing surface is located between the top surface and the bottom surface.

23. The electronic device of claim 22, wherein the top surface is configured to have a supporting function for the display module to abut thereon.

24. The electronic device of claim 22, wherein the plastic lens barrel further comprises a step surface disposed opposite to the bottom surface, at least one of the top surface and the step surface is configured to have a supporting function for the display module to abut thereon.

* * * * *